(12) United States Patent
Mangold

(10) Patent No.: US 11,875,412 B2
(45) Date of Patent: Jan. 16, 2024

(54) SYSTEM FOR FAST COMPOSING, LAUNCH AND CONFIGURATION OF CUSTOMIZABLE SECOND-TIER TRANSFER STRUCTURES WITH BUILD-IN AUDITING AND MONITORING STRUCTURES AND METHOD THEREOF

(71) Applicant: Swiss Reinsurance Company Ltd., Zurich (CH)

(72) Inventor: Chung-Shik Mangold, Wangen (CH)

(73) Assignee: Swiss Reinsurance Company Ltd., Zurich (CH)

( * ) Notice: Subject to any disclaimer, the term of this patent is extended or adjusted under 35 U.S.C. 154(b) by 0 days.

(21) Appl. No.: 17/692,086

(22) Filed: Mar. 10, 2022

(65) Prior Publication Data
US 2022/0270179 A1  Aug. 25, 2022

Related U.S. Application Data

(63) Continuation of application No. PCT/EP2021/053378, filed on Feb. 11, 2021.

(30) Foreign Application Priority Data

Mar. 18, 2020 (WO) ................. PCT/EP2020/057477

(51) Int. Cl.
*G06Q 40/08* (2012.01)
*G06Q 10/04* (2023.01)
(Continued)

(52) U.S. Cl.
CPC ............. *G06Q 40/08* (2013.01); *G06Q 10/04* (2013.01); *G06Q 10/067* (2013.01); *G06Q 10/10* (2013.01); *G06Q 40/06* (2013.01)

(58) Field of Classification Search
CPC ...... G06Q 40/08; G06Q 10/04; G06Q 10/067; G06Q 10/10; G06Q 40/06
(Continued)

(56) References Cited

U.S. PATENT DOCUMENTS 7,949,548 B2 * 5/2011 Mathai .................... G06F 16/29
705/35
10,977,736 B1 * 4/2021 Allen ..................... G06Q 40/08
(Continued)

OTHER PUBLICATIONS

International Search Report and Written Opinion dated Apr. 1, 2021 in PCT/EP2021/053378.

*Primary Examiner* — Robert R Niquette
(74) *Attorney, Agent, or Firm* — Oblon, McClelland, Maier & Neustadt, L.L.P.

(57) ABSTRACT

A digital platform and system that provides an automated, multi-channel, end-to-end risk-transfer configuration and/or parametrization process for configuring, launching, and processing of customized second-tier transfer structures, wherein an automated risk-transfer placement for objects or property assets each having a geographic location related to occurrence of physical impacting risk-events, the objects or property assets impacting events, is provided by the digital platform and system as a first online channel comprising an electronic, parameter-driven, rule-based underwriting process for automatically creating a portfolio or composition of customized second-tier structures. An automated claim handling is provided by the digital platform and system as a second online channel, and automated accounting is provided by the digital platform and system as a third online channel.

18 Claims, 52 Drawing Sheets

(51) Int. Cl.
   *G06Q 10/10* (2023.01)
   *G06Q 40/06* (2012.01)
   *G06Q 10/067* (2023.01)
   *G06Q 10/06* (2023.01)

(58) Field of Classification Search
   USPC ............................................................ 705/4
   See application file for complete search history.

(56) References Cited

U.S. PATENT DOCUMENTS

| | | |
|---|---|---|
| 2008/0065427 A1 | 3/2008 | Helitzer et al. |
| 2008/0154652 A1* | 6/2008 | Bresch .................. G06Q 40/08 705/4 |
| 2017/0161859 A1* | 6/2017 | Baumgartner ..... G06Q 30/0202 |
| 2018/0114272 A1* | 4/2018 | Reimann ................ G06Q 40/08 |
| 2018/0218453 A1* | 8/2018 | Crabtree ................. G06N 5/022 |
| 2021/0035226 A1* | 2/2021 | Dybvik .............. G06Q 10/0635 |

* cited by examiner

Measures

Premium
101.7m
Previous period: 132.9m
-23.48% ↘

Cycle Ref Prem
73.47m
Previous period: 93.05m
-21.04% ↘

LTPA
1.38
Previous period: 1.43
-3.09% ↘

Avg EL
1'996
Previous period: 1'688
+18.21% ↗

Fig. 9a

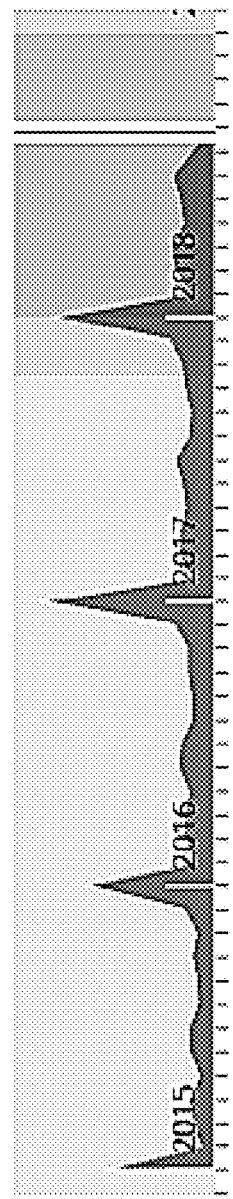
Fig. 9d

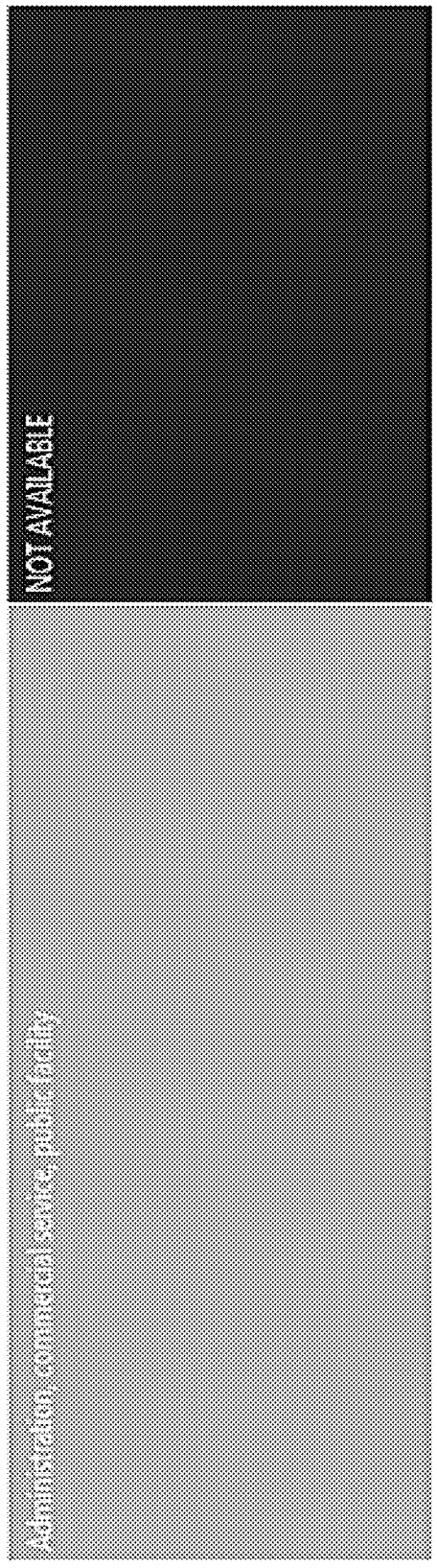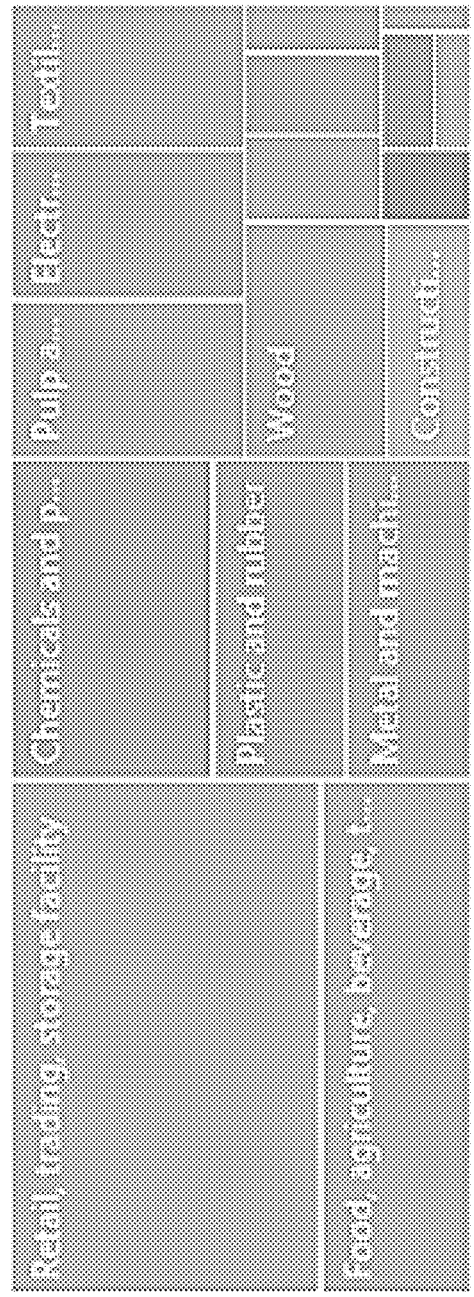
Fig. 9f

| Portfolio with minimum attributes set | | |
|---|---|---|
| Peril | Ground-up Loss | |
| Earthquake - Shock | $ | 22 |
| Flood - River | $ | 48 |
| Tropical Cyclone - Wind | $ | 701 |
| Overall Total (All Perils) | $ | 771 |

Fig. 11a

| Portfolio enriched with NCED | | |
|---|---|---|
| Peril | Ground-up Loss | |
| Earthquake - Shock | $ | 18 |
| Flood - River | $ | 47 |
| Tropical Cyclone - Wind | $ | 801 |
| Overall Total (All Perils) | $ | 867 |

Way 592176675

Tags:

addr:housenumber=1313
addr:postcode=92805
addr:state=California
addr:street=South Harbor Boulevard
designation=Disneyland Resort
int_name=Disneyland
name=Disneyland
opening=Mon-Sun (Disneyland park hours vary from day to day. For current park hours visit https://disneyland.disney.go.com/calendars/park-hours/)
operator=Disney Parks and Resorts
short_name=DL
start_date=1955-07-17
tourism=theme_park
website=https://disneyland.disney.go.com/destinations/disneyland/
wikidata=Q181185
wikipedia=en:Disneyland

Fig. 16a

```
1  /*
2  This is an example Overpass query.
3  Try it out by pressing the Run button above!
4  You can find more examples with the Load tool.
5  */
6  [out:json][timeout:25];
7  way[name="Disneyland"];
8  out geom;
```

Fig. 16b

```
 8      "elements": [
 9
10        {
11          "type": "way",
12          "id": 323367734,
13          "bounds": {
14            "minlat": 37.0773688,
15            "minlon": 15.2751667,
16            "maxlat": 37.0780072,
17            "maxlon": 15.2756219
18          },
19          "nodes": [
20            3306391418,
21            3306391362,
22            3317413982,
23            3306391363,
24            3306391369,
25            3317413984,
26            3306391370,
27            3306391447,
28            3306391806,
29            3306391805,
30            3306391802,
31            3306391418
32          ],
33          "geometry": [
34            { "lat": 37.0776475, "lon": 15.2752480 },
35            { "lat": 37.0773688, "lon": 15.2753148 },
36            { "lat": 37.0773712, "lon": 15.2753443 },
37            { "lat": 37.0773739, "lon": 15.2753704 },
38            { "lat": 37.0773892, "lon": 15.2755613 },
39            { "lat": 37.0773911, "lon": 15.2755804 },
40            { "lat": 37.0773936, "lon": 15.2756219 },
41            { "lat": 37.0777712, "lon": 15.2755304 },
42            { "lat": 37.0780072, "lon": 15.2754732 },
43            { "lat": 37.0779964, "lon": 15.2753106 },
44            { "lat": 37.0779869, "lon": 15.2751667 },
45            { "lat": 37.0776475, "lon": 15.2752480 }
46          ],
47          "tags": {
```

Fig. 16c

A generic cluster dendogram visualizing agglomerative & divisive clustering

| | building | building:units | ele | height | lacounty:ain | lacounty:bld_id | start_date |
|---|---|---|---|---|---|---|---|
| 0 | apartments | 8 | 13.6 | 6.5 | 7208013021 | 5035317749871 | 1959 |
| 1 | residential | 4 | 10.2 | 4.5 | 7205018003 | 5033277749864 | 1924 |
| 2 | apartments | 3 | 13.1 | 6.9 | 7205018001 | 5034207749804 | 1965 |
| 3 | house | 1 | 11.1 | 5.2 | 7205018002 | 5033657749865 | 1925 |
| 4 | house | 1 | 10.7 | 4.0 | 7208012005 | 5035107749975 | 1942 |
| 5 | apartments | 8 | 13.7 | 6.5 | 7208013023 | 5035277749788 | 1962 |
| 6 | residential | 4 | 11.7 | 6.0 | 7205018003 | 5033307749797 | 1924 |
| 7 | residential | 2 | 14.5 | 7.8 | 7208012006 | 5035497750130 | 1913 |

| | industrial | landuse | name |
|---|---|---|---|
| 0 | oil | industrial | Chevron Oil Refinery |
| 1 | port | industrial | Pasha Stevedoring Terminal |
| 2 | oil | industrial | Tesoro Carson Refinery |
| 5 | oil | industrial | Torrance Refinery |
| 6 | auto_wrecker | industrial | NaN |
| 7 | factory | industrial | SpaceX Manufacturing Facility |
| 8 | factory | NaN | Building A - Phase 1 (under construction) |
| 9 | electrical | industrial | Distribution Energy Storage Integration 1 |

Fig. 28

Campus/Site/Block

| LIQUEF_SUSCEPTIBILITY | 3.0 |
|---|---|
| VS30 | 270 |
| ENCODING_STATUS_CD | 3 |
| ENCODINGQUALITY_CD | 9 |
| ADMIN0 | 339 |
| ADMIN1 | 12034 |
| ADMIN2 | 316453 |
| CRESTA | 400206 |
| SUB_CRESTA | 503382 |
| HIGHEST_RES_ZIP | 50037949 |
| NUM_RISKS | 1 |
| LANDSLIDE_SUSCEPTIBILITY | 1.0 |

Building

| NUMBER_OF_STORIES | 4 |
|---|---|
| PERCENT_COMPLETE | 1 |
| CLADDING_CD | 10 |
| DETAILED_STRUCT_CD | 20 |
| MAINSTRUCTURE_CD | 5 |
| NUM_RISKS | 1 |
| DESIGN_YEAR | 2002 |

Insured Item

| PF_VERSION_ID | 396871 |
|---|---|
| INS_ITM_ID | 3289014221 |
| LATITUDE | 33.984444 |
| LONGITUDE | -118.30862 |
| OCCUPANCY_CD | 1018254 |
| SRC_SYS_ID | 27321.0 |
| ENCODING_TIMESTAMP | 2012.12.13 09:21:30 |
| STREET_ADDRESS | 6050 S WESTERN AVE # 6130 |

Fig. 29

Location Lookup

Latitude: *  43.73213  
Longitude: *  -79.26701  
Street Address: *  2425 Eglinton Avenue

[Lookup] [Clear]

| id | latitude | longitude | noofrecords | designYear | occupancy | main_structure | detailed_structure |
|---|---|---|---|---|---|---|---|
| 48336959 | 43.7321275609758606 | -79.2670124330244 | 41 | | Office building | | |
| 102343089 | 43.7325661538546165 | -79.2679130769330B | 26 | | Retail and trading | | |
| 96818321 | 43.7327065217391225 | -79.2673965217391 12 | 23 | | Retail and trading | | |
| 27776133 | 43.73284 | -79.26685 | 17 | | Retail and trading | | |
| 113652279 | 43.732359999999886 | -79.2671489999999999 | 15 | | Retail and trading | | |
| 95601038 | 43.7319213333333334 | -79.268019999999999 | 15 | | Office building | | |
| 51322859 | 43.73193 | -79.286441428577145 | 14 | | Hotel, motel, casino, restaurant, bar | | |
| 24776345 | 43.73214 | -79.267010000000001 | 14 | 1985 | Retail and trading | | |
| 105332456 | 43.7327760230789 2 | -79.2680223078933 1 | 13 | 1980 | Retail and trading | Reinforced concrete frames | Moment resisting RC frames with RC or RM shear walls |
| 81837824 | 43.732182 | -79.267900700000001 | 12 | | Office building | | |

Search for Submission ID: [     ]

[Export] [Show Rules] [Export]

SYSTEM FOR FAST COMPOSING, LAUNCH AND CONFIGURATION OF CUSTOMIZABLE SECOND-TIER TRANSFER STRUCTURES WITH BUILD-IN AUDITING AND MONITORING STRUCTURES AND METHOD THEREOF

CROSS REFERENCE TO RELATED APPLICATION

The present application is a continuation application of International Patent Application No. PCT/EP2021/053378, filed on Feb. 11, 2021, which claims priority to PCT/EP2020/057477, filed Mar. 18, 2020, the content of each of which is hereby incorporated by reference in its entirety.

FIELD OF THE INVENTION

The present invention relates to systems and methods for fast composing, launch and configuration of highly customizable second-tier transfer structures, as second-tier risk-transfer structures, in particular to cloud-based automated and/or semi-automated digital systems. Further, the present invention relates to intelligent, automated optimization technologies for electronically steering, monitoring and adapting/optimizing of second-tier transfer structures. More particularly, it relates to systems for automation of electronic underwriting, risk management, risk-transfer and digital portfolio steering and signaling involving an improved composing and configuring of products for a user interactively, where product parameters such as validation rules, attribute, perils, legal documents are addable, activatable, modifiable, deactivatable and deletable on demand on the different levels (client, state, region, country, reinsurance type and line of business).

BACKGROUND OF THE INVENTION

Automated or semi-automated risk-transfer systems, typically interacting with a user via graphical user interface (GUI), are known in the prior art. In particular, automated, cloud-based systems enabling an end-user, broker, MGA (Managing General Agent) etc. to compose and/or parametrize automatically a first-tier (insurance) and/or second-tier (reinsurance) risk-transfer structure/products, after conducting a dialogue with a knowledge-based system, are known. Such systems reduce the dependences of first-insurers or reinsurers on both their information technology (IT) and their human experts, as e.g. actuarial experts. Such systems are able to adjust the dialogue interactively according to the specific needs of the users and ask for the relevant data needed for the desired risk-transfer product.

Typically, the structure of risk-transfers makes them for many types of risk-transfer suitable for automation with regard to the composition/configuration of the risk-transfer products. Most risk-transfers consist of a number of common basic parts and elements to configure. These parts and elements are herein referred as "structuring blocks" of the risk-transfer, i.e. the risk-transfer structure defining the characteristics of the risk-transfer. Different combinations of these structuring blocks lead to different risk-transfer products. For a human-machine interface (HMI) as e.g. Graphical User Interface (GUI), and for the corresponding necessary dialogue between the machine and the user, it should be possible to automatically compose risk-transfer products or structures out of a set of such structuring blocks. The "human" is the user of the automated system, i.e. an insured or an insurer depending if a first-tier (insurance product) or second-tier (reinsurance product) risk-transfer has to be configurated, while the "machine" refers to the automated system, as e.g. an automated web server or cloud-based system of a provider e.g. an insurer for first-tier risk-transfer products or a reinsurer for second-tier risk-transfer products. For example, using the parameterization of structuring blocks, typically a system comprising a limited amount of structuring blocks can be obtained for non-customized risk-transfer products. For example, applying domain knowledge of the actuary filed of life risk-transfer structures (life/non-life insurance structures/products), a life risk-transfer structure (defined by the policy) comprises the steps of after a monetary amount transfer (premium) either on basis of a regular money transfer or as a lump sum, the user (beneficiary) receives an endowment if the insured is alive, which means that the insurer has to pay the beneficiary a sum of money (i.e. the benefit) in the case of death in exchange for the premium transfer. Depending on the contract, other events such as terminal illness or critical illness can also trigger payment. Unseen the latter, the life risk-transfer can therefore be reduced to three basic events. These events can be assigned to a set of structuring blocks common to all life risk-transfer: premium endowment and alive. For automation, all such systems depend on triggers. Triggers detect events in its environment by observing, measuring and/or monitoring properties or characteristics of input stimuli, as measuring parameters, it receives or measures. Finally, based on the used structuring blocks, the dialogue input flow of the user interface (HMI) may follow pairs of current state and input to what the present output and the next state must be. Thereby, the input triggers the next state.

Today, automation of the underwriting process is not enough to cope with the challenges. The increasingly dynamic and diversified reinsurance market requires shorter time-to-market of highly customized reinsurance products. Such process are technically difficult to automatize. Thus, though the prior art system are able to automate or semi-automate the underwriting process, there is still a need for a complete electronically automated solution covering the whole facultative risk-transfer (Note that that the present inventive solution covers, for risk-transfer, all line of business (natural catastrophes, casualty, etc.), all classes of businesses (proportional/non-proportional), and all risk types (life/non-life)). In particular, there is no system providing a fast, consistent and easy access to reinsurance risk-transfer, thereby allowing to reduce administration costs for managing mid-market risk portfolios, (ii) to access fast, automatic capacity approval for medium-sized single risks or facilities or treaties etc., and (iii) to relieve administration time, to focus on more complex parts of the risk-transfer. In summary, there is a need for an easy-to-use and efficient online risk placement, claims and accounting channel for clients covering the whole process of the risk-transfer, i.e. the entire value chain providing an end-to-end process, thereby providing fast composing, launch and configuration of highly customized reinsurance products.

In summary, processor-driven systems with user interfaces for automated receiving data for binding contract conclusions between a user and a digital platform or channel are known in the prior art, in particular, via the Internet. In the field of risk-transfer technology, such systems or platforms are e.g. automated underwriting (UW) platforms. To increase the quality of the data acquisition, the known systems are typically equipped with validation means in order to check the input data values on the basis of data rules which are assigned to data input fields of the user interfaces and for requesting, if necessary, corrections via the user interface. In the case of products or services which are assigned to fixed purchase prices, sales contracts can be automatically concluded on-line by the known systems. If, however, the objects of contracts relate to service structures/ products which cannot be simply assigned contract conditions and, in particular, prices on an individual one-to-one basis, the known systems are only suitable for data acquisition for ordering services or applying for services which must be dealt with manually by professional assistants of the service provider at a later time. This means that contracts for services which are dependent on many conditions and factors, for example risk-transfers which depend on numerous and different risk factors and risk-transfer conditions, cannot be concluded automatically and on-line by the known systems, nor can such risk-transfers or portfolios or baskets of risk-transfers be dynamically adapted form user side without human assistance form the provider side. In the known systems, it is possible to deal differently with users from different countries and/or language regions by selecting and activating different user interfaces in accordance with the specification of the relevant country or of relevant language region for the user. For example, the user is presented with a country- or language-specific graphical user interface. The existence of a number of different user interfaces for different user groups increases the complexity and maintenance costs of the system. For example, a general change of the user interface must be carried out in all country- and language-specific graphic user interfaces.

US 2018/0114272 A1 shows a computer-based system from the prior art providing an automated, inter-arrival-time-based system for automated prediction and signaling of associated, risk-event driven risk-transfer systems, for automated low frequency catastrophic risk-transfer. The system measures risk-events and assigns them to a historic hazard set comprising event parameters for each assigned risk-event. The automated risk-transfer systems are provided with corresponding risk-transfer parameters for initiating automated risk cover. An event loss set is based on the measured frequencies with associated losses of said risk-events of the hazard set, each of said risk-events creating a set specific loss. Time-stamps, based on an automatically and/or dynamically estimated distribution of corresponding inter-arrival times parameters, capture a waiting time between consecutive events of the period loss set. The waiting times measure the time intervals between two successive risk-events and capture peril specific temporal clustering and/or seasonal occurrence patterns. US 2017/0161859 A1 shows another prior art system disclosing an automated system for disaster risk management, the system capturing country-specific parameters of a risk-exposed country relating to stored predefined criteria, assigning disaster event types to a disaster history table, capturing and storing mapping parameters for a geographic risk map, assigning each of a plurality of selectable disaster financing types to a definable cost factor capturing the capital cost of the disaster financing type in relation to its application for disaster mitigation, determining expected catastrophe losses by a loss frequency function and the geographic risk map for various scenarios of occurring natural disaster event types, and preparing a forecast of an effect of the disaster financing type to cover the catastrophe losses based on the coverage structure, the assigned cost factors, and the determined expected catastrophe losses. Finally, the prior art document US 2008/0065427 A1 discloses a system for analyzing sensor data collected from sensors monitoring property. The systems and methods analyze the data to make property insurance underwriting decisions based on the collected sensor data using a computerized process that varies the way in which it manipulates the collected sensor data based on a characteristic of the property being insured, a characteristic of the entity seeking the insurance, or on the values of the collected data parameters.

SUMMARY OF THE INVENTION

It is an object of the invention to allow for systematic capturing, measuring, quantifying, and forward-looking generating of appropriate risk and risk accumulation measures of risk-transfers and risk-transfer portfolios associated with risk exposures of physical real-world assets and objects based on physical measuring parameter values and data, i.e. the impact of a possibly occurring physical event in a defined future time window. It is a further object of the present invention to propose a processor-driven system or platform providing an automated digital channel for automatically concluding and dynamically adapting risk-transfers between a risk-transfer service user and a risk-transfer service provider, which does not exhibit the disadvantages of the known systems. In particular, it is an object of the present invention to propose a processor-driven, metric system or digital platform which comprises a user interface, which can be operated by means of terminals via a data-transmission network for users, comprising data input fields for inputting data relating to the object of a risk-transfer, which is available and can be used as a one-stop, end-to-end process for conducting, monitoring and adapting risk-transfers or portfolios of risk-transfers by the user independently of the location or the desired object of a contract (service). In particular, it is a further object of the present invention to propose a processor-driven, computer-based system which comprises a universal user interface which can be adapted flexibly to variable risk-transfer conditions and risk-transfer types of an automated binding process without changes which are visible to the service user. The used inventive technical teaching should be easily integratable in other processes, productions chains or risk assessment and measuring systems. Finally, the invention should be enabled to use data and measuring parameter values from multiple heterogeneous data sources. The probability and risk forecast should allow to capture various device and environmental structures, providing a precise and reproducible measuring of risk factors, and allowing to optimize associated event occurrence impacts of the captured risk events.

According to the present invention, these objects are achieved particularly through the features of the independent claims. In addition, further advantageous embodiments follow from the dependent claims and the description.

According to the present invention, the above-mentioned objects are particularly achieved by the inventive, automated risk-transfer configurator and digital platform and system allowing fast composing, launching and configuration of highly customized secondary risk-transfer structures, inter alia by creating an end-to-end solution for second-tier transfer (reinsuring risk) portfolios. In particular, the digital platform provides an automated, multi-channel, end-to-end risk-transfer product configuration and management process for configuring, launching and processing of customized second-tier risk-transfer structures, wherein an automated risk-transfer product placement is provided by the system as a first online channel comprising a parameter-driven, rule-based underwriting process for creating a portfolio of customized second-tier structures, wherein an automated claim handling is provided by the system as a second online channel, and wherein an automated accounting is provided by the system as a third online channel, in that the system comprises a product configurator comprising at least four structuring blocks, a first structuring block for setting coverage area parameters of the risk-transfer product, a second structuring block for setting line of business parameters, a third structuring block for setting type of risk-transfer parameters, and a fourth structuring block for setting risk information parameters, in that for capturing the risk information parameters, the product configurator comprises a machine-based exposure data intelligence enabled to automatically identify unique risks of objects based on a precise location of the objects, in that the system comprises a metric simulation engine for automated prediction of forward- and backward-looking impact measures based on event parameter values of time-dependent series of occurrences of physical impacting risk-events, wherein the occurrences of the physical risk-events are measured based on predefined threshold-values of the event parameters and wherein the impacts of the physical risk-events to a specific asset or object are measured based on impact parameters associated with the asset or object, and in that the system comprises a graphical user interface of a portfolio analytics framework providing a dynamic representation of a portfolio structure, wherein the metric simulation engine forms an integrated part of the portfolio analytics framework, and wherein, by means of the metric simulation engine, the dynamic representation of the portfolio structure provides forward- and backward-looking insights to the user thereby enabling portfolio steering by identification of critical areas of the portfolio and impacts of possible changes to the underwriting before going to launch it in the market.

As an embodiment variant, the product configurator comprises a client rate offering module, wherein by means of the client rate offering module, the user is enabled to input and offer a rate he is willing to pay, thereby allowing the system to capture insights into the gap between willingness to pay and the costing generated by the system.

As another embodiment variant, the machine-based exposure data intelligence can e.g. comprise an exposure database comprising a plurality of data records holding attribute parameter of properties/objects with assigned geographic location parameters, wherein the machine-based exposure data intelligence comprises a clustering module for clustering stored properties/objects of the exposure database related to their assigned geographic location parameters, and wherein different data records of the exposure database having the same assigned geographic location parameters are matched and mutual aligned, in case of triggering inconsistencies for data records having the same assigned geographic location parameters. The machine-based exposure data intelligence can e.g. comprise a rate engine providing a lookup service access for users based on the exposure database and the clustering of the data records, wherein an automated identification of location-specific risks is assessable by a user based on the precise location of the properties and/or objects. The machine-based exposure data intelligence can e.g. further comprise a user data interface enabling access via mobile devices to input location data by a GPS-module or optical sensor and/or camera of the mobile devices. The mobile device can e.g. be realized as a smart phone. A user can e.g. be enabled to scan for insured properties by means of the mobile devices as e.g. his smart phone. The machine-based exposure data intelligence can e.g. further comprise an cross-level analysis module providing identification, analysis and visualization of large risk pools, wherein a risk pool comprises a plurality of objects of the exposure database, wherein the different levels and channels comprise at least facultative risk-transfer and/or treaty risk-transfer and/or customized corporate direct risk-transfer, and wherein risk of properties/objects are analyzed based on the attributes and location at different levels and for different channels allowing for automated tracking of risk accumulation and/or capacity thresholds. The clustering module of the machine-based exposure data intelligence can e.g. comprise an automated address matching based on the latitude and longitude coordinates of a location, wherein for the clustering a search is narrowed down to a grid cell around the property/object of interest to a scale where two locations are matchable based just on the house number or other location-dependent attributes. For the clustering, the clustering module can e.g. use an adaptive cell size and/or shape, depending on the local housing/construction density. Alternatively, for the clustering, the clustering module can also use accessible building footprints to check if latitudinal/longitudinal-tags are enclosed with the footprint of interest, for example, wherein any latitudinal/longitudinal-coordinate is mapped to a unique building and/or associated to sites.

Finally, as an additional embodiment variant, the digital platform and system can be realized as an integrated part of a cloud-based application. The cloud-based application can be realized as Software as a Service (SaaS) over the cloud application by an appropriate provider.

The invention has inter alia the advantage that it provides an automated electronic digital channel to individually place and manage risks and risk-transfers between first risk-transfer systems or insurers and second risk-transfer systems reinsurers, in particular a digital B2B channel for secondary risk-transfer between two risk-transfer systems (insurer-reinsurer). The invention provides the technical infrastructure for an automated one-stop system for users' reinsurance approaches comprising automated underwriting and user-specific data capturing, automated claim handling, automated accounting (technical and financial) and automated reporting all in one technical system. The system provides automated secondary risk-transfer (reinsurance) coverage for all risk-specific fields as e.g. property and casualty risks, life and health risks, any line of business or industry risks, single risks, treaty and facility risks, and accumulation or clash risk involving loss exposure of one event spreading to multiple lines of business, i.e. correlated risk structures. The inventive system allows in a new technical way a user to monitor and fully control his risks along the entire value chain at any time. The system further allows to have an additional focus on brokers, channels or other electronic marketplaces, which can contribute to the bound risk-transfers by the inventive system. The invention provides a new kind of direct and full control and transparency of his risk-transfer portfolio to the user, in particular the invention provides early recognition of trends and agile risk-transfer steering by means of forward- and backward-looking metrics and measure values. The invention also provides technical means which can be seamless integration with other technical solutions and systems as e.g. portfolio monitoring platforms.

The invention has further the advantage that it provides a technical basis, which allows the user to significant faster develop a "go to market" strategy compared to prior art systems and technologies available in the technical field. For example, the invention allows new risk-transfer structure/product deployment within 48 h by means of the inventive risk-transfer product composer having a higher speed in quote delivery and a more enhanced referral and configuration application than the conventional technical systems in the field. The inventive, highly efficient process and structure allows to keep costs and men-power to a minimum due to high process automation, for example providing a cost leadership of around 2%, a high automation degree of 90% for the entire value chain, a simplified costing structure, a dynamic pricing structure (e.g. different price tags for different wordings), an easy steering of capacity deployment, and an efficient online accumulation control for the user, in particular e.g. realized as SaaS. The invention, realized as a digital, electronic and automated channel, allows an immediate notification to an underwriting request if the request does not qualify for automated processing, otherwise the invention provides risk-transfers at least for offline channel. For users, the invention provides an easy-to-use risk-transfer platform, where the user can manage his risk-transfer whenever he wants in a fast and efficient manner. The system provides a seamless data induction through an user's channel of choice (electronic reinsurance, automated broker platform, via an Application Programming Interface (API), electronic mail transfer, or semi-automated via user interface), where the user's expenditure of time and the administrative workload is heavily reduced through the automation, and where the system allows to provide efficient digital user support (e.g. chatbots). Finally, the invention allows to leverage existing platforms and applications and is scalable and technically integratable with no duplication. The invention provides one platform covering the whole end-to-end process applicable for internal and external usage. Due to its technical flexibility, the invention can also be provided to the user over mobile application realization in particular based on cloud-based realization.

BRIEF DESCRIPTION OF THE DRAWINGS

The present invention will be explained in more detail below relying on examples and with reference to these drawings in which:

As seen in FIG. 4, The system provides forward- and backward-looking measure output, by providing (1) as-if scenarios: Key for portfolio steering and identify areas where inventive simulation engine can act on (base rates, business mix); and (2) Impact assessment: The simulation engine allows user management and underwriters to assess the impact of changes to the underwriting before going to test/launch it in the actual, real-world market. FIG. 4 shows the generation of the forward- and backward-looking measures by the simulation engine under changings of the base rate factors. In other word, the simulation engine predicts measures answering the question of what the effect on the current risk-transfer portfolio is if the base rates changes. In the inventive method and process, the user of the simulation engine is enabled to choose changes in base rates on the required level. Then the impact on the portfolio metric Gross Written Premiums (GWP), Net Written Premiums (NWP), Expected Loss and CM1 are evaluated. In the example of FIG. 4, it shows a decrease in base rates by 10% on 3 different Level 1 PIC Codes (Administration, commercial service, public facility; Chemicals and Pharmaceuticals; Retail, trading, storage facility). Regarding the granularity, the sensitivity can be assessed and compared on every level (risk-transfer portfolio, product, PIC Level 1-3) and by underwriting year.

FIG. 5 shows the change in base rates, ranging from −50% to 50%. On the y-axis, we show the impact on the portfolio metric Gross Written Premiums (GWP), Net Written Premiums (NWP), CM1 and the number of bound contracts (NR). A slight increase in premiums results in an immediate drop of bound risk-transfer contracts. However, the big risk-transfer contracts are lost by a rate increase of approx. 15%. If rates decrease, then additional contracts are bound. Regarding the granularity, the sensitivity can be assessed and compared by means of the simulation engine on every level (risk-transfer portfolio, product, PIC Level 1-3) and by underwriting year.

FIG. 6 shows the predicted measures allowing to compare the costed rates with the written rates (weighted by volume). A value of 30% means that in average the rate offered by the client is 30% higher than our costed rate. A negative value means that the written rates are in average lower than the costed rates.

In FIG. 7, the user of the simulation engine chooses changes in risk-transfer volume on the required level. Then the impact on the portfolio metric measures Gross Written Premiums (GWP), Net Written Premiums (NWP), Expected Loss and CM1 are generated. FIG. 7 shows the impact of an increase of 5% in administration, a decrease of 5% in food, and excludes risk-transfers with negative CM1 (power generation, telecommunication, textile, wood). Regarding the granularity, the sensitivity can be assessed and compared on every level (risk-transfer portfolio, risk-transfer structure (product), PIC Level 1-3) and by underwriting year.

FIGS. 9 and 9a-9f show a diagram illustrating schematically an example of a simulation engine integration. In this embodiment variant, the simulation engine is realized as an integrated part to risk-transfer portfolio monitor and management platforms as an additional functionality. Therefore, being an integrated part of a risk-transfer portfolio analytics and prediction framework. Such electronic solutions allow easy access and usability by the risk-transfer portfolio monitor and management platforms and/or the underwriting systems and platforms.

FIGS. 11a and 11b show the ground-up loss, i.e. the loss before insurance conditions apply. FIG. 11a a ground-up loss for the example property rated based on the primary attributes set, while FIG. 11b shows the ground-up loss for the example property rated based on the attributes set retrieved from the exposure database 2151.

FIGS. 12a and 12b illustrate the attribute of the data records 21511, . . . , 2151i, which can e.g. be grouped into geographical, physical, flood physical, storm physical, earthquake physical properties and expert attributes, as can be seen from FIG. 12a/b, representing e.g. tabs of the forward-looking modelling module 21532. FIG. 12a shows an example location1, screenshots of the data record 21511, . . . , 2151i geographical location tab, showing the geo input and geocoded data. FIG. 12b shows an example location1, screenshots of the data record 21511, . . . , 2151i property data tabs. In this particular case, the following parameters could be retrieved from exposure data intelligence 215: (i) occupancy level 1; (ii) occupancy level 2; (iii) main structure type; (iv) detailed structure type; and (v) design year.

FIGS. 16 and 16*a*-16*c* show exemplary a user interface of the Overpass API (Application Programming Interface). In this case, the system 1 is realized to query all other components of the OSM database (nodes, ways and relations) by their location, geometry, tag and relation with the Overpass API (Application Programming Interface).

FIG. 28 illustrates the use of OSM as a source of portfolio data enrichment from where interesting metadata tags and keys can be fetched (i.e. for the building key, we can find out its type/value, similarly for, the industrial key—the type of industry).

FIG. 29 shows a possible split of the raw portfolio data 215113 into building and low-level risk attributes. The hierarchy explained in FIG. 29 is particularly useful when it is desired to add a new risk to the scheme or perform a lookup/aggregation at a particular level.

FIGS. 30 and 30*a* show a location intelligence engine 2156 of the exposure data intelligence 215. The use and access of the exposure database 2151 can easily be made more user-friendly by implementing the querying of the database accessible over an appropriate user interface as a Web Application, which enables the user to lookup clusters by address and coordinates and browse the corresponding attributes by means of the location intelligence engine 2156 (see FIG. 30).

DETAILED DESCRIPTION OF THE PREFERRED EMBODIMENTS

Figure 1:
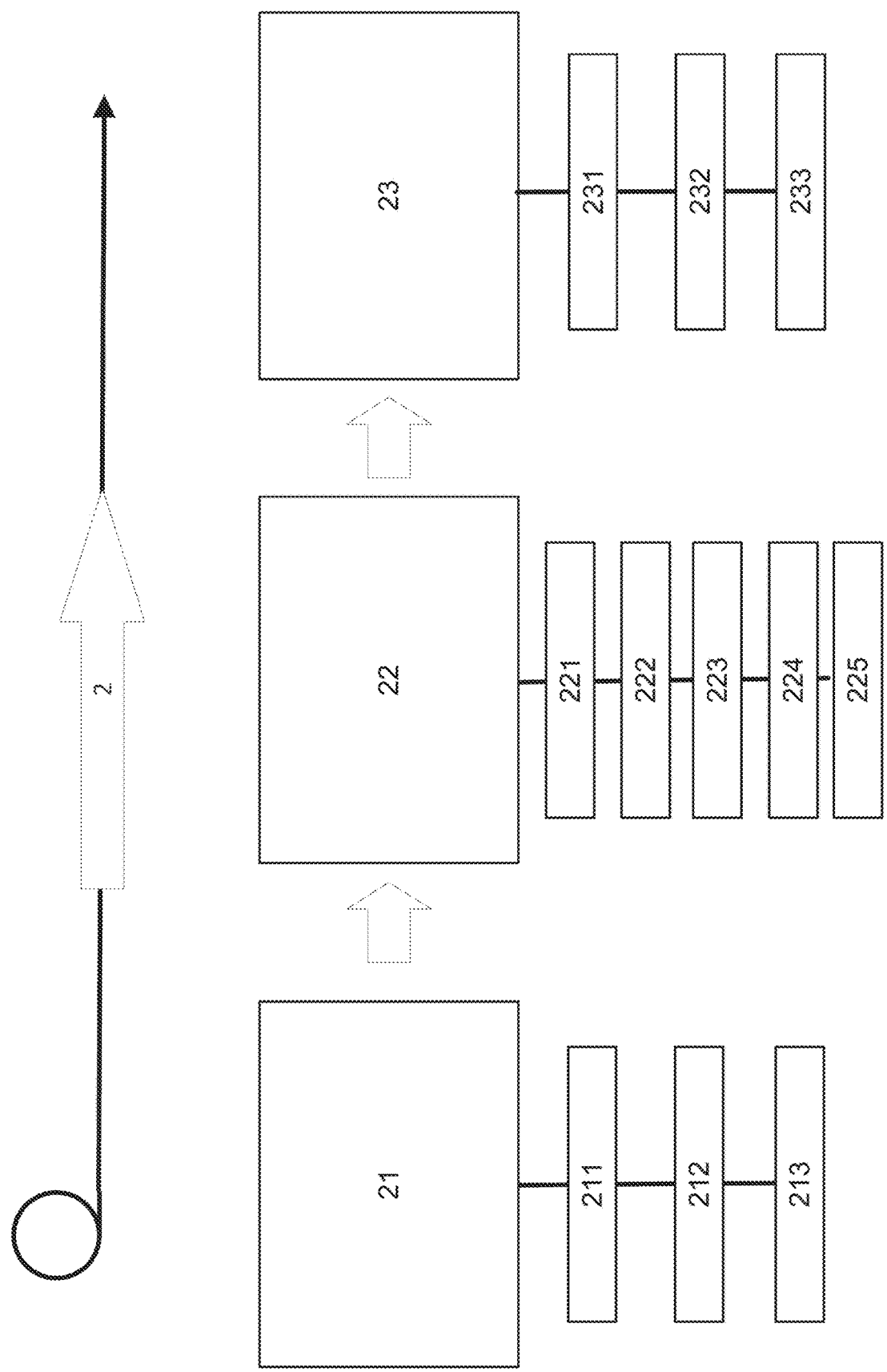
FIG. 1 shows a block diagram, schematically illustrating the automated end-to-end process according to the invention providing an efficient, automated online risk placement, claims and accounting channel for users with a complete electronic solution for automated facultative business structuring. The reference number 2 denotes the automated end-to-end process, 21 the automated underwriting process by means of a rule-based bifurcation process, 211 the creation of a submission, 212 the receiving and binding of a quotation, 213 the modifying and renewing of an acceptances, 22 the technical accounting process, 221 the booking of the premiums, 222 the advising on new claims, 223 the booking and updating of claims, 224 the rectifying of premiums, 225 the submission of a statement of accounts, 23 the financial accounting process, 231 the advising and/or requesting of payments, 232 the seamless pairing, and finally 233 the setting of the accounts. The proposed invention and method provides a fast and easy access to first and secondary risk-transfer underwriting, technical and financial accounting. The invention allows to reduce technical and administrative input and costs for managing mid-market risk-transfer portfolios. It further provides fast accessing and automatic capacity approval for medium-sized single risks or facilities. Finally, the invention allows relieving technical and administration time by providing an easy-to-use and efficient online risk placement, claims and accounting channel for clients, which is available 24×7, is feedable over a management dashboard, and allows the user full control of all risks accounting and claims functions. The invention provides an automated one-stop solution covering the complete end-to-end process for second-tier structure (reinsuring) risk portfolios. The invention allows to implement a consistent underwriting guideline structures for the whole technical process ensuring a consistent reply to the user's risk submissions with full control and transparency of the portfolio.

FIG. 1 to 32 schematically illustrate an architecture for a possible implementation of an embodiment of the inventive digital system and platform 1 respectively method for fast composing, launch and configuration of highly customized second-tier risk-transfer with build-in auditing and monitoring structures. As FIG. 1 shows, the inventive, automated end-to-end process 2 provides an efficient, automated online risk placement, claims and accounting channel for users with a complete electronic solution for automated facultative business structuring.

The digital platform and system 1 provides an automated, multi-channel, end-to-end risk-transfer product configuration process 2 for configuring, launching and processing of customized second-tier risk-transfer structures. Thus, the digital platform and automated risk-transfer configurator 1 allows fast composing, launching and configuration of highly customized secondary risk-transfer structures. An automated risk-transfer product placement is provided by the system 1 as a first online channel comprising a parameter-driven, rule-based underwriting process 21 for creating a portfolio of customized second-tier structures. An automated claim handling 22 is provided by the system 1 as a second online channel, and an automated accounting 23 is provided by the system 1 as a third online channel. The system 1 comprises a product configurator 214 for providing the automated underwriting by means of a rule-based bifurcation process 21. The product configurator 214 comprises at least four structuring blocks, a first structuring block for setting coverage area parameters 2141 of the risk-transfer product, a second structuring block for setting line of business parameters 2142, a third structuring block for setting type of risk-transfer parameters 2143, and a fourth structuring block for setting risk information parameters 2144. For capturing the risk information parameters 2144 the product configurator 214 comprises a machine-based exposure data intelligence 215 enabled to automatically identify unique risks of objects 12 based on a precise location of the objects 12. The system further comprises the metric simulation engine 10 for automated prediction of forward- and backward-looking impact measures 101 based on event parameter values 111 of time-dependent series of occurrences of physical impacting risk-events 11. The occurrences of the physical risk-events 11 are measured based on predefined threshold-values of the event parameters 111 and the impacts of the physical risk-events 11 to a specific asset or object 12 are measured based on impact parameters 112 associated with the asset or object 12. The system 1 comprises a graphical user interface of a portfolio analytics framework 6 providing a dynamic representation 61 of the portfolio structure 14, wherein the metric simulation engine 10 forms an integrated part of the portfolio analytics framework 6. By means of the metric simulation engine 10, the dynamic representation of the portfolio structure 14 provides forward- and backward-looking insights to the user thereby enabling portfolio steering by identification of critical areas of the portfolio 14 and impacts of possible changes to the underwriting before going to launch it in the market.

As an embodiment variant, the digital platform 1 comprises a client rate offering module 7, wherein by means of the client rate offering module 7, the user is enabled to input and offer a rate he is willing to pay, thereby allowing the system to capture insights into the gap between willingness to pay and the costing generated by the digital platform 1.

Machine-Based Exposure Data Intelligence 215

The machine-based exposure data intelligence 215 comprises an exposure database 2151, e.g. based on a SRX+ database scheme, comprising a plurality of data records 21511, . . . , 2151i holding attribute parameter 215111 of properties and/or objects 12, respectively, with assigned geographic location parameters 215112. For example, the exposure database 2151 can be realized as a world-wide centralized geodatabase providing inter alia standard repository for all kind of data, as geographical (longitudinal/latitudinal) data and/or casualty data and/or engineering data (e.g. defining or classifying a particular system (a technical structure, operational parameters, event measuring parameters, project, object, situation, etc.), where a parameter is an element of the system that is useful, or critical, when identifying the system, or when evaluating its performance, status, condition, etc.) and/or marine data etc. In particular, the exposure database 2151 stores pools or portfolios of risk-exposed properties and/or objects 12, where a portfolio of objects 12 is assigned to a specific user. Further, the machine-based exposure data intelligence 215 comprises a EDI engine 2153 (Exposure Data Intelligence engine) providing exposure-based risk modelling and rating, as e.g. Nat Cat modeling. The exposure data intelligence 215 comprises appropriate application programming and graphical user interfaces (API/GUI) or other data interfaces. If the machine-based exposure data intelligence 215 is mainly focused on natural catastrophe (Nat Cat) handling, it can also be denoted as NCEDI (Nat Cat Exposure Data Intelligence). Thus, the EDI engine 2153 can e.g. provide a lookup service access 21531 for users based on the exposure database 2151 and the clustering of the data records 21511, . . . , 2151i, wherein an automated identification of location-specific risks is assessable by a user based on the precise location of the properties and/or objects 12. To provide the automated modelling and rating, the EDI engine 2153 can e.g. comprise a forward-looking modelling module comprising e.g. a natural catastrophe risk modelling structure. The modelling structure can e.g. generate loss distributions for the major perils as seismic events, windstorms and floods geographically in respect to their largest exposure. For the loss measures used, the probabilities and portfolios of economic and insured values can be used to assess the annual expected total and insured losses causes by each peril in a specific year. The modelling scenarios with expected loss estimations can be complemented by data of external sources, as e.g. the United Nations Office for disaster risk reduction's global assessment data. The machine-based exposure data intelligence 215 comprises a clustering module 2152 for clustering stored properties/objects 12 of the exposure database 2151 related to their assigned geographic location parameters 215112. Stored data records 21511, . . . , 2151i of the exposure database 2151 can e.g. covers a vast range of worldwide information and measuring data, including data on countries, states, counties, zip codes and communities as well as global natural hazard measuring data. Different data records 21511, . . . , 2151i of the exposure database 2151 having the same assigned geographic location parameters 215112 are matched and mutual aligned, in case of triggering inconsistencies for data records 21511, . . . , 2151i having the same assigned geographic location parameters 215112.

The machine-based exposure data intelligence 215 can further comprise a user data interface 2154 enabling access via mobile devices 5 to input location data 215112 by a GPS-module 54 or optical sensor and/or camera 55 of the mobile devices 5. The mobile device 5 can e.g. be realized as a smart phone 53. A user can e.g. be enabled to scan for insured properties 12 by means of the mobile devices 5 using data transmission to the digital platform 1 of GPS-module 54 or optical sensor and/or camera 55 data. The machine-based exposure data intelligence 215 can e.g. comprise an cross-level analysis module 2155 providing identification 21551, analysis 21552 and visualization 21553 of large risk pools, wherein a risk pool comprises a plurality of objects 12 of the exposure database 2151, wherein the different levels and channels comprise at least facultative risk-transfer and/or treaty risk-transfer and/or customized corporate direct risk-transfer, and wherein risk of properties/objects 12 are analyzed based on the attributes 215111 and location 215112 at different levels and for different channels allowing for automated tracking of risk accumulation and/or capacity thresholds, The clustering module 2152 of the machine-based exposure data intelligence 215 can e.g. comprises an automated address matching 21521 based on the latitude and longitude coordinates 2151121/2151122 of a location, wherein for the clustering a search is narrowed down to a grid cell 215221 around the property/object 12 of interest to a scale 215222 where two locations 215112 are matchable based just on the house number or other location-dependent attributes. For the clustering, the clustering module 2152 can e.g. use an adaptive cell size and/or shape 215223, depending on the local housing/construction density. Alternatively, for the clustering, the clustering module 215 can also use accessible building footprints to check if latitudinal/longitudinal-tags are enclosed with the footprint of interest, wherein any latitudinal/longitudinal-coordinate 215112 is mapped to a unique building and/or associated to sites.

Figure 12A:
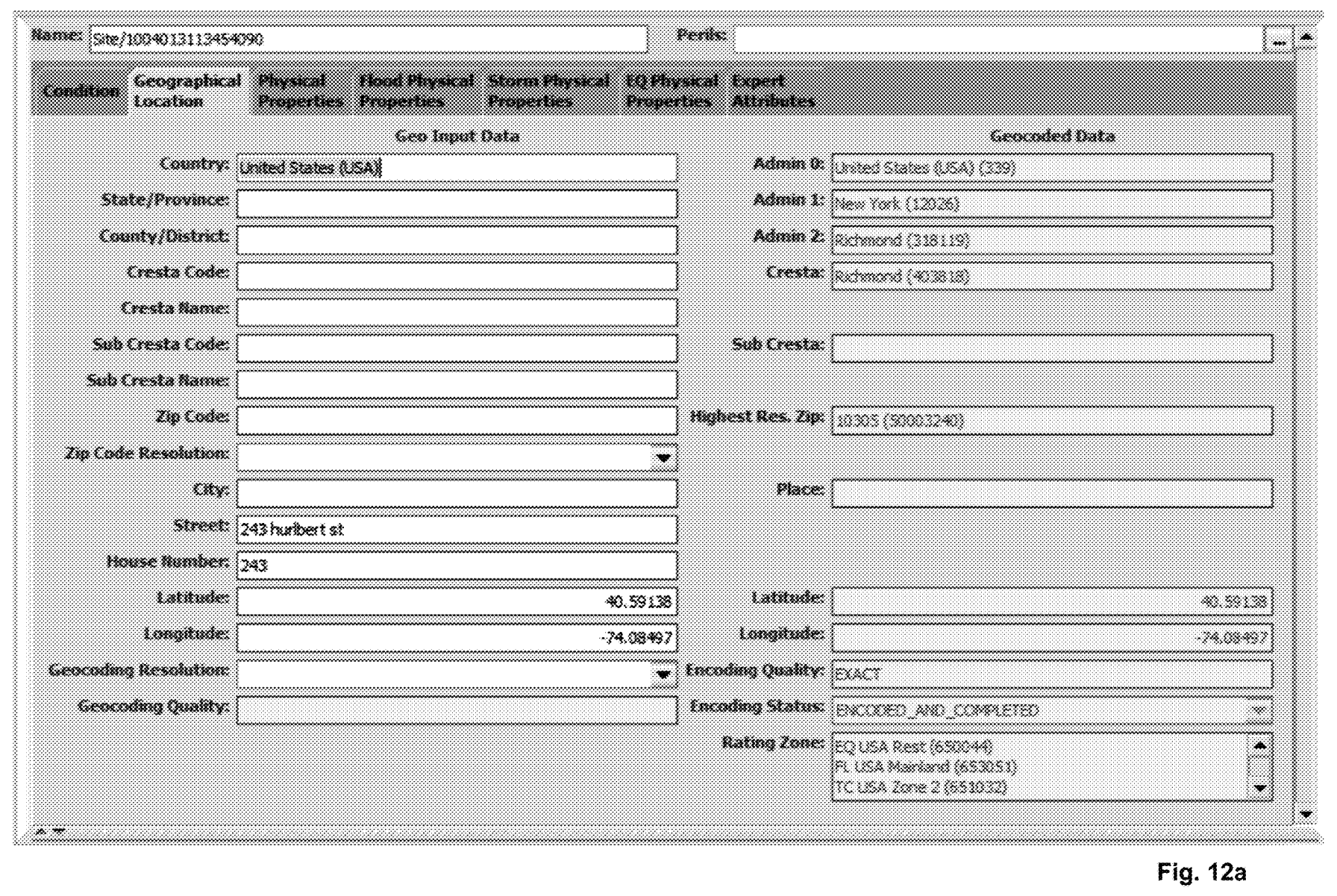
Figure 12B:
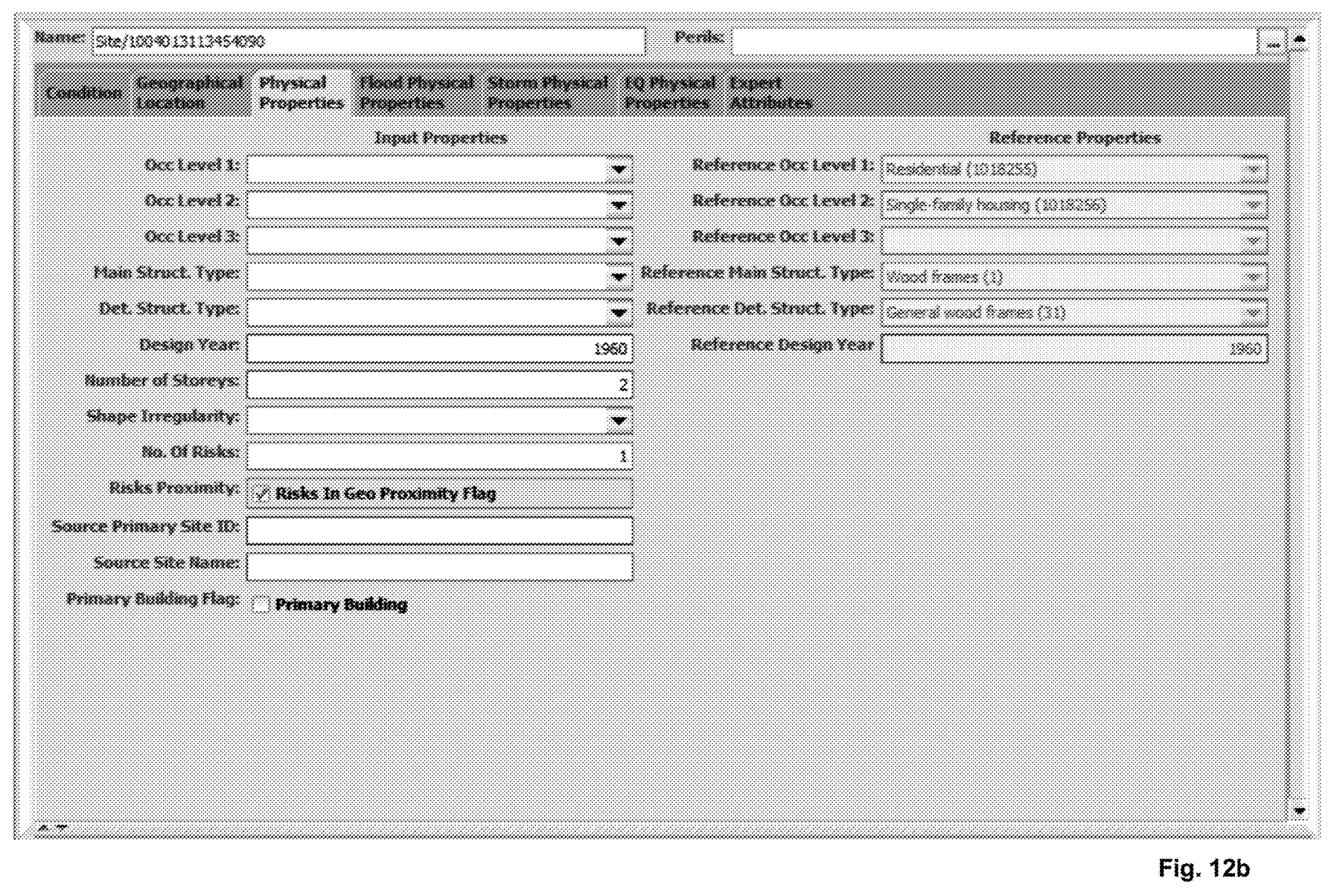

In risk-transfer systems, exposure databases 2151 are typically established over years from client portfolios. Because often contracts are renewed every year for the same property/object 12, it can appear multiple times in the database 2151, but sometimes with different attribute sets. This technically leads to a lookup problem, as there is no unique property identifier. To solve this issue by clustering those properties by location allowing for a lookup service. Further, often the street address, building type and sometimes construction type, roof type and cladding of insured buildings known, i.e. can be retrieved from the data sources. The present invention is able to provide appropriate data enrichment, e.g. by means of the forward-looking modeling module 21532. As example of a U.S. location where street address information can typically capture and where the system 1 can retrieve a virtual look at the property e.g. with Street View (see FIG. 10). For the data enrichment, the present invention combines various heterogenous data sources, as insurance systems' internal data sources, as e.g. the exposure database 2151, and external data sources as the 'GeoFacts' data set from Google to supplement used data for modelling, exemplified for properties and objects 12. If losses are simulated by means of the EDI engine 2153 and/or the forward-looking modeling module 21532 for this example building shown in FIG. 10, once with the minimum attributes, once enriched with the information retrieved from the system 1 and the exposure data intelligence, respectively, the expected loss of the two approaches can be compared. In FIGS. 11a and 11b the ground-up loss is shown, i.e. the loss before insurance conditions apply, where FIG. 11a shows the ground-up loss for the example property 12 rated based on the primary attributes set and FIG. 11b shows the ground-up loss for the example property 12 rated based on the attributes set retrieved from the exposure data intelligence 215 (in FIG. 11b denoted as NCEDI). The data records 21511, . . . , 2151i can e.g. take a format encoding a predefined set of attributes which can take specific values. Those attributes can be grouped into geographical, physical, flood physical, storm physical, earthquake physical properties and expert attributes, as can be seen from FIG. 12a/b, representing e.g. tabs of the forward-looking modelling module 21532. FIG. 12a shows an example location1, screenshots of the data record 21511, . . . , 2151i geographical location tab, showing the geo input and geocoded data. FIG. 12b shows an example location1, screenshots of the data record 21511, . . . , 2151i property data tabs. In this particular case the following parameters could be retrieved from the exposure database 2151: (i) Occupancy level 1, (ii) Occupancy level 2, (iii) Main structure type, (iv) Detailed structure type, and (v) Design year.

During the validation and enrichment process, the exposure data intelligence 215 automatically avoid incorrect entries by users into the exposure database 2151: instead, the system 1 is able to automatically identify unique risks by their precise location. Also, the system 1 allows to map policy ownership from multiple submissions: for example, if Cluster K belongs to user Z in submission X and in submission Y the policy owner is unknown, then this could be looked up via the link back to Cluster K. As an embodiment variant in the technological field of smart homes, the system 1 provides a data interface, allowing users to get/buy risk-transfer directly from an App and profit from adequate rates through the integration of their IoT data into the exposure database 2151. The system 1 allows to provide a user access, which is as simple as enabling the user to use a smartphone (with GPS, and camera capabilities) to determine the precise location and scan their insured items. This can e.g. involve building a risk index for properties to get better loss estimates.

As an further embodiment variant, the exposure data intelligence 215 (NECDI) allows to create a property location network providing the identification, analysis and visualization of global risk pools. It can e.g. be used as a foundation for analysis of risk by attributes and location at different levels (clustering) and allows for better tracking of risk accumulation and capacity: for example, same risks can be ceded to a second-tier risk-transfer system, i.e. a reinsurance system, through multiple channels: via facultative, treaty reinsurance business or via corporate, customized direct solution risk-transfer/insurance. Being enable, by the system 1, to track each risk from different sources allows technically to track the reinsurance systems capacity on a risk. For example, when capacity is calculated for a given building, and by predefined rules or boundary condition parameters the reinsurance system does not want to take a higher capacity than 100 M, the reinsurance system must be able to look up whether it is participating on other risks in the same building and adjust the exposure so that the reinsurance system does not exceed its predefined capacity limit.

Figure 13A:
FIGS. 13a and 13b show views, in particular a StreetView in FIG. 13a, and a satellite view in FIG. 13b, of the locations belonging to the same street address. Both buildings are mapped to same address. In this case, a majority voting would not lead to the desired result, unless a better clustering logic gets implemented. A possible solution would be to take all available attributes from all records clustered into account for matching.
Figure 13B:
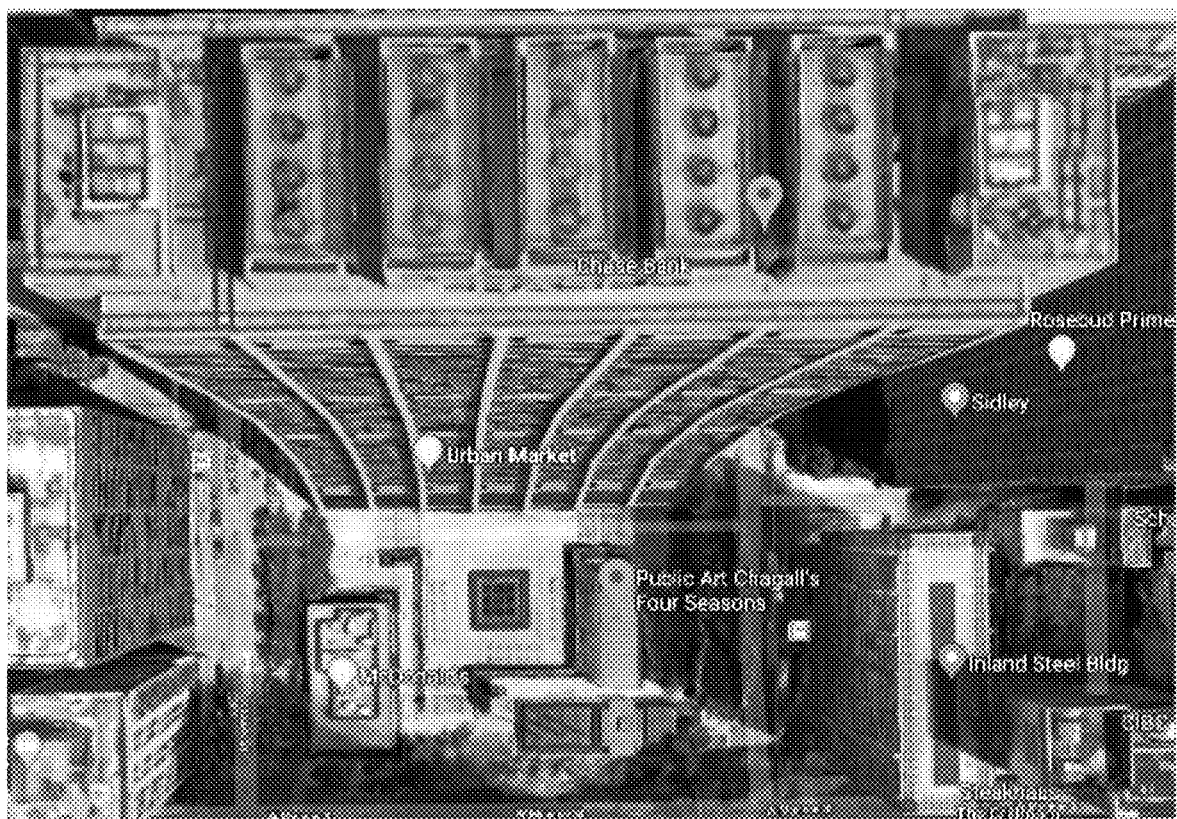
Figure 14A:
FIGS. 14a and 14b illustrate the technical matching problem of two locations based on their Latitude and Longitude coordinates, where the matching can be an efficient preprocessing/refining step for address matching, essentially because it allows to overcome address formatting issues: once the search is narrowed down to a grid cell 215221 around the property/object 12 of interest, one can match the two locations 215112 based just on the house number or other attributes. The technical problem arises when choosing the size 215222 of the search cell 215221. Often, it turns out to be not big enough to enclose both [Lat, Lon] tags, this is especially true when matching large properties with large parcels of land, for example: 3860 W Peterson Ave, Chicago, IL 60603, USA (StreetView on FIG. 14*b*; satellite view on FIG. 14*a*).
Figure 14B:
Figure 15:
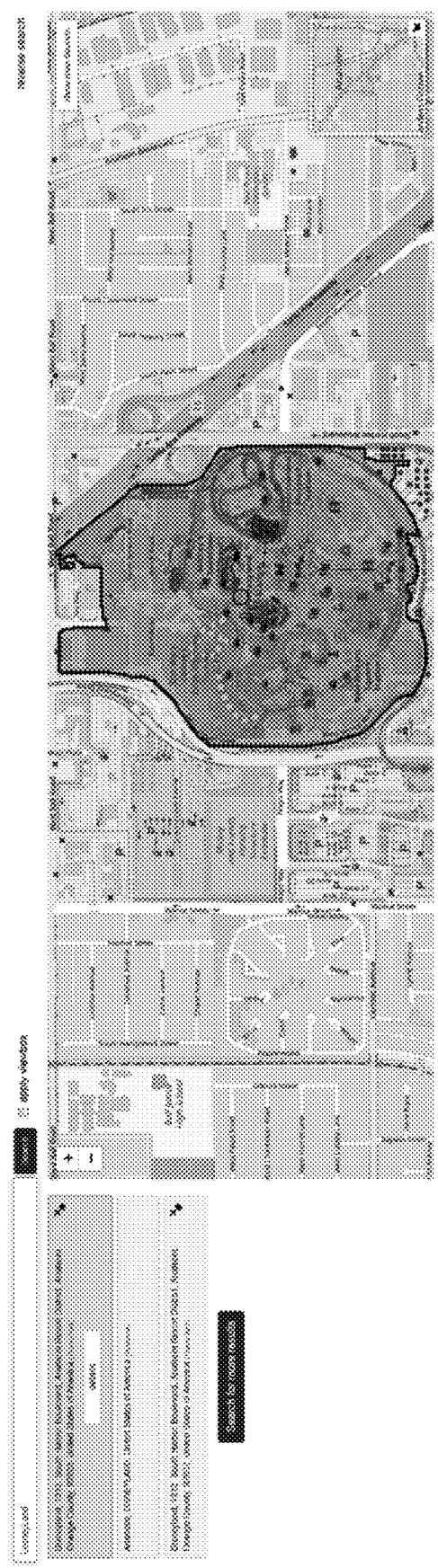
FIG. 15 shows exemplarily the system 1's integrated OSM's (OpenStreetMap) default geocoding processing module 216 by means of its interface, which allows for forward and reverse geocoding at different levels (Building/Street/District/Suburb/County/State . . . ). It makes use of NLP for its address standardization and can perform house number interpolation when it is not available by default. For example, in the US, a good coverage for house numbers and roads is obtained from the Topologically Integrated Geographic Encoding and Referencing system (TIGER) data, produced by the US Census Bureau.

Regarding the portfolio data clean-up and location validation process of the exposure data intelligence 215, it was discussed above that items returned from exposure database 2151 and the exposure data intelligence 215, respectively, may not have a precise location assigned, either through [Lat, Lon] or address (i.e. markers set on roads or parking lots instead of the actual property). This can, e.g., be due to either human error during input or due to inaccurate/inconsistent geocoding. The difficulty of validating geo-data can e.g. be demonstrated on the following examples:

(A) Street address validation problem: In FIG. 13, for both buildings the street address is: 10 S Dearborn St, Chicago, IL 60603, USA (StreetView on FIG. 13a; satellite view on FIG. 13b): (i) Chase Bank tower, (ii) Public Art Chagall's Four Seasons. The technical issue here is, that two buildings are mapped to same address (see FIGS. 13a/b showing satellite views of the locations belonging to the same street address). Thus, (i) GeoFacts returns Chase Bank tower with 74 floors, (ii)

the clustering by the clustering module 2152 (by majority voting) returns Public Art Gallery with 1 floor, and (iii) the exposure database 2151 only returns the occupancy level, i.e. either 'commercial building>30 floors (?)', or 'art gallery (?)'. The technical problem is that the public art gallery appears more often in the exposure database 2151 than the Chase Bank tower. In this case, a majority voting (i.e. when the attribute values that show up most often for a given cluster are chosen as the significant and most representative for the whole cluster) does not lead to the desired result, unless a better clustering logic is used. As solution, the system 1 takes all available attributes from all records clustered into account for matching and receives the correct result.

(B) [Lat, Lon] validation problem: Matching two locations based on their Latitude and Longitude coordinates can be an efficient preprocessing/refining step for address matching, essentially because it allows to overcome address formatting issues: once the search is narrowed down to a grid cell 215221 around the property/object 12 of interest, one can match the two locations 215112 based just on the house number or other attributes. The technical problem arises when choosing the size 215222 of the search cell 215221. Often, it turns out to be not big enough to enclose both [Lat, Lon] tags, this is especially true when matching large properties with large parcels of land, for example: 3860 W Peterson Ave, Chicago, IL 60603, USA (Street-View on FIG. 14b; satellite view on FIG. 14a): (i) Felician Sisters Convent, (ii) Church/religious building, (iii) huge property. The technical issue is that Lat/Lon might be mapped to (i) mailbox on the road or (ii) actual building 100 m away. As an embodiment variant, the system 1 uses an adaptive cell size and shape 215223, depending on the measured local housing/construction density. As another variant, the system 1 use available building footprints to check if the [Lat, Lon] tags are enclosed with the footprint of interest. In fact, this has the technical advantage allowing to map any [Lat, Lon] coordinate to a unique building and associate them to sites (if useful, e.g. for industrial sites). Note, that these are just two example, but they may be representative for many locations in the exposer database 2151. They show the technical need to curate, validate and pre-process portfolio data prior to clustering. In summary, the technical improvements by the system 1 and the exposure data intelligence 215 related to the content of the exposure database 2151 can be categorized as follows: (i) clean up and deduplication of raw location data, (ii) re-geocoding of location data, (iii) Improvement of clustering hierarchy and logic, and (iv) visualization of the data of the exposure database 2151 in a WebApp or in another graphical user interface.

Regarding the technical validation of the location data 215112, the large size and continuous growth of the portfolio database make it technically non-trivial to keep it organized, accurate and efficient to query. Curation of initial data is technically absolutely crucial. To validate this initial data, the system 1 proposes to setup and implement a new geocoding service process, different parsing algorithms for the raw data and appropriate visualization tools to view the results.

The present system 1 has inter alia advantage that, for example, files containing corrupted lines, as e.g. having more entries than the number of header columns (perhaps related to wrong special character escaping) are automatically omitted. Other entries e.g. have to be de-duplicated etc.

Thus, a smart deduplication of records is achieved by the system 1. In addition, a validation is also processed by the system 1, though the validation of millions of locations is technically not a straightforward task. For such large amounts of data, it is often technically not reasonable to use external data sources, as current geocoding providers (Google). Thus, bulk geocoding requires integrated solutions and geocoding technics and servers. The present invention technically uses a bulk Geocoding approach based on OpenStreetMap. Thus, the system 1 sets up its own geoserver based on OpenStreetMap (OSM) data, which brings the following benefits: (i) It is free, open source, runs locally and has no query limits, (ii) It's database is frequently updated and growing steadily, (iii) it includes data from many publicly available, global and local sources (Government, Wikipedia, etc.) as well as contributions from users, (iv) it provides a forward and reverse geocoding solution, (v) it supports advanced query logic with 1000s of location features (tags), (vi) it technically allows to query points, polygons and relations. At this point, it is important to mention, that the present system 1 can be easily integrated in other technical solutions.

As an embodiment variant, the system 1 uses an integrated OSM's (OpenStreetMap) default geocoding processing module 216 and interface (see FIG. 15), which allows for forward and reverse geocoding at different levels (Building/Street/District/Suburb/County/State . . . ). Also, the variant makes use of NLP for its address standardization and can perform house number interpolation when it is not available by default. In the US, a good coverage for house numbers and roads can e.g. be obtained from, for example, the Topologically Integrated Geographic Encoding and Referencing system (TIGER) data, produced by the US Census Bureau.

Figure 16:
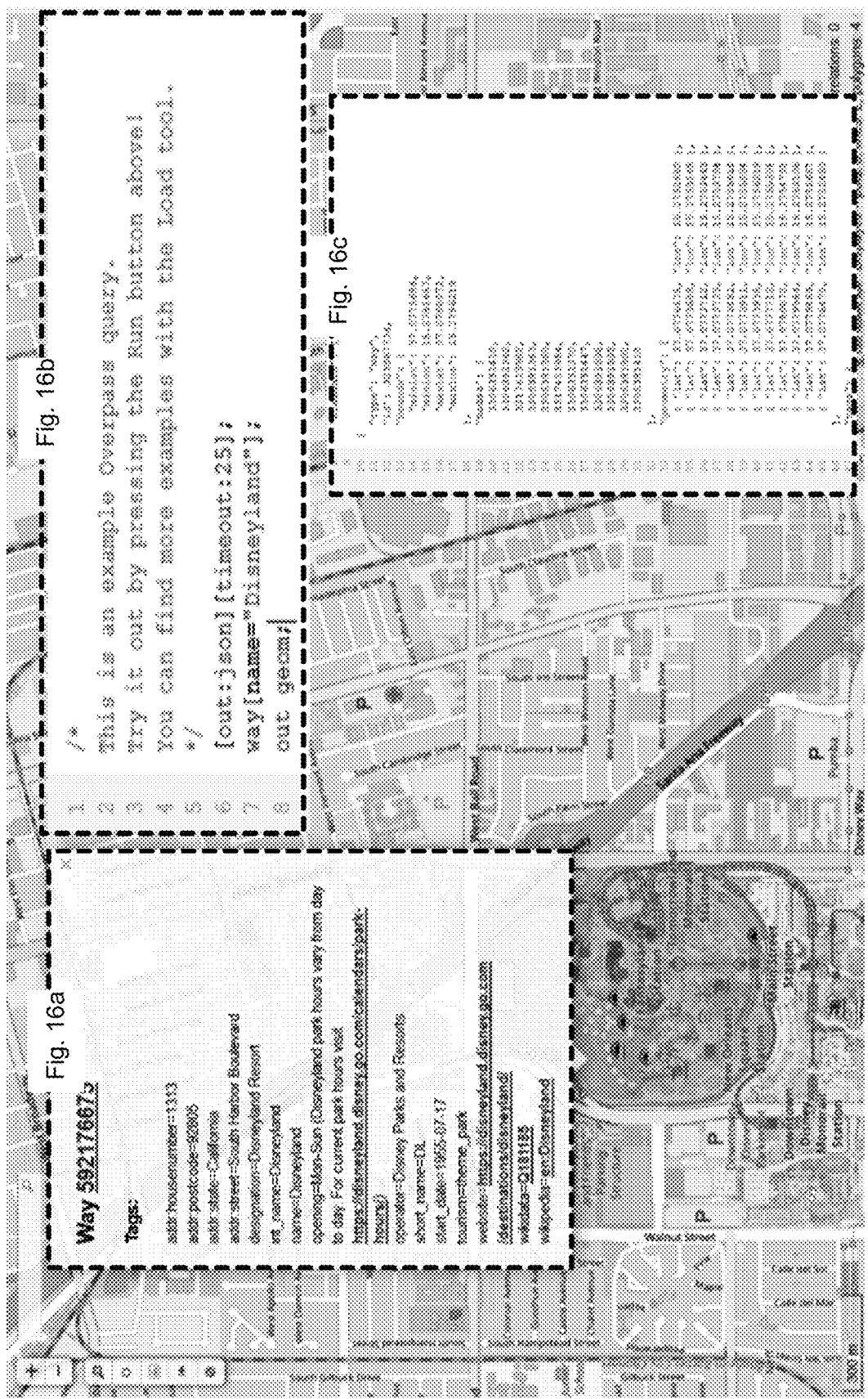

The system 1 can be realized and designed to deal with only address-related queries, however, as a variant, it can e.g. also be realized to query all other components of the OSM database (nodes, ways and relations) by their location, geometry, tag and relation with the Overpass API (Application Programming Interface). FIG. 16 shows exemplarily a user interface of the Overpass query. The Overpass API can provide a variety of search possibilities, i.e. querying. The results of the searches or queries can be displayed directly on a map, but it is also possible to retrieve only the data. The Overpass API is realized as a read-only API that serves up custom selected parts of the OSM map data. It acts as a database over the web: the system 1 sends a query to the API and gets back the data set that corresponds to the query. The Overpass API provides optimized access for the system 1 that in many cases need a few elements, both selected by search criteria like e.g. location, type of objects, tag properties, proximity, or combinations of them. Thus, the Overpass API acts to the system 1 as a database backend for various data retrievals.

Figure 17:
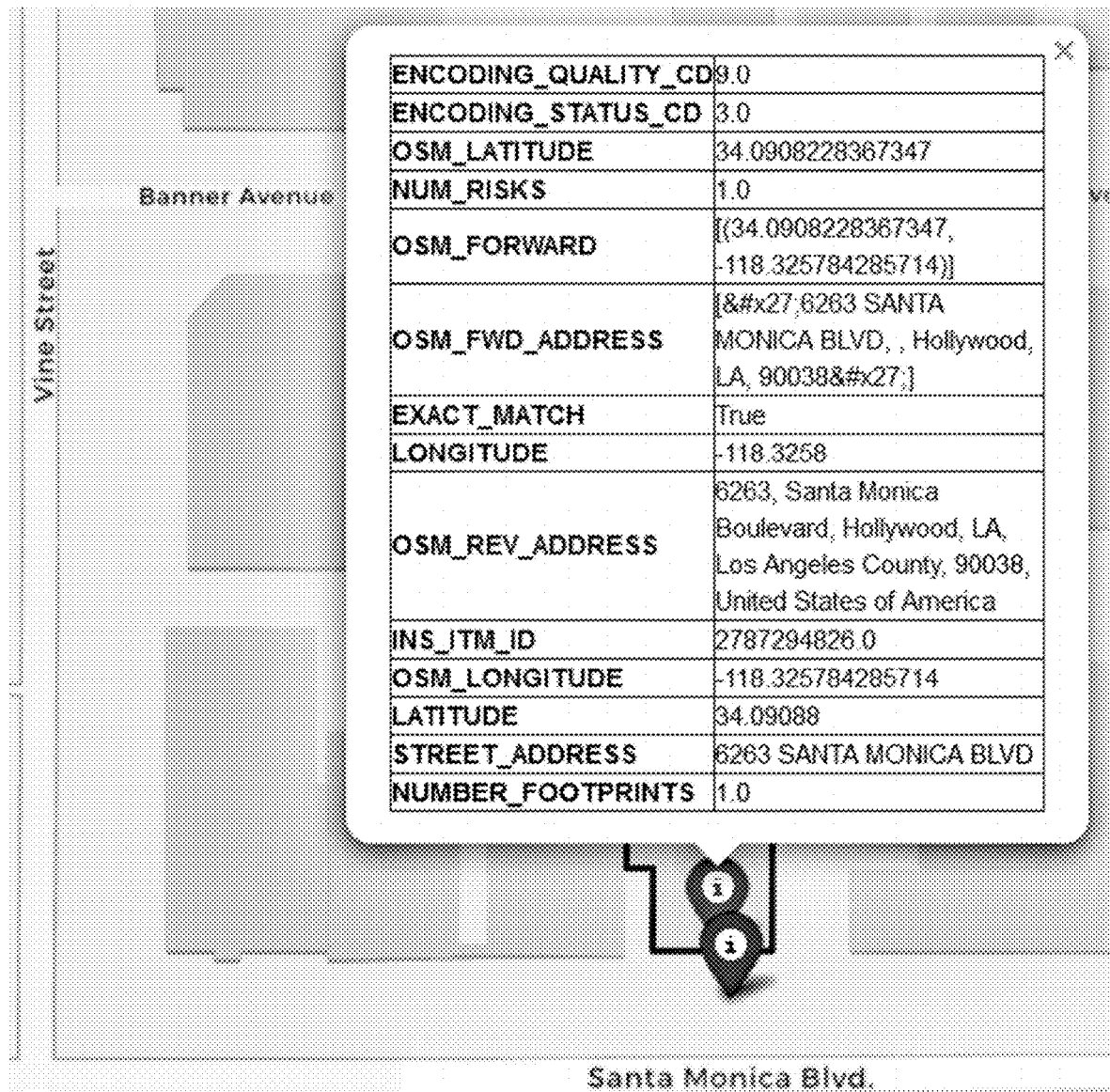
FIG. 17 and FIGS. 18*a*-18*c* show an example of 3-way validation of the raw portfolio data 215113: (a) Raw portfolio data 215113 address yields OSM [Lat, Lon], (b) Raw portfolio data 215113 [Lat, Lon] to OSM (Rev) Address; and (c) Coordinates matched with Footprint. In the example of FIG. 18, the footprint-matching is visualized on the map. This is an example where the coordinate marker is just "close enough" to the correct building.
Figure 18A:
Figure 18B:
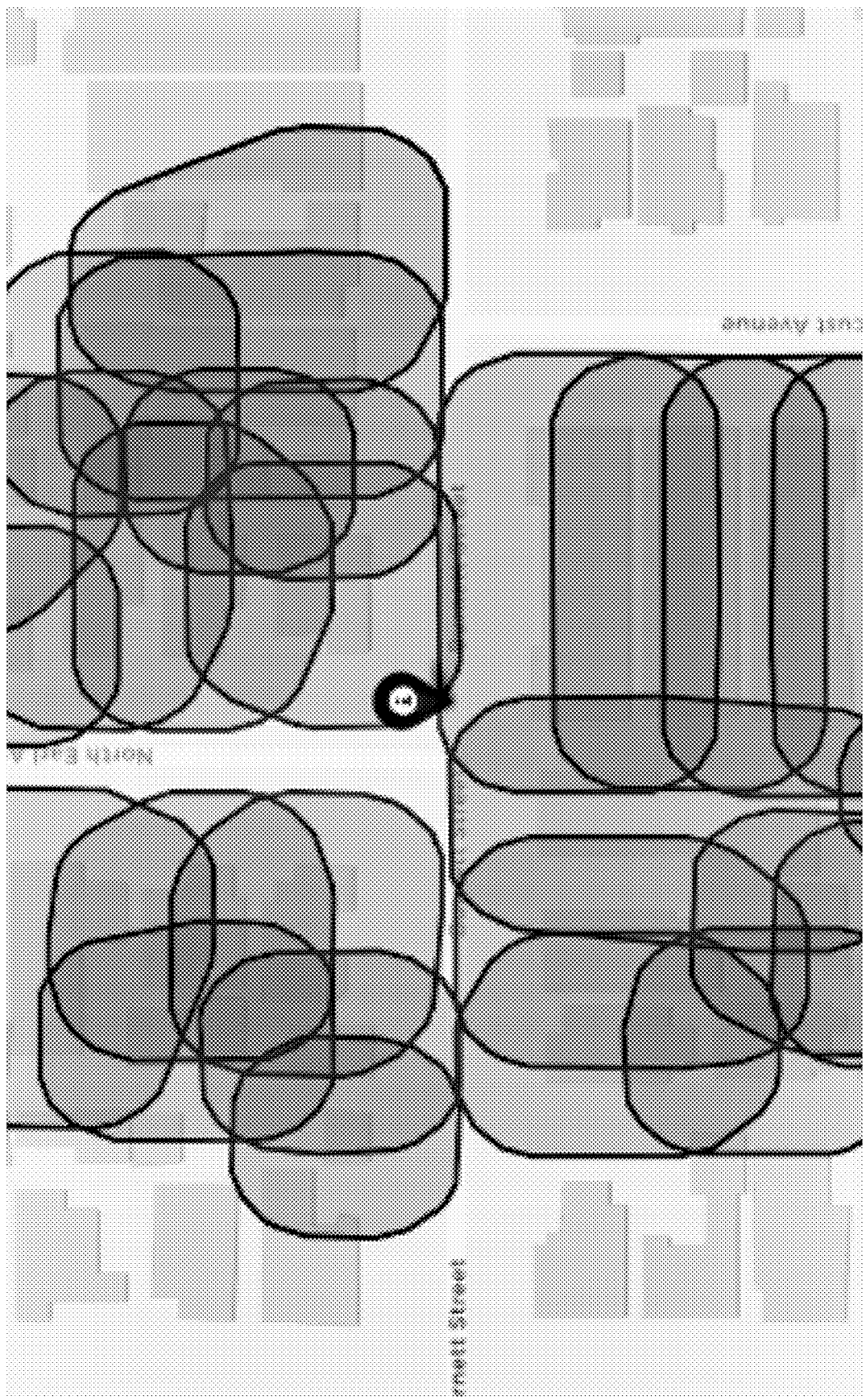
Figure 18C:
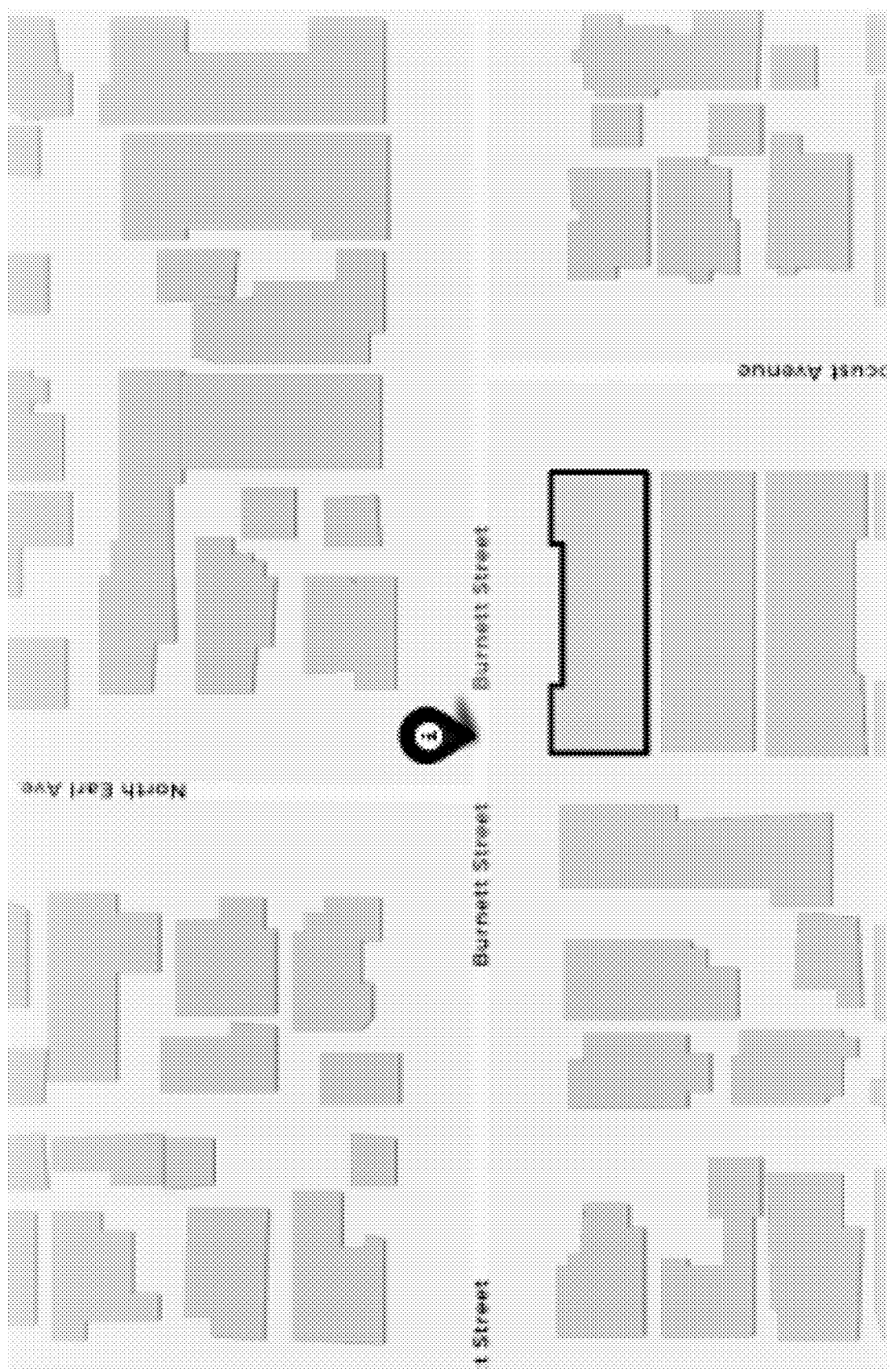
Figure 19:
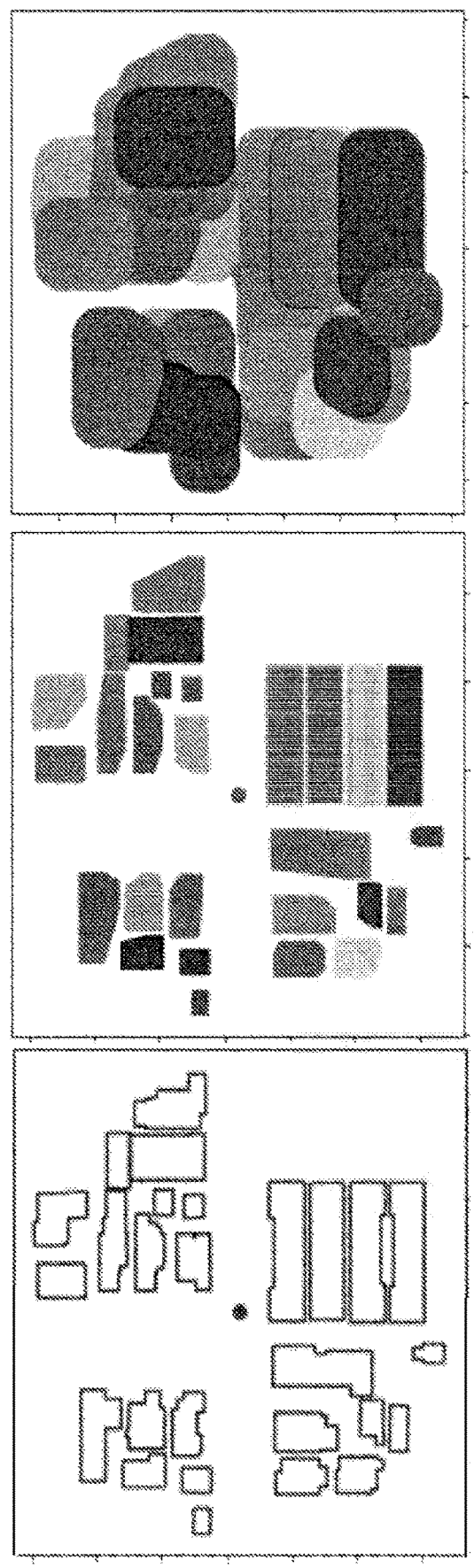
FIG. 19 shows exemplarily the matching of coordinates to an OSM footprint. In this step, the system 1 determines if any of the found locations belonged to a building footprint. Queries are constructed with a modified overpass python module. In the first step (I), all building footprints were retrieved within a certain grid cell, e.g. a 100 m radius of the raw portfolio data coordinates 215113 with an overpass query (all ways and relations having the tag 'building'). The retrieved geometries were processed with the GeoPandas and Shapely libraries. GeoPandas extends the datatypes used by Pandas to allow spatial operations on geometric types. Geometric operations can e.g. be performed by Shapely. GeoPandas further depends on Fiona for file access and Descartes and Matplotlib for plotting.) for the calculation of the convex hull of each footprint, to simplify the shapes. (II) The algorithm can then perform a point-in-polygon search for both, the raw portfolio data coordinates pair 215113 & OSM coordinates in all the obtained shapes. If the first search returns only one polygon, the match is labeled as 'exact'. Else, all matches are returned without the 'exact' label. In case of no match, a buffer is added to all shapes and the search is repeated. (III) If no match is found, the buffer is increased, and the search is repeated. To keep track of uncertainty, the size of the buffer is returned with each match (see FIG. 19 steps I-III).

The system 1 can e.g. comprise a 3-way validation of locations (see FIG. 17). Herein, by validation of locations, the verification of street address and coordinates is understood. This consists in the following steps:

(a) Raw portfolio data address 215113→OSM [Lat, Lon]: Determining the coordinates belonging to a raw portfolio data address 215113. This can e.g. be realized by using a GeoPy module (GeoPy is a Python 2 and 3 client applicable to several geocoding data services. GeoPy allows for Python developers to locate the coordinates of addresses, cities, countries, and landmarks across the globe using third-party geocoders and other data sources.) with the local geocoding processing endpoint and some custom scripts. It is important to notice that this step may require a smart preprocessing of the address stored in raw portfolio data 215113, because: (1) The street address was not standardized, it included information about street name, house number and apartment, but not the city, district or postcode. This issue can technically be solved by standardizing the address with an address module, e.g. an address python module, to keep or filter only the street and house number. The geocoding results were refined by including the postcode, suburb, district and city attributes that can be resolved from reverse geocoding, discussed below. (2) It contains addresses with house number ranges (i.e. 1201-1223), which technically must be disaggregated into a list of individual addresses and which results in a list of coordinates. This disaggregation step helps to determine the corresponding building footprints which is in turn necessary to build building-level clusters.

(b) Raw portfolio data [Lat, Lon] 215113→OSM Address: Matching a raw portfolio data coordinate pair 215113 to an address in the OSM database. This can e.g. also be realized using GeoPy. However, this step is typically less useful: The main technical issue here is house number interpolation, which sometimes does not yield correct results. Furthermore, the data processing returns POIs (Person Of Interest) instead of addresses, if the query is close enough.

(c) All obtained [Lat, Lon]→OSM Footprint: Matching coordinates to an OSM footprint. In this step, the system 1 determines if any of the found locations belonged to a building footprint. Queries are constructed with a modified overpass python module. In the first step (I), all building footprints were retrieved within a certain grid cell, e.g. a 100 m radius of the raw portfolio data coordinates 215113 with an overpass query (all ways and relations having the tag 'building'). The retrieved geometries were processed with the GeoPandas and Shapely libraries (GeoPandas allows working with geospatial data in python. GeoPandas extends the datatypes used by Pandas to allow spatial operations on geometric types. Geometric operations can e.g. be performed by Shapely. GeoPandas further depends on Fiona for file access and Descartes and Matplotlib for plotting.) for the calculation of the convex hull of each footprint, to simplify the shapes. (II) The algorithm can then perform a point-in-polygon search for both, the raw portfolio data coordinates pair 215113 & OSM coordinates in all the obtained shapes. If the first search returns only one polygon, the match is labeled as 'exact'. Else, all matches are returned without the 'exact' label. In case of no match, a buffer is added to all shapes and the search is repeated. (III) If no match is found, the buffer is increased, and the search is repeated. To keep track of uncertainty, the size of the buffer is returned with each match (see FIG. 19 steps I-III).

Figure 20:
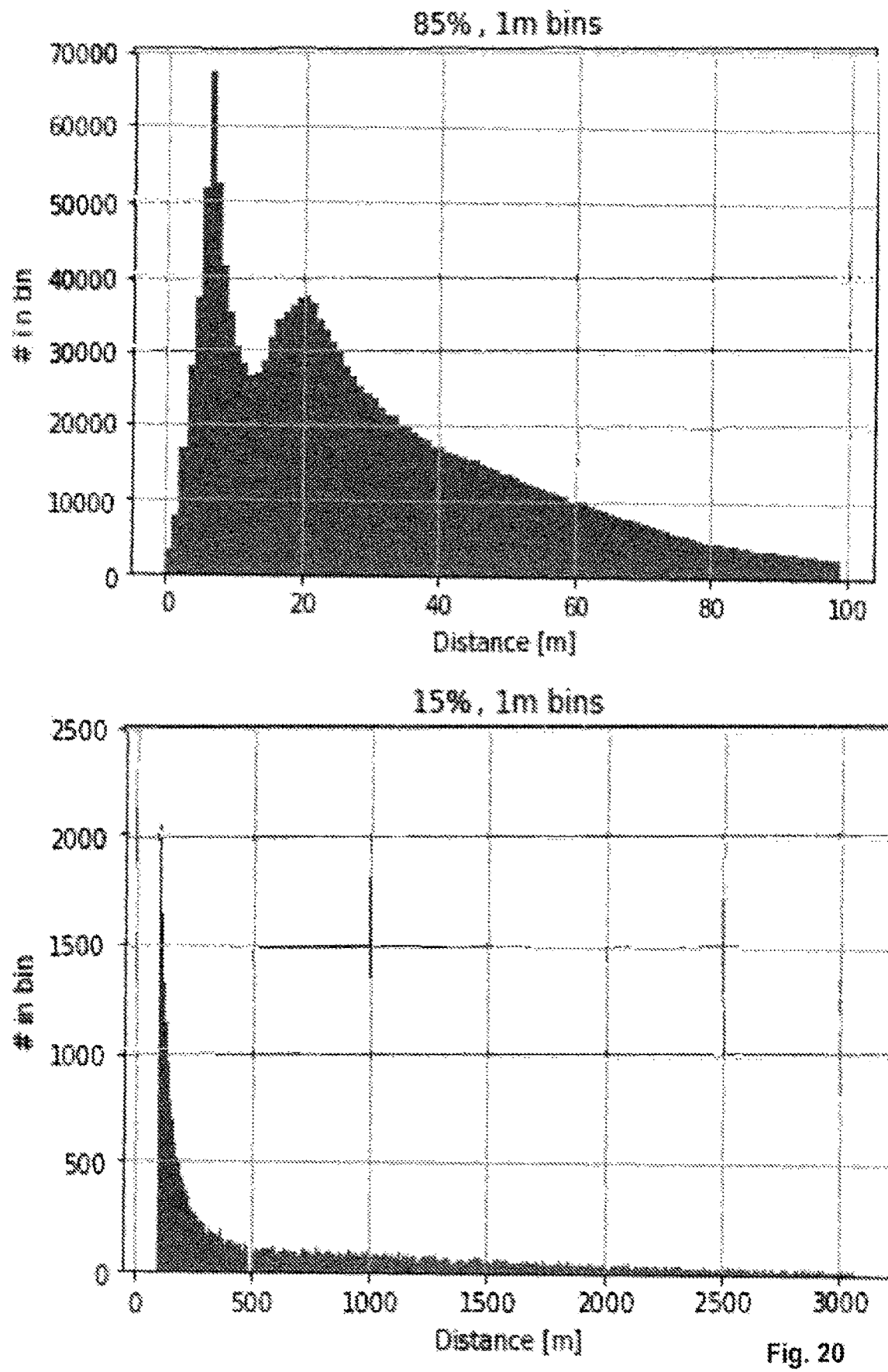
FIG. 20 shows exemplarily two schematic histograms, with an upper histogram of distance-errors between raw portfolio data coordinates pair 215113 and OSM coordinates in the 100 m range. 85% of the geocoding results fall in this range. The lower histogram shows a histogram of distance-errors for distances greater than 100 m, representing 15% of the results.
Figure 21:
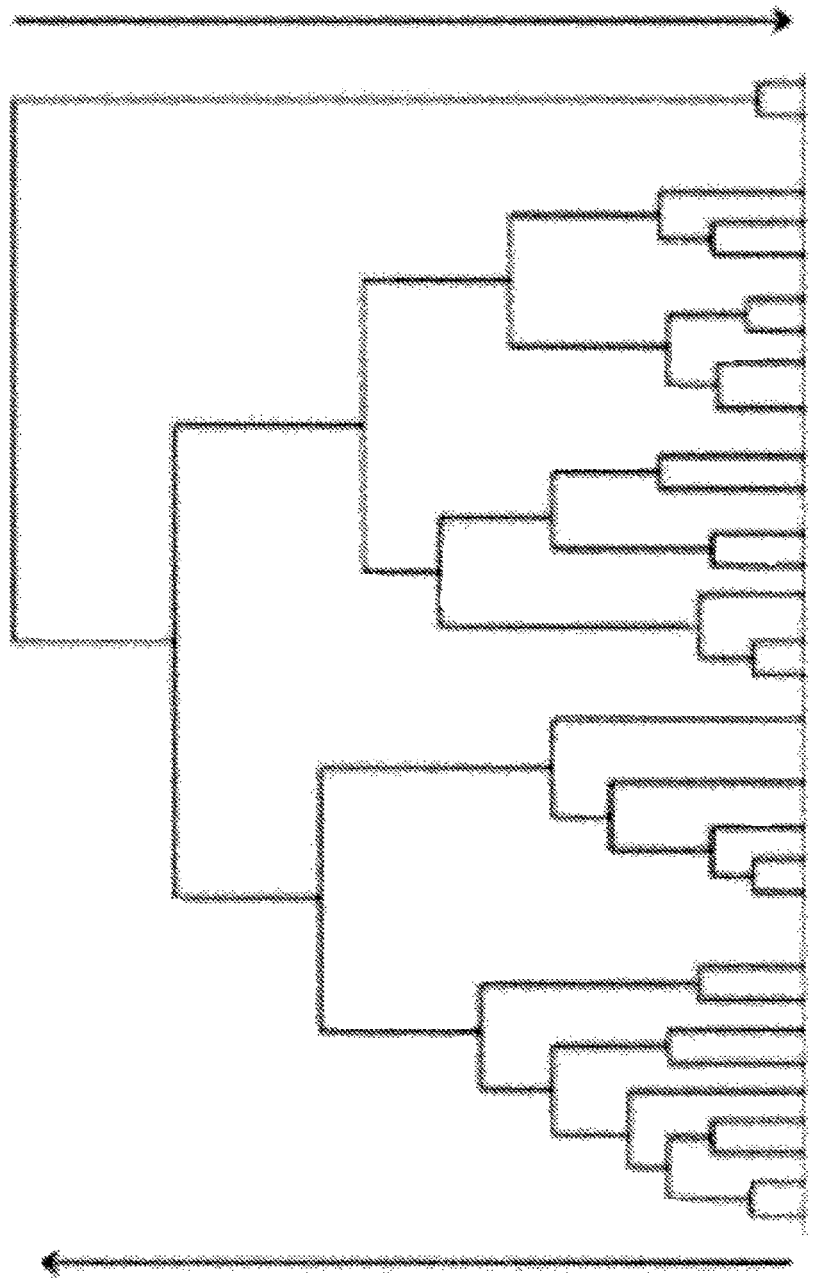
FIG. 21 illustrates a generic cluster dendrogram visualizing agglomerative and divisive clustering.

The system 1 provides significant improved technical processing and results compared to the prior art systems: a) For example for forward Geocoding looking at an sample of 4'017'430 unique raw portfolio data records 215113, only 2'664'826 supplied an address, and only 1'947'876 raw portfolio data addresses 215113 could be geocoded. The obtained coordinates can e.g. be compared against the raw portfolio data coordinates 215113 by calculating the geodesic distance between the two points. After 99% outlier filtering, the results were assigned to 1 m bins and counted. The obtained histograms can be seen in FIG. 20. It can be noticed that 85% of the distances lie in a 100 m range, with two distinct peaks at 10 m and 20 m. These peaks may correlate with the distribution of the building size corresponding to each location: OSM geocoding returns locations close to the street, whereas the raw portfolio data coordinates 215113 usually represent the centroid/point within a building. Thus, the distance-error would be small for smaller buildings and large for larger buildings. The obtained distances can be used as a confidence metric. FIG. 20 shows exemplarily two schematic histograms, with an upper histogram of distance-errors between raw portfolio data coordinates pair 215113 and OSM coordinates in the 100 m range. 85% of the geocoding results fall in this range. The lower histogram shows a histogram of distance-errors for distances greater than 100 m, representing 15% of the results.

b) Regarding the reverse Geocoding, the following technical results can exemplary be given: All raw portfolio data entries 215113 can be geocoded to an OSM address by the system 1, because every record contains by definition a coordinate pair. However, the obtained results have varying accuracy: 74% of addresses could be resolved up to a house number, however only 5% matched with the RATOS entry (when available). This is because the system 1 relies on house number interpolation, when it is not specified in the address. This additional street address information can, inter alia, be used for enrichment when no other source is available (70% street names matched with the raw portfolio data 215113 street name). c) Regarding the matched footprints, the following technical results can exemplary be given: The footprint matching was exemplarily performed by the system 1 for 4'017'430 records. The system 1 showed a measured performance, in that 99% of the raw portfolio data 215113 entries could be matched to one or multiple building footprints. The following was measured: (i) more than 50% matched with 100% confidence, (ii) roughly 90% matched with 5 m tolerance, and (iii) about 85% matched with exactly one building. Furthermore, the 4M rows could be assigned by the system 1 to 1'692'538 unique buildings in this example performance, when considering only raw portfolio data 215113 coordinates, which proves that the building-level clustering can technically be achieved with the present inventive system 1. Additional matching with OSM coordinates can be used for higher-confidence results. For example, from the above results, one can conclude that 395'622 of those buildings (row-wise intersection set) are very likely to belong to the corresponding raw portfolio data 215113 locations.

Figure 22:
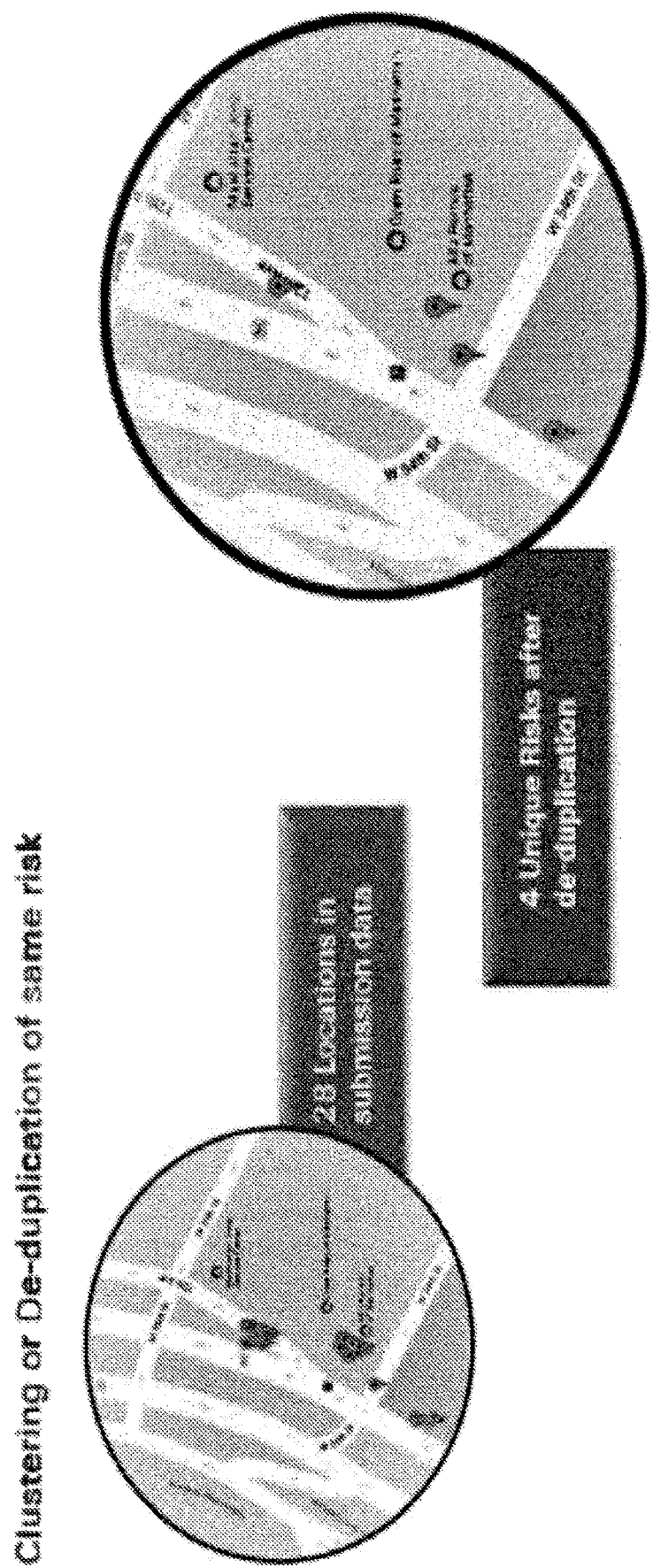
FIG. 22 illustrates the original purpose of clustering: deduplication of raw portfolio data 215113 records 21511, . . . , 2151*i*.
Figure 23:
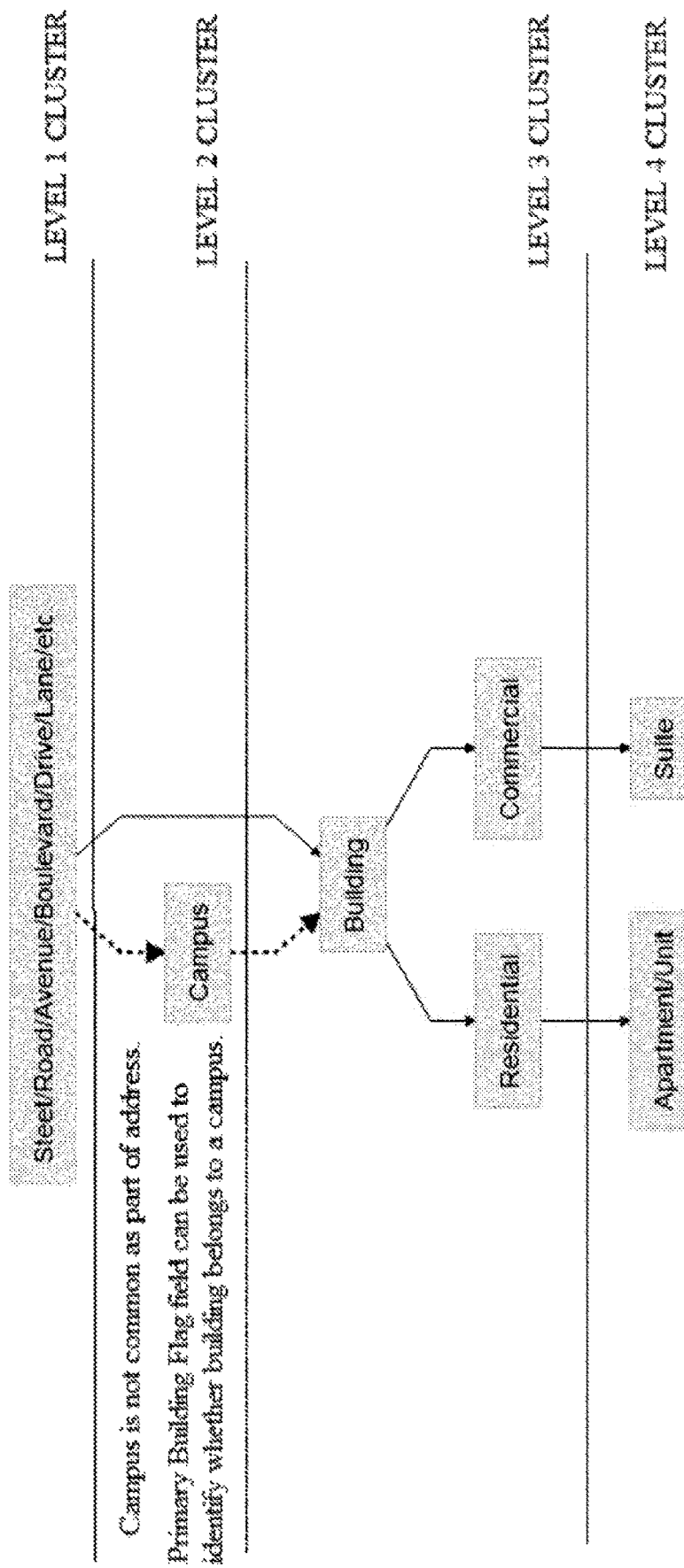
FIG. 23 illustrates one of the proposed clustering hierarchies with streets at root level.
Figure 24:
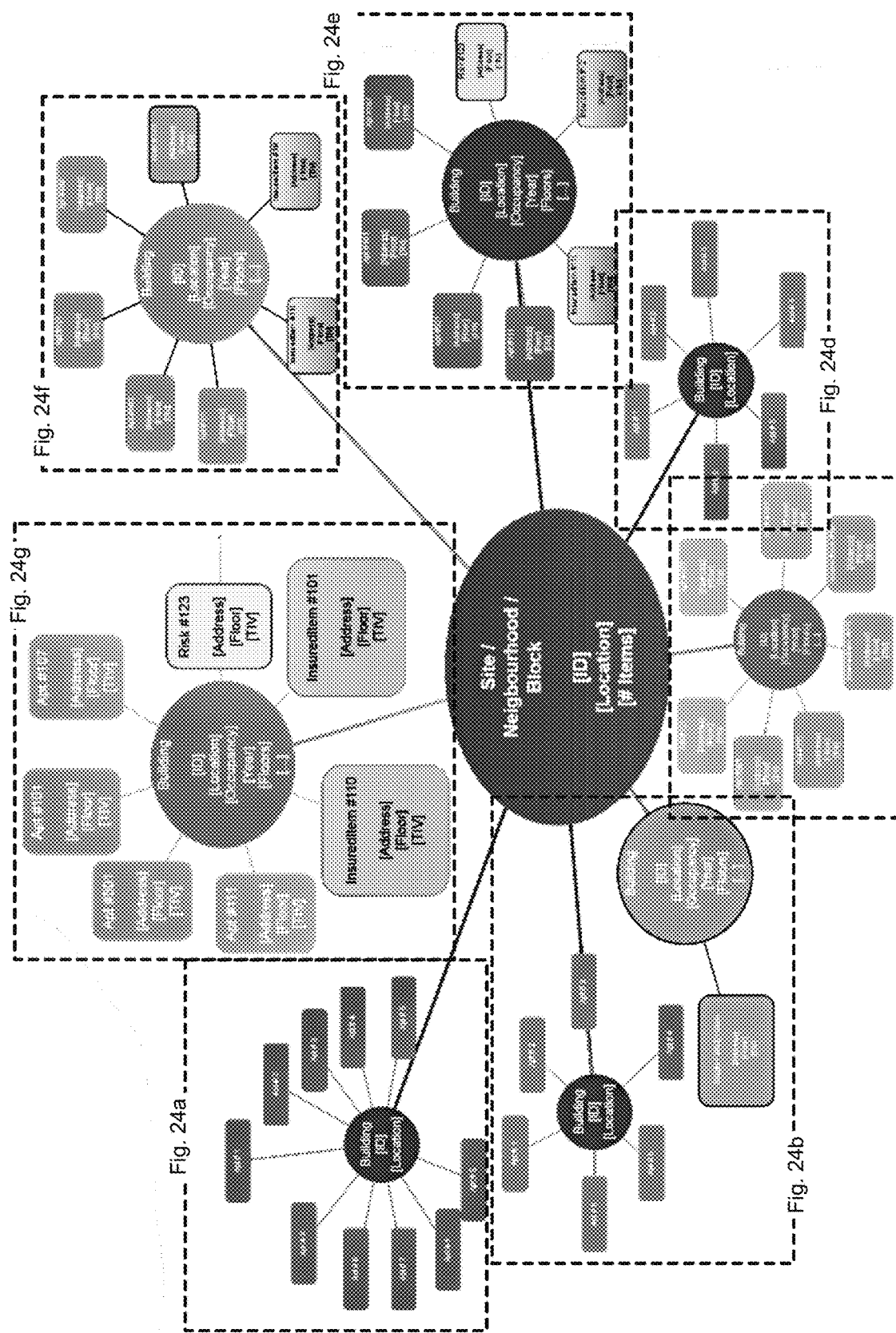
FIGS. 24 and 24*a*-24*g* shows an exemplary clustering hierarchy with site at root level. Clusters defined by their geometry at different levels→clusters can't be confused, no chance for duplicates. The applied "Top-down Divisive Clustering" approach can e.g. be visualized the diagram of FIG. 24. In this approach the granularity increases with the addition of each cluster-nodes (before adding a cluster, its parent must be known), so that it resembles a 'top-down' approach. At root level, there are site-, neighborhood- or block-clusters, which are formed by road intersections. The next level of clusters is formed by individual buildings inside the root cluster. On the lowest level, there are individual risks/insured items with a defined [Lat, Lon] and address, which can be essentially seen as de-duplicated raw portfolio data 215113 records 21511, . . . , 2151*i*. The diagram of FIG. 24 also shows examples of meaningful cluster attributes for each level.
Figure 24A:
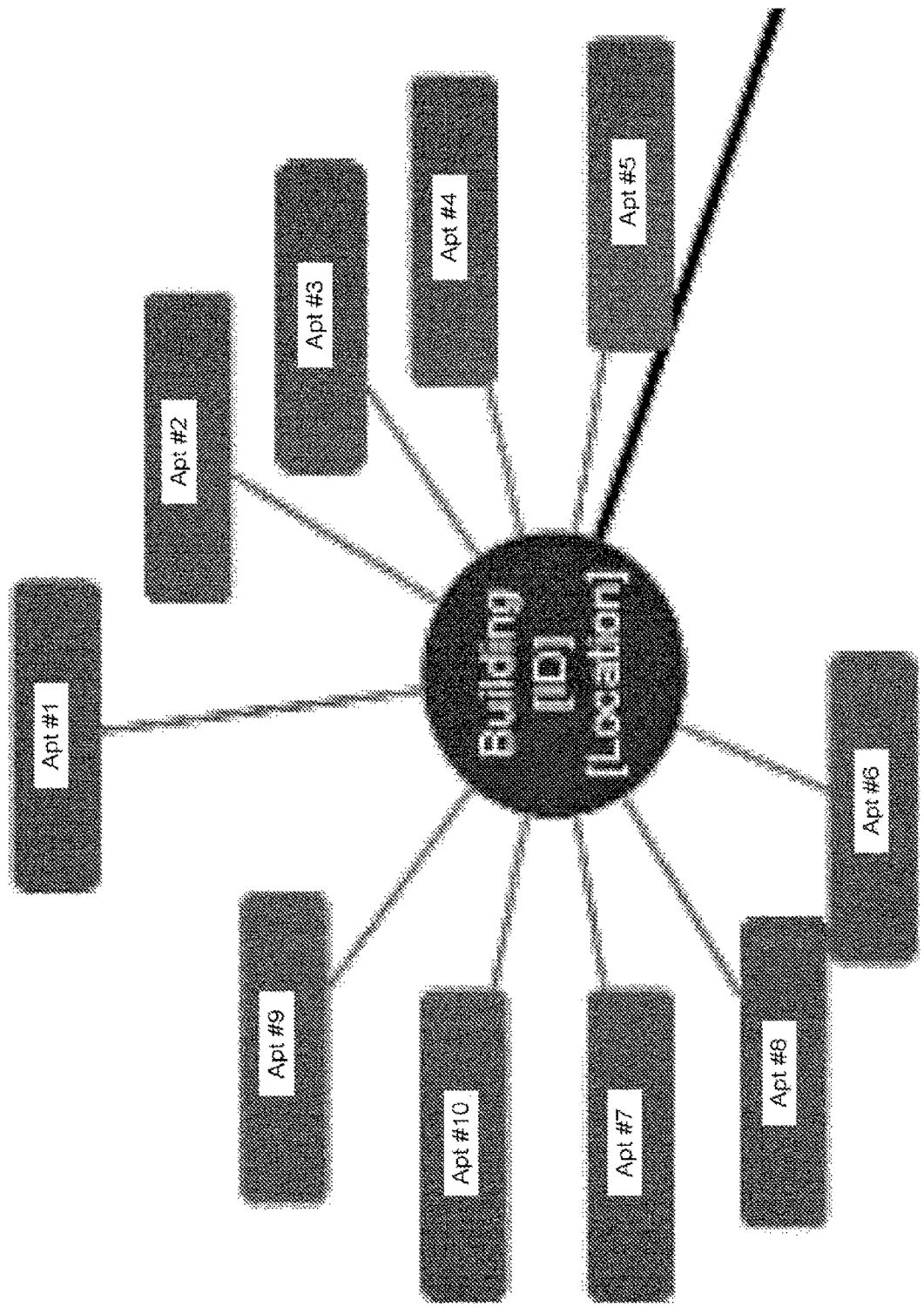
Figure 24B:
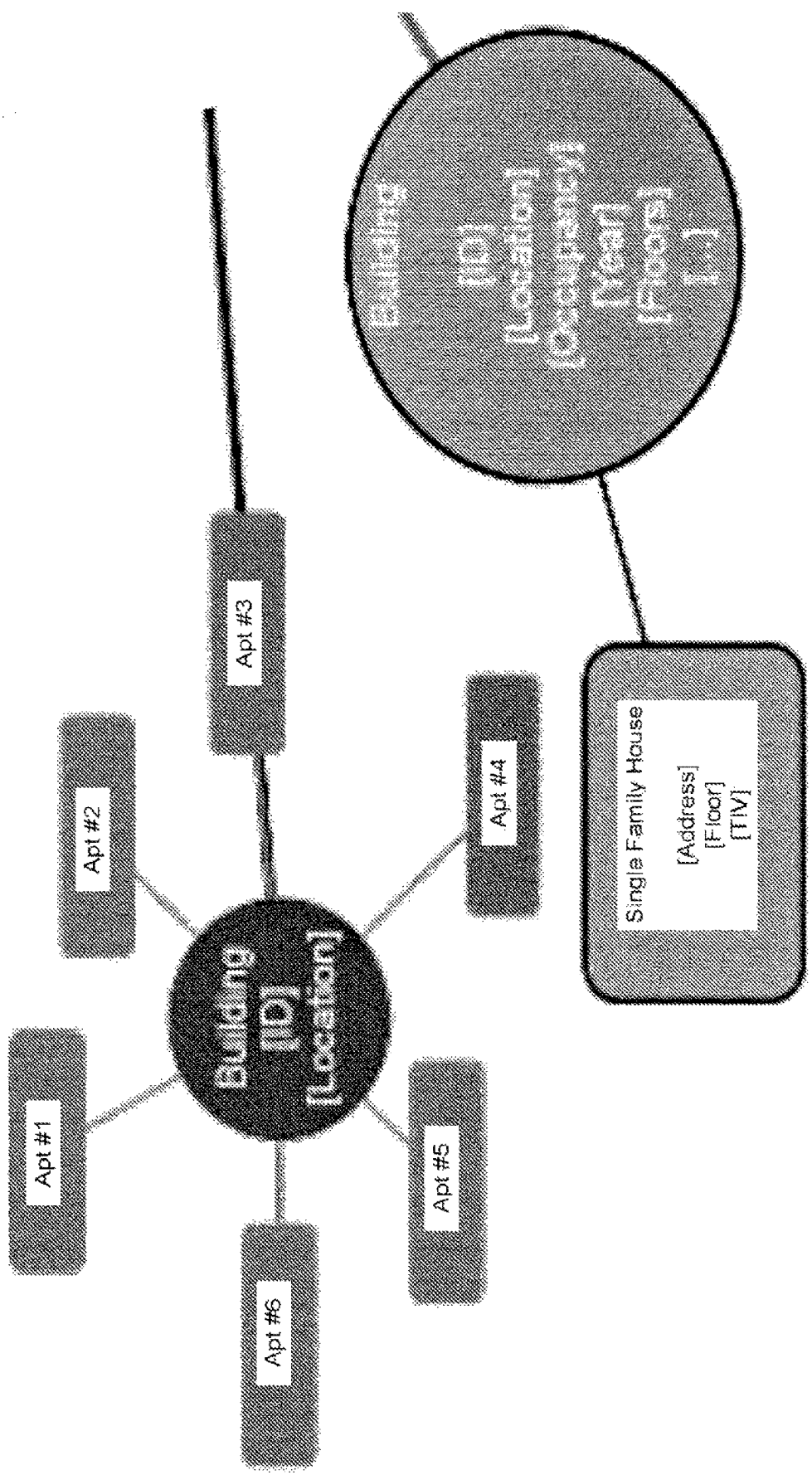
Figure 24C:
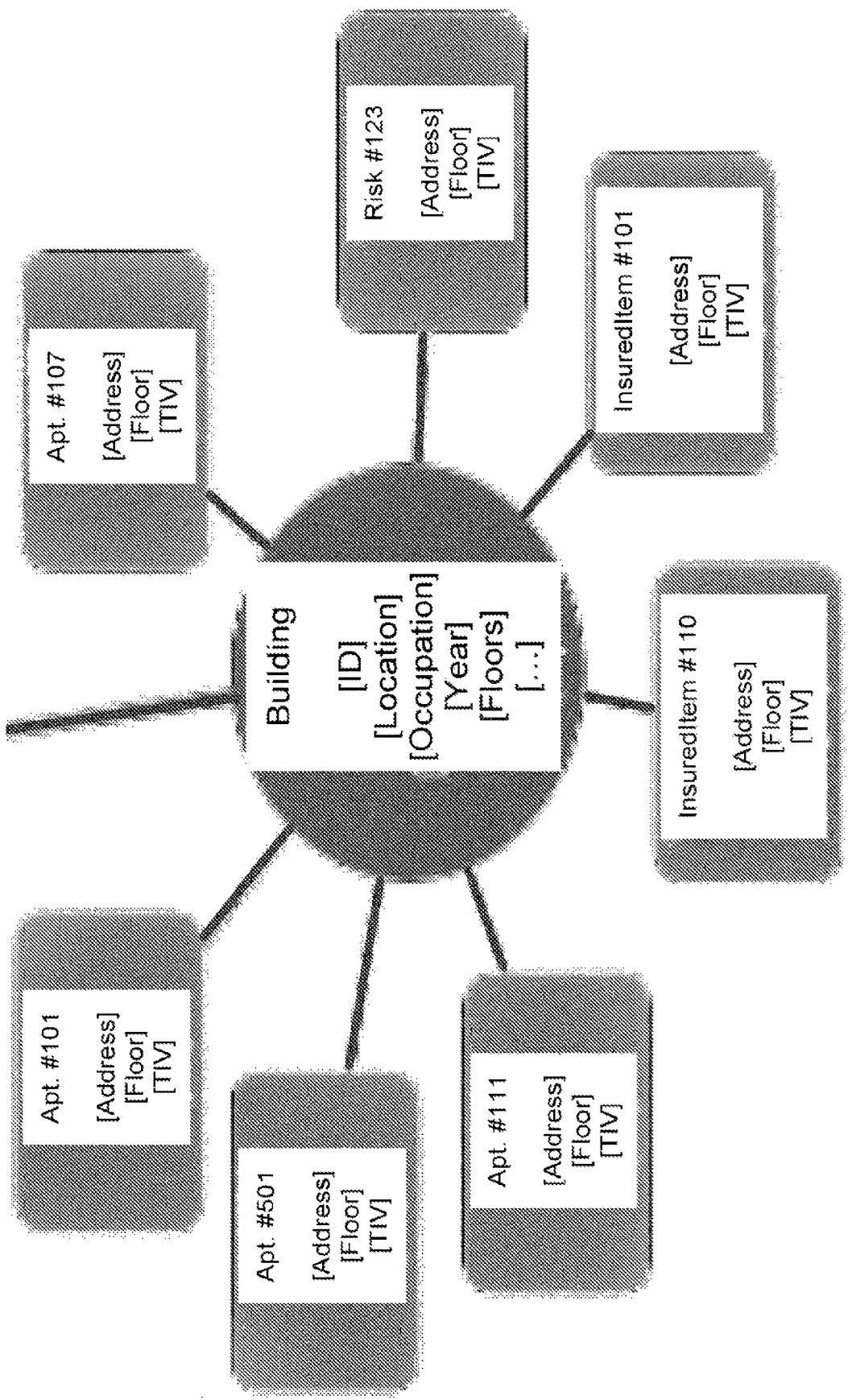
Figure 24D:
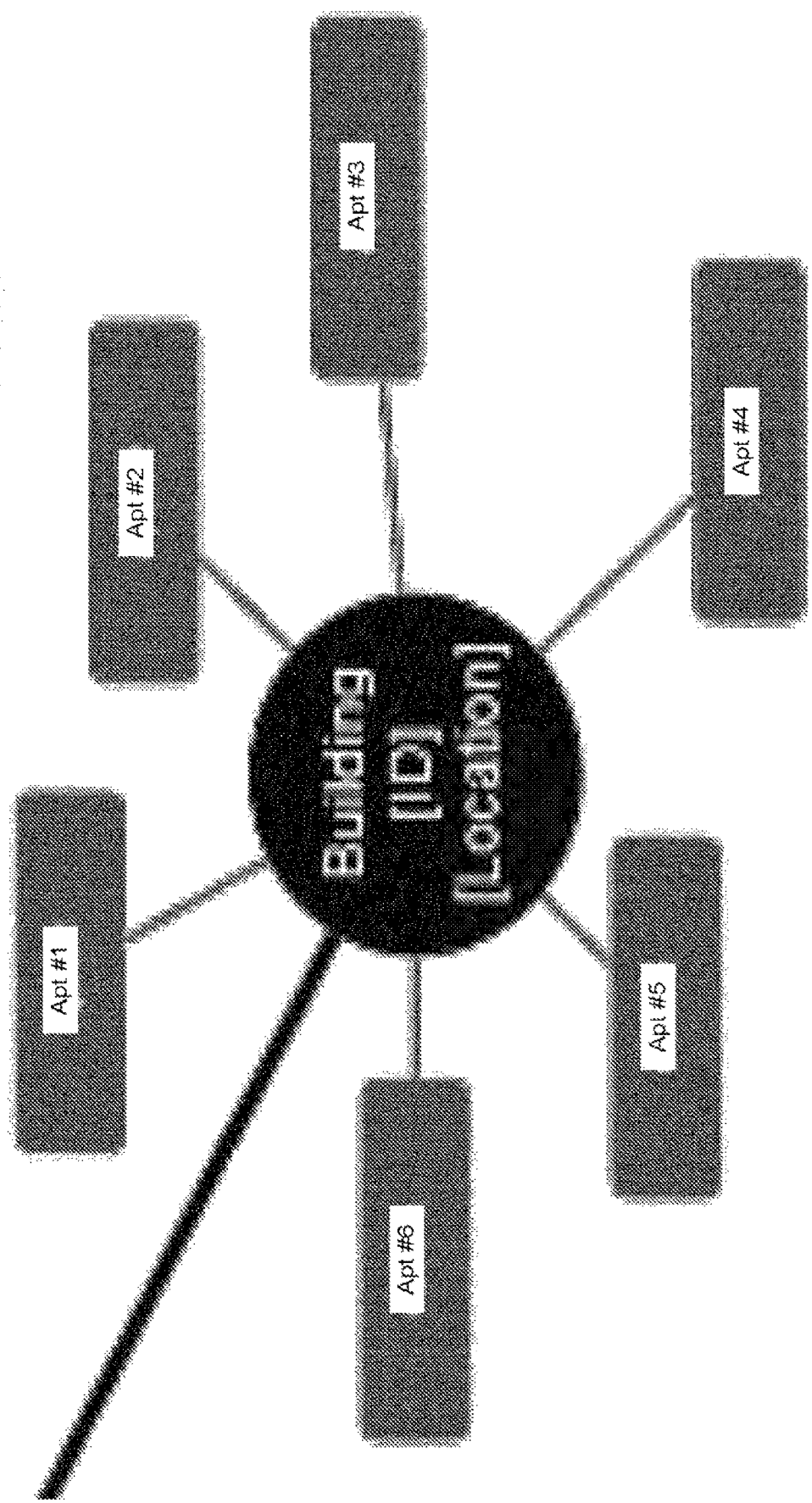
Figure 24E:
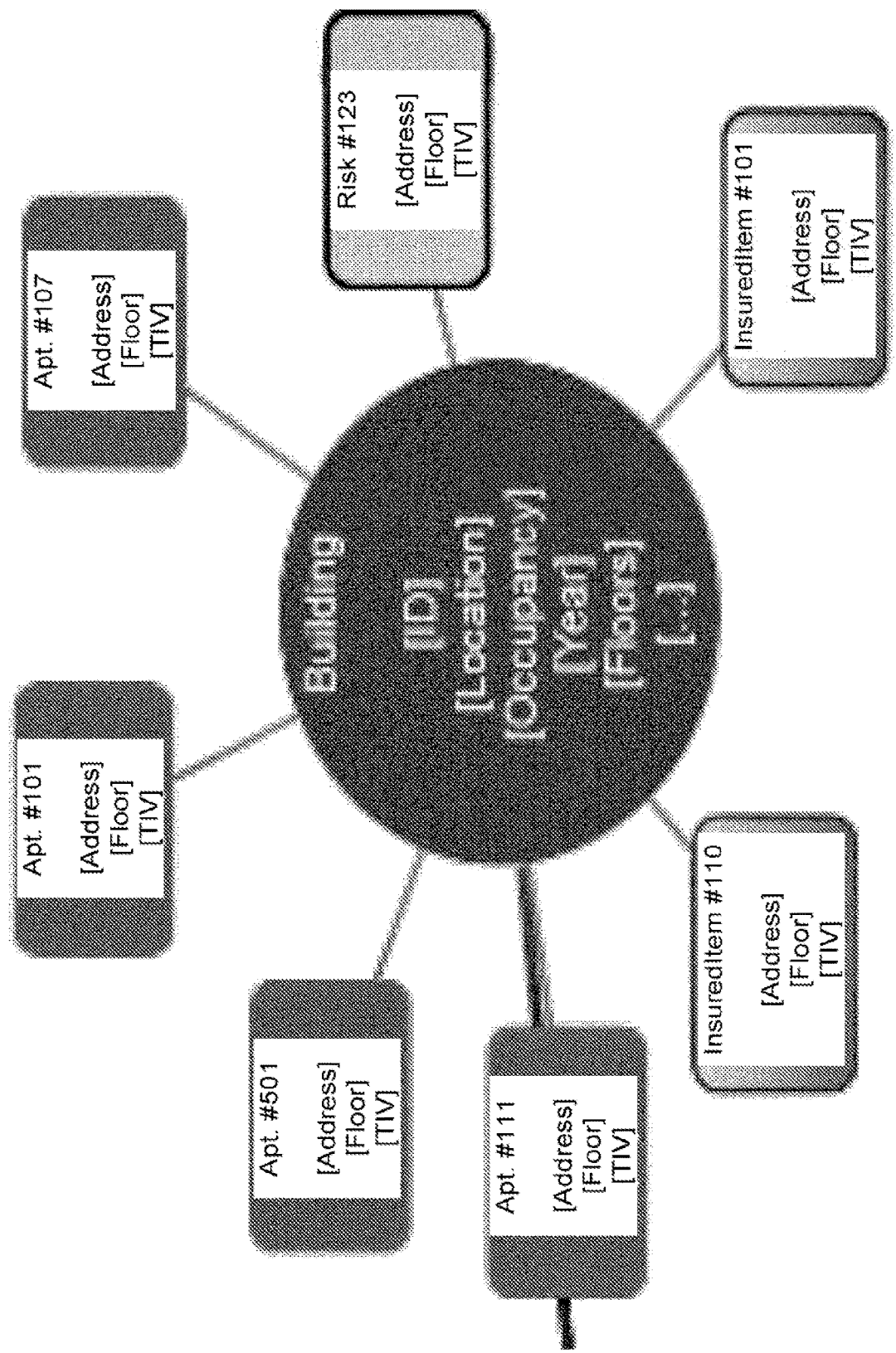
Figure 24F:
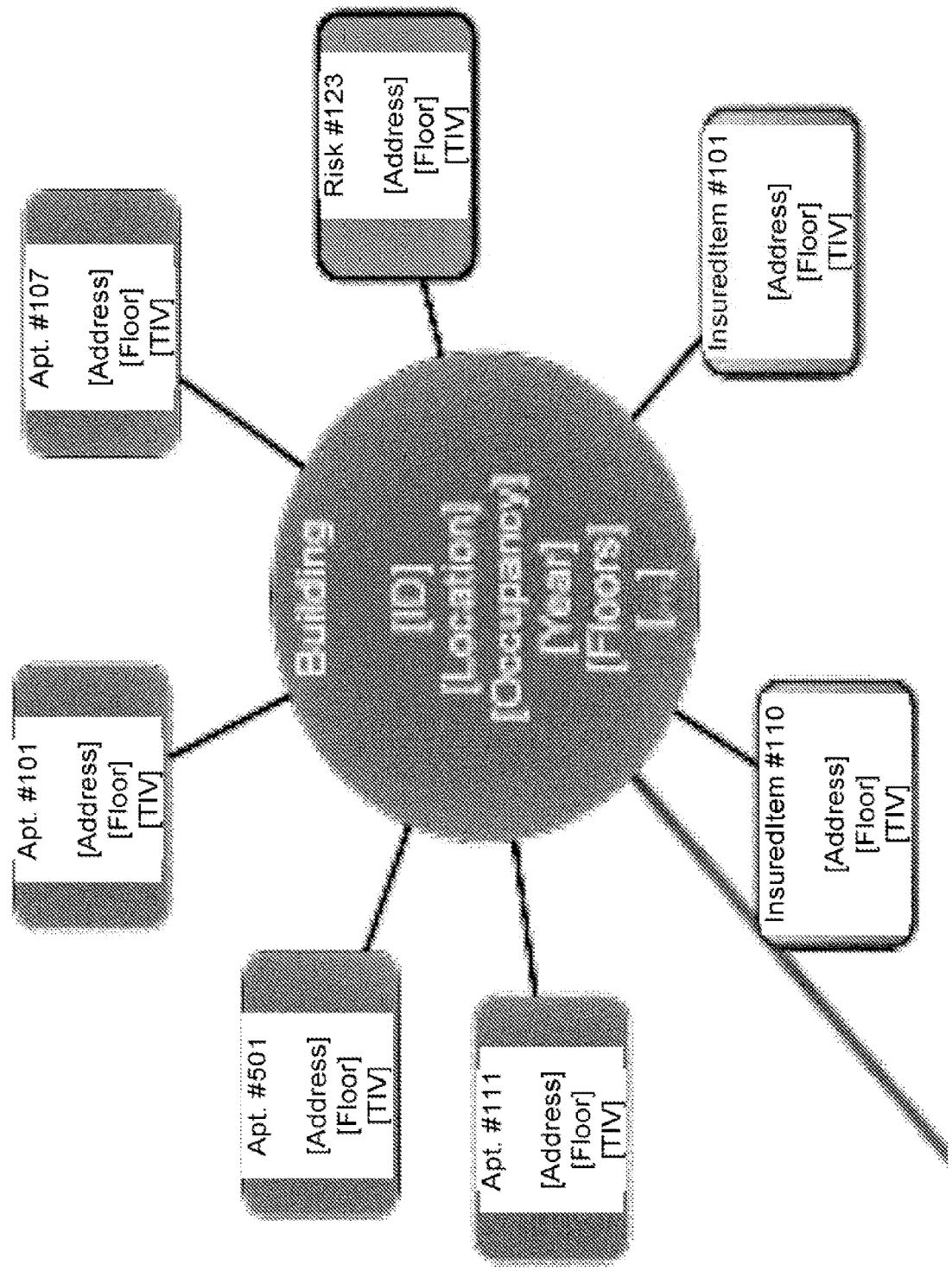
Figure 24G:
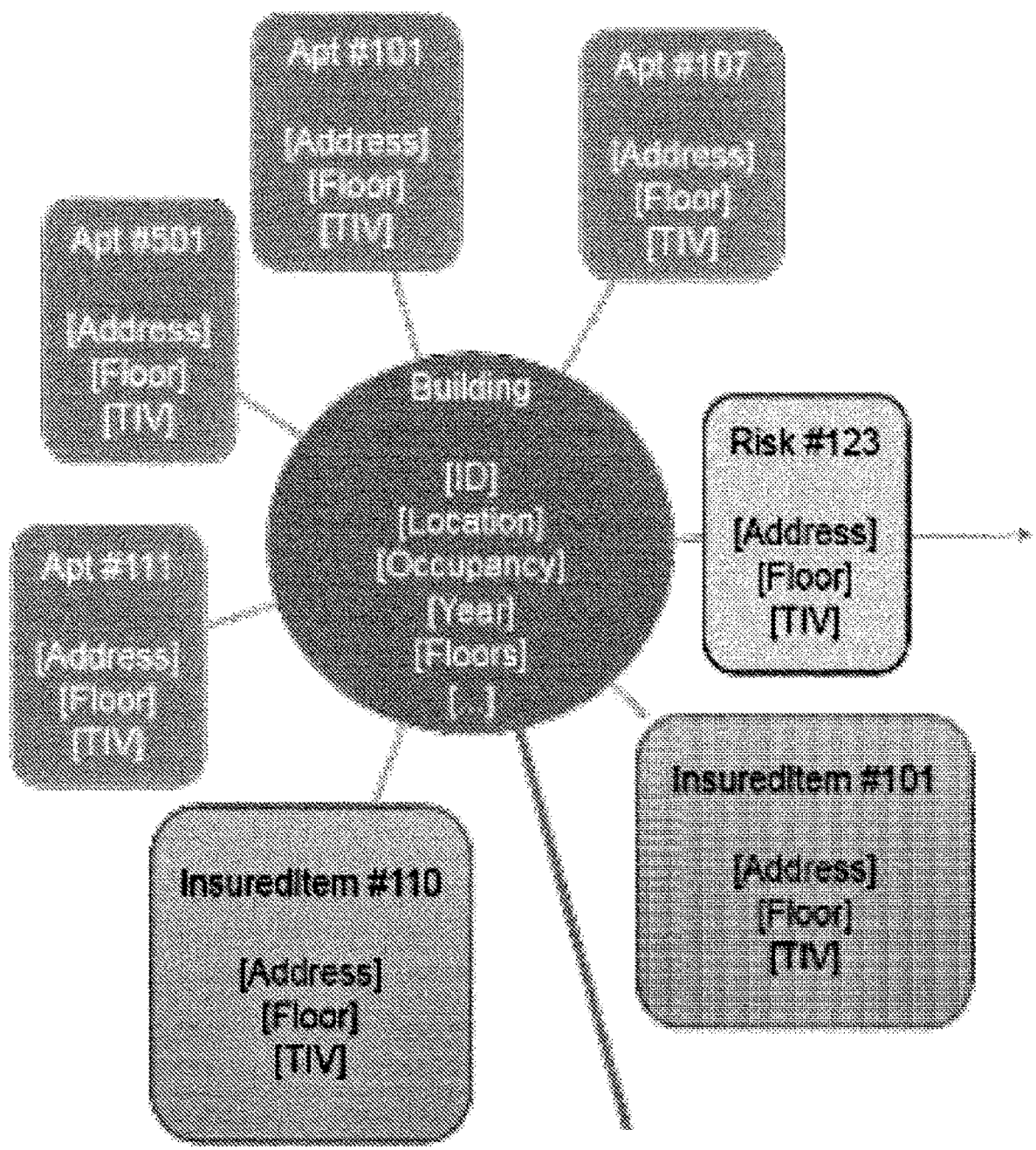
Figure 25:
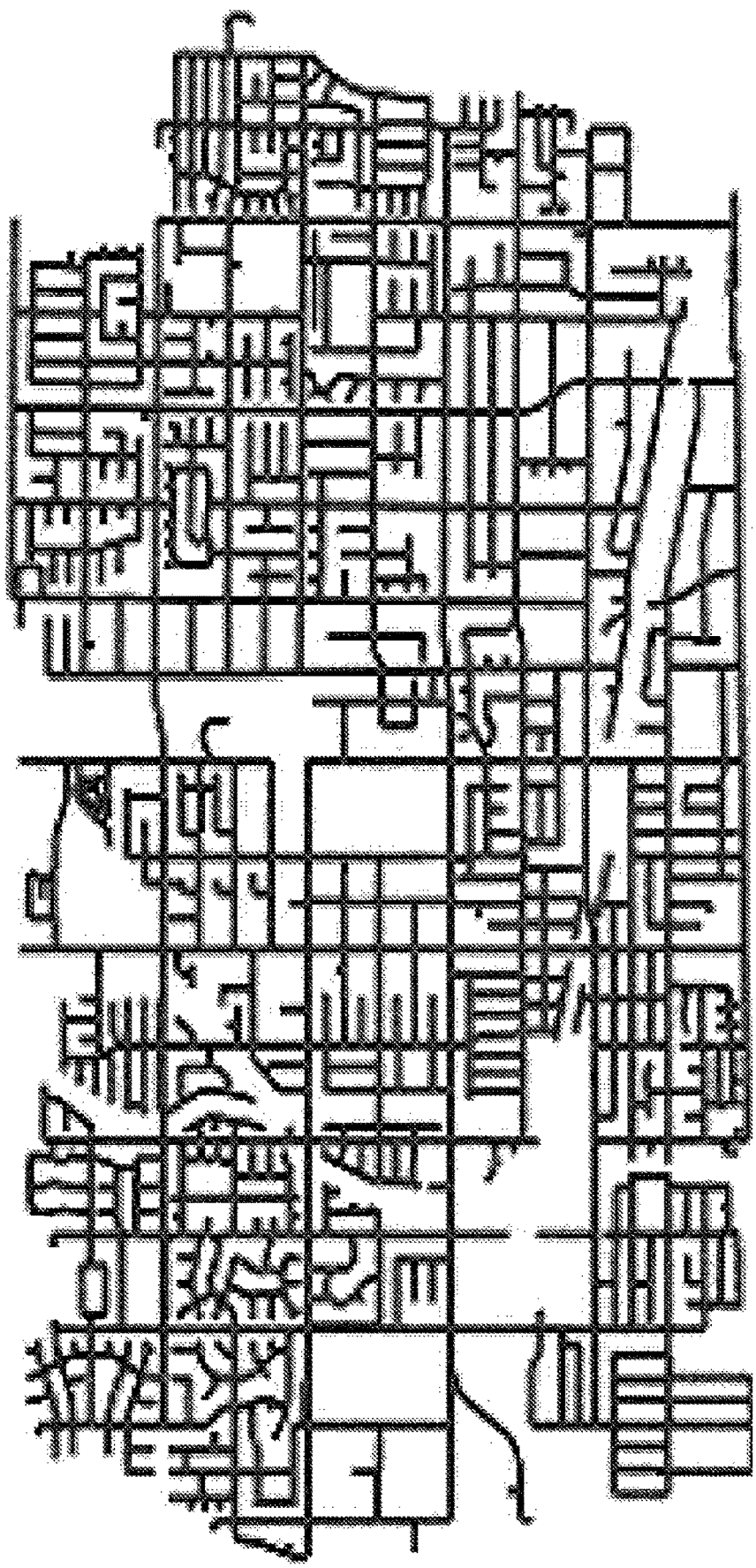
FIG. 25 shows extracted drivable road network from OSM (using OSMnx python module) for the creation of root-level clusters.

Regarding the clustering module 2152 and the associated clustering processing of the exposure data intelligence 215, one of the main technical challenges in the system 1 development is the technical clustering hierarchy and the logic behind it. The system 1 implementation may feature only one level of clusters, which do not have explicitly defined attributes yet, apart from their coordinates, ID and contained records. There are two different possible technical approaches and embodiment variants to the technical hierarchical clustering problem: one of them is realized as an Agglomerative Clustering (see FIG. 21), which is a bottom-up approach. The other applied processing is called Divisive Clustering and follows a top-down approach (see FIG. 21). FIG. 22 illustrates the original purpose of clustering: deduplication of raw portfolio data 215113 records 21511, . . . , 2151i.

Figure 26:
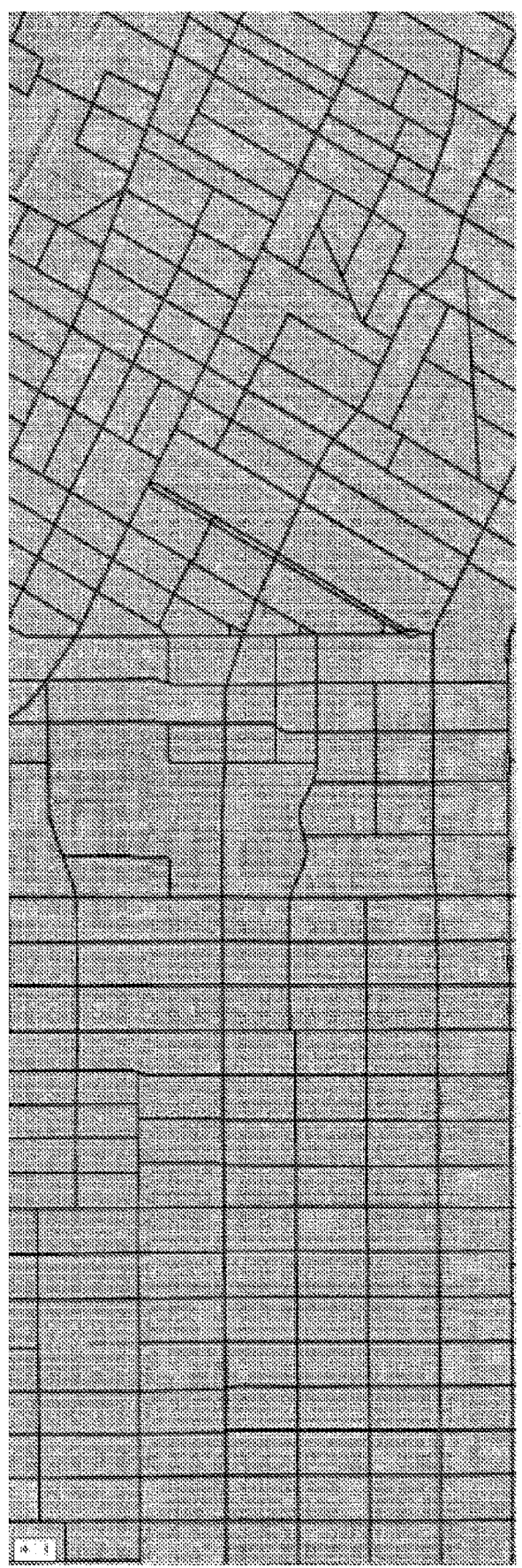
FIG. 26 shows closed polygons as root-level clusters, visualized on map.
Figure 27:
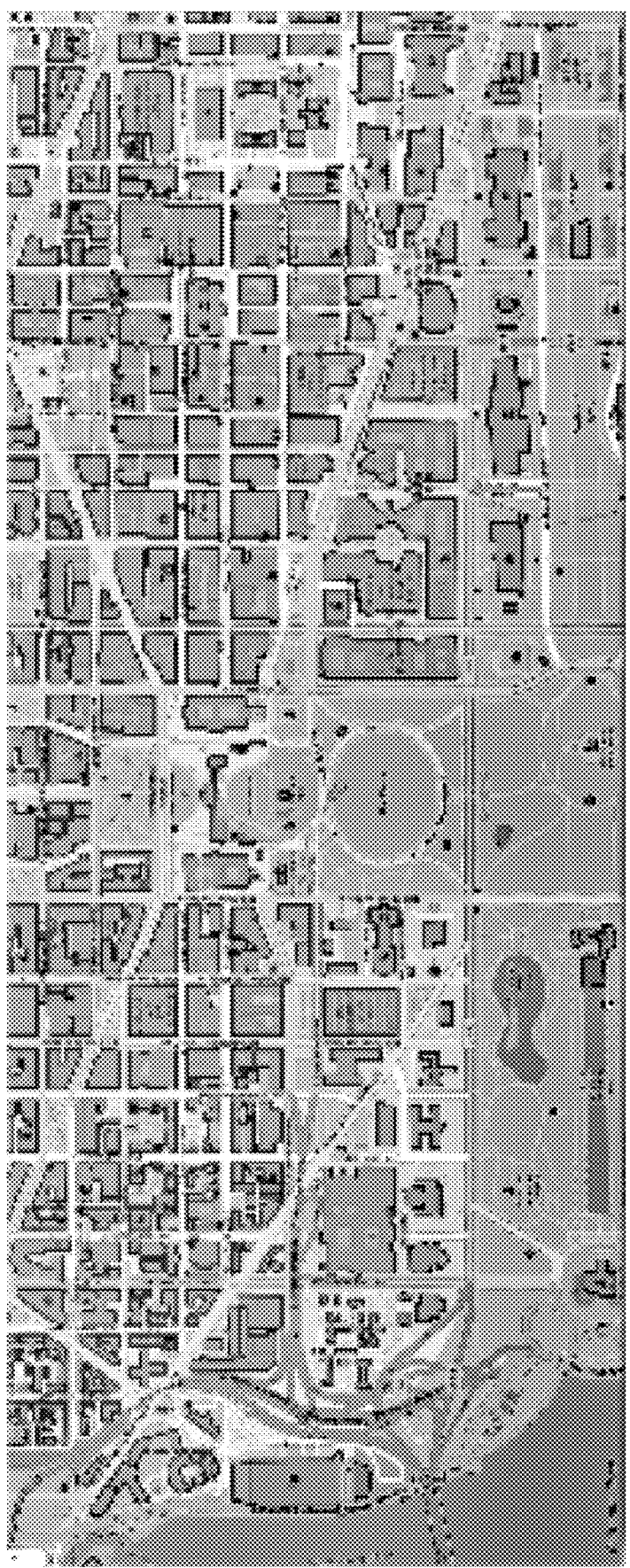
FIG. 27 shows footprints of Washington DC derived from satellite image.

The applied "Bottom-up Agglomerative Clustering" approach, proposed herein, is technically realized based on nearest-neighbors clustering and fuzzy street address matching (Levenshtein distance) of individual raw portfolio data 215113 records 21511, . . . , 2151*i*, currently at highest granularity level, hence called 'bottom-up' approach, herein. The main advantage of this technical structure is that it can handle generic/unnamed cluster levels, however only when the corresponding distance functions are appropriately designed: this may become a technical challenge when operating on non-numeric and non-Euclidean space (for example for the occupancy description space it is difficult to come up with a meaningful distance metric). On the other hand, if the cluster levels are explicitly named (like in FIG. 23), the database records 21511, . . . , 2151*i* must provide the corresponding flags and in the contrary case, a way to determine a meaningful closest cluster-node must be provided. The main disadvantage, however, is that it does not take the geometry of the clusters into account, so that it is not possible to bind an address to a particular building, but rather only to a house number. However, multiple different house numbers and even multiple street addresses can belong to the same building, which will then result in different clusters. Finally, the system 1 must be realized to deal with records 21511, . . . , 2151*i* that have no assigned street address but only [Lat, Lon] coordinates, and to include them into this hierarchy (see FIG. 23). The applied "Top-down Divisive Clustering" approach, proposed herein, can e.g. be visualized the diagram of FIG. 24. The main difference compared to the previous processing structure (discussed above), is that this approach technically accounts for the geometry of the clusters and not just the semantics. In this approach the granularity increases with the addition of each cluster-nodes (before adding a cluster, its parent must be known), so that it resembles a 'top-down' approach. At root level, there are site-, neighborhood- or block-clusters, which are formed by road intersections. The next level of clusters is formed by individual buildings inside the root cluster. On the lowest level, there are individual risks/insured items with a defined [Lat, Lon] and address, which can be essentially seen as de-duplicated raw portfolio data 215113 records 21511, . . . , 2151*i*. The diagram of FIG. 24 also shows examples of meaningful cluster attributes for each level. It can e.g. be beneficial to perform an intermediate aggregation at root-cluster- and building-cluster-level (technically, this speeds up aggregation additionally when the database becomes larger). a) campus/site/block-level: The technical key assumption for system 1 is that campus/site/blocks can be extracted from road intersections (see FIG. 25). The applied technique should be applicable for any location with roads. As an embodiment variant, they can be extracted as polylines from OSM (by defining which roads types and tags to look for), but can technically also be derived from other data sources (like satellite images for example). The obtained collection of lines can then e.g. be polygonised. Technically, this results in a collection of polygons, which define root-level clusters, as shown in FIG. 26.

b) Building-level: Building footprints (see FIG. 27), can be realized similarly to streets for system 1: they can be extracted from OSM where available, or other data providers, or even derived in-house from satellite imagery and measurements. The advantage of OSM is that it can be used as a source of portfolio data enrichment from which interesting metadata tags and keys can be captured (i.e. for the building key, we can find out its type/value, similarly for, the industrial key—the type of industry), as illustrated in FIG. 28.

c) Insured-item/risk-level: At this level the de-duplicated raw portfolio data 215113 records 21511, . . . , 2151*i* are stored, with a special entry containing all the IDs of the duplicates. For system 1, i is not necessary to store all the metadata of the duplicates in the cluster database, as it can be looked up in the raw portfolio data 215113 with the IDs. A possible split of the raw portfolio data 215113 into building and low-level risk attributes is presented in FIG. 29. The hierarchy explained in FIG. 29 is particularly useful when it is desired to add a new risk to the scheme or perform a lookup/aggregation at a particular level: since the necessary clustering information is not automatically included in each record (i.e. to which building, or even to which street it belongs), it should be determined separately through coordinates and geometric boundaries of clusters. From here arises the challenge of efficiently storing and indexing these geometries/clusters, leading towards the creation of a spatial database.

As an embodiment variant, the two technical processing approaches can be combined in the system 1 into one, as follows: First, the fuzzy matching logic of the first approach for deduplication of raw portfolio data 215113 records 21511, . . . , 2151*i* (at the lowest level) and for cases when a record cannot be assigned to a building (or other level) node can be used, thus requiring the creation of an unnamed cluster level, which can be handled by the distance functions developed for the agglomerative clustering. Secondly, cluster geometry can be provided from the divisive approach. It can be then decided how to define and implement the root level clusters: either keep them as streets (with a buffer), however this automatically produces duplicates (for buildings bordering multiple streets); or use the polygons created by road intersections, which can also be used for efficient indexing. Thus, as an embodiment variant, a hybrid approach is realized, as long as there is an agreement on the main intermediary cluster level and the root level, and is worth a try.

Figure 30:
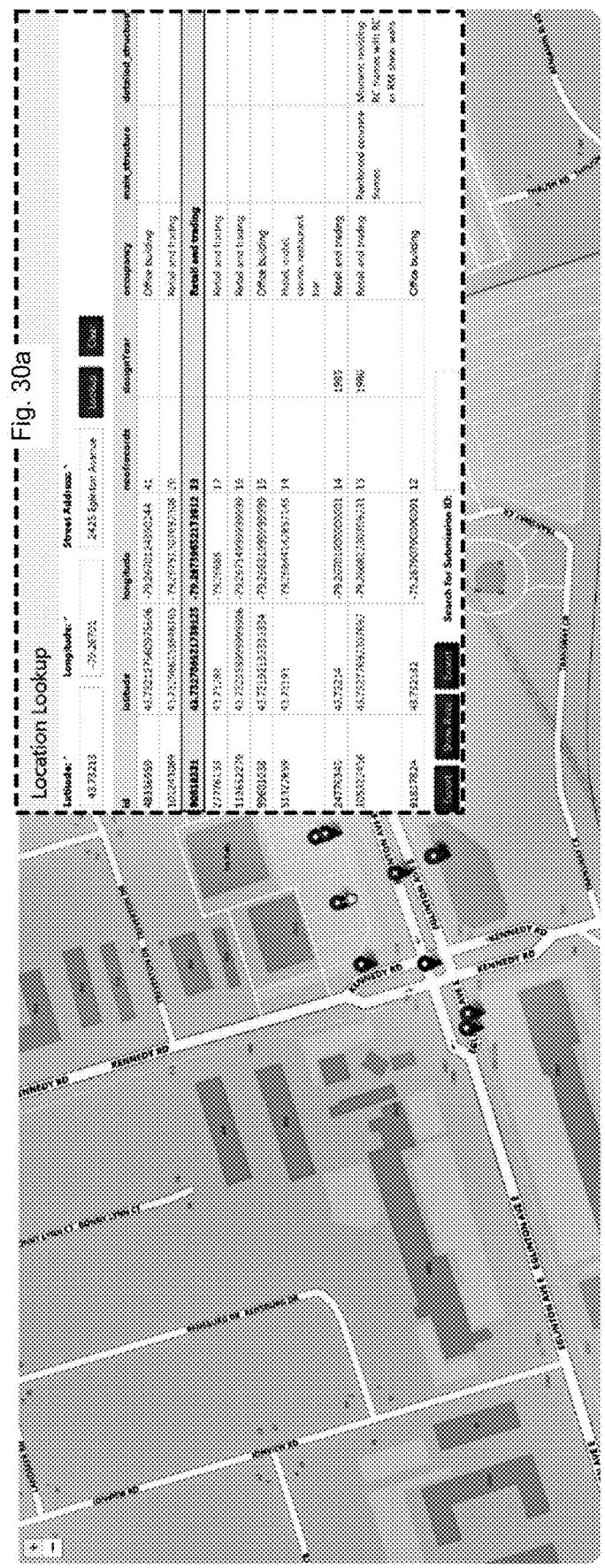

The use and access of the exposure database 2151 can easily be made more user-friendly by implementing the querying of the database accessible over an appropriate user interface as a Web Application, which enables the user to lookup clusters by address and coordinates and browse the corresponding attributes by means of a location intelligence engine 2156 (see FIG. 30). Such a location intelligence engine 2156 WebApp can be realized by using an exposure database 2151 API which returns e.g. a list of all matches in the exposure database 2151 as well as the best 10 matching cluster.

As an embodiment variant, the exposure database 2151 can be realized to comprise persistent cluster IDs. I.e. the creation of a clustering scheme implies the definition of unique cluster IDs, which has to be also persistent for such large databases as the exposure database 2151 for obvious reasons (addition of new clusters and lookup). Technically important is that the exposure database 2151 as a spatial-database, allows to implement a most efficient lookup structure: a naive point in polygon search is simply unfeasible for the given number of records a clusters. This problem can e.g. be solved by the exposure database 2151 by the solution, proposed below, allowing a more user-friendly, meaningful and efficient implementation, as prior art systems. The technical approach of the solution is based on using appropriate hash codes. This allows encoding locations into a form that is easier to use than showing coordinates in the usual form of Lat-Lon. For this, for example Open Location Codes (OLC), also known as Google Plus Codes, can be used. They are designed to be used like street addresses, and can be implemented in places where there is no formal system to identify buildings, such as street names, house numbers, and post codes. Open Location Codes can e.g. be derived from latitude and longitude coordinates, so they already exist. They are similar in length to a telephone number—849VCWC8+R9, for example—but can often be shortened to only four or six digits when combined with a locality (CWC8+R9, Mountain View). Locations close to each other have similar codes. They can be encoded or decoded offline. The character set avoids similar looking characters, to reduce confusion and errors. As embodiment variants, similar methods can be used, too, like GeoHash, MapCode, what3words and others. However, they all have the disadvantages that (i) locations at boundary (close t.e.o.) have different prefix, (ii) grid cuts through buildings, and (iii) encoding geometries yields a long list, prefix not reused. Thus, as a preferred embodiment variant, the system 1 comprises a geo-hashing algorithm which is applicable to both single points and polygons. This approach is implemented in a way, which also allows determining if a point belongs to a polygon by just looking at the code.

Finally, it should be noticed that all prior art systems lack the functionality of adaptive grids, which technically avoid cutting through cluster geometry. As an embodiment variant, the system 1 uses polygonised roads as grid. It happens, that roads, by nature, define a grid and do not cut through buildings. Furthermore, their intersections already define site-level/block-level clusters. In other words, they create meaningful boundaries for clusters. The system 1 allows to index such a cell/cluster by e.g. calculating the centroid and simply encode it with a short OLC (so that it is still distinguishable from others).

Figure 31:
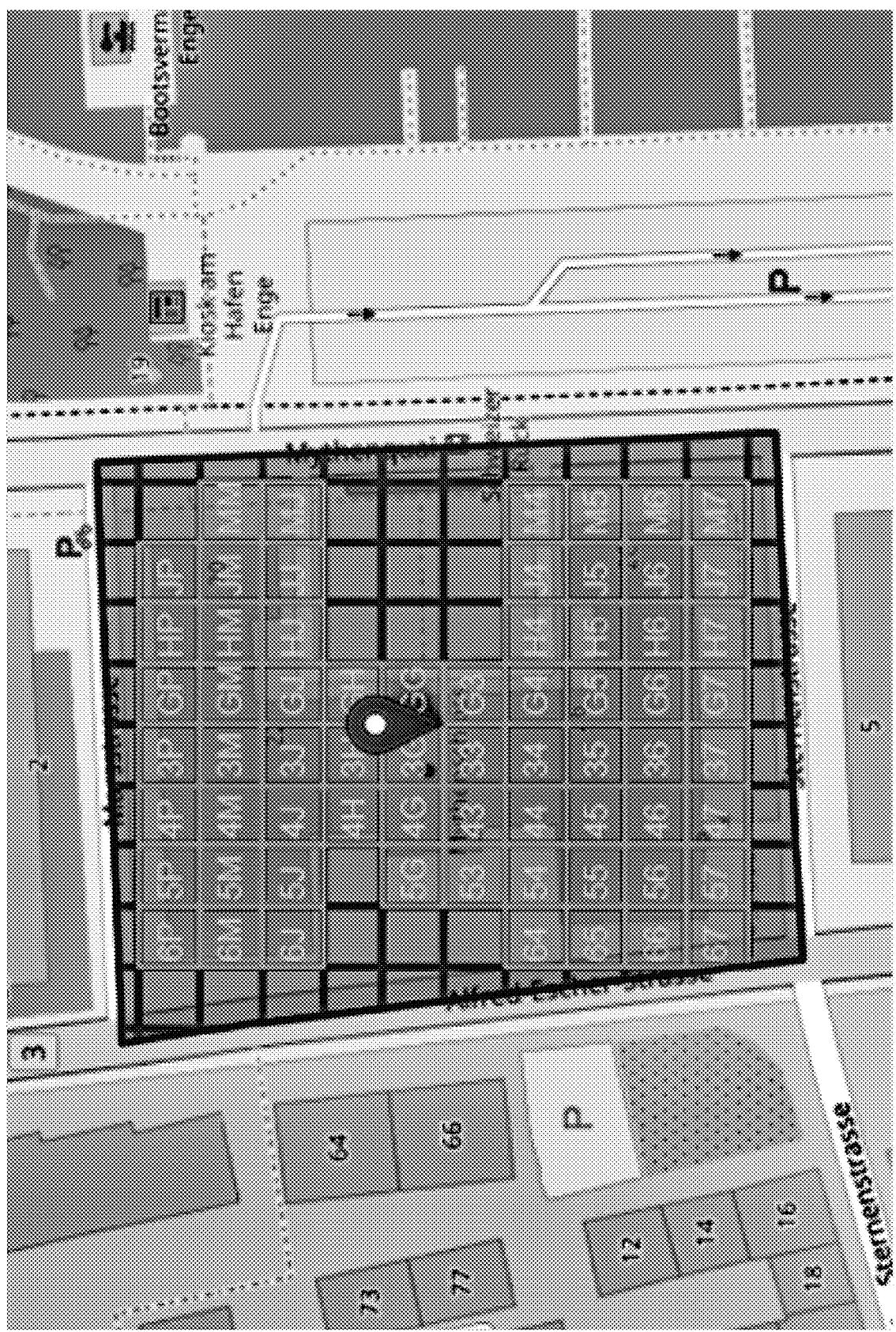
FIG. 31 shows an example of such an encoding scheme. Each index corresponds to a character at the corresponding index location in the encoding alphabet, for example: (i) Negative indices: 23456789CF, (ii) Positive indices: GHJMPQRVX.
Figure 32A:
FIGS. 32*a* and 32*b* illustrate that such a cell can be encoded with one of 20 characters for 5 m precision on a 100 m range. A single point/sub-cell can e.g. be defined as shown in FIG. 32*a*, whereas an area can be defined by adding multiple sub-cells together, as shown in FIG. 32*b*.
Figure 32B:
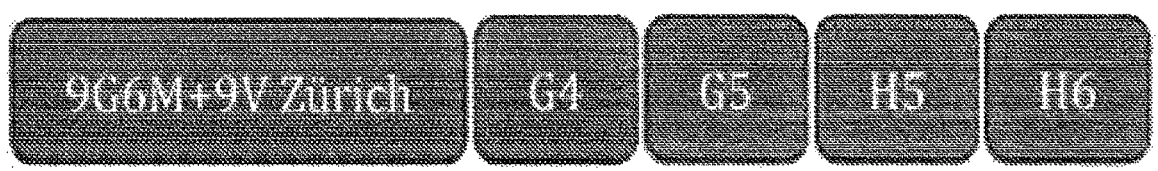

For locations inside the cell, the reference system can e.g. be changed, and the previously calculated cell centroid can be used as origin of new x-y axes/Geo Reference System (GRS) (precisely the edges defined by an OLC cell). Such a cell can be encoded with one of 20 characters for 5 m precision on a 100 m range. Thus, a single point/sub-cell can e.g. be defined as shown in FIG. 32a, whereas an area can be defined by adding multiple sub-cells together, as shown in FIG. 32b. FIG. 31 shows an example of such an encoding scheme. Each index corresponds to a character at the corresponding index location in the encoding alphabet, for example: (i) Negative indices: 23456789CF, (ii) Positive indices: GHJMPQRVX. In practice, this grid level can be as big as 1000 m in both directions, which means that, for example, the approach either needs 200+ characters, lower precision or longer codes. The main advantage of this embodiment variant is that it allows for a very efficient lookup, which narrows down to a simple string search/comparison. The only prerequisites of this technical approach are: (i) Knowledge of the cell centroid, either [Lat, Lon] or OLC, which can be looked up/learned e.g. by applying ML techniques; (ii) Knowledge of the encoding alphabet and scheme in the new GRS. The above scheme is only an exemplary implementation. There are other ways of encoding geometries, especially large ones which are made up of many sub-cells making the resulting code of the above embodiment variant long.

The invention has inter alia the advantage that it help to create an enriched, clean and structured representation of large raw portfolio data 215113: the system 1 allows to produce unique footprint-aware building clusters, as well as block/site-level clusters with a persistent and modular cluster-ID. This allows to build a unique database which takes automated data insight and handling to a new level and broaden the landscape for data analysis, as large amounts of previously unscrubbed, raw data become available. The proposed system 1 can e.g. be used to improve in-house portfolio data curation and clustering. It allows to cluster and identify unique risks that appear countless times in large databases as the exposure database 2151, and perform and efficient aggregation and tracking of risk attributes. Further, the system 1 can easily be applied to different lookup services as for example for underwriting/NatCat purposes and also to end-users e.g. in the context of emerging smart-home applications. The system 1 and the exposure database 2151 allows providing a large, client fed and database of properties which can serve as an enrichment source for clients' portfolios, but can also be applied to other fields. With regard to current state-of-the art Nat Cat modeling and underwriting, the system 1 is able to: (i) Identify buildings by their coordinates or unique ID; (ii) Query the containing risks and attributes, for ex.: occupancy, incl. information about the content of the building and business; (iii) Group buildings to sites (campus and alike); and (iv) Track the evolution of attributes in time (construction and retrofitting year).

The system, inter alia, provides (i) new bulk geocoding solution, (ii) a geometry-aware clustering method, (iii) a persistent and location-aware indexing method for every property that is entered as raw portfolio data 215113, and (iv) a more user-friendly solution for querying and visualizing large databases as the exposure database 2151. Further the system 1 has the advantage of being easily integratable. Integrating system 1 as a service into other applications or client tools/software not only leads to a significant improvement of the user experience and risk assessment, but it also gives a new perspective over possible portfolio evolution in time and on different levels of aggregation.

Metric Simulation Engine 10

The digital platform 1 comprises as an embodiment of the metric simulation engine 10 as an integrated part. By means of the simulation engine 10, a basic rate measure 103 and/or a structural mix characteristic 141 of the portfolio 14 comprising captured risk-exposure units 102 is varied until a desired degree regarding the varied values of the basic rate measure 103 and/or the structural mix characteristic 141 is reached. The metric simulation engine 10 for automated prediction of forward- and backward-looking impact measures 101 is based on measured event parameter values 111 of time-dependent series of occurrences of physical impacting risk-events 11. The occurrence of the physical risk-events 11 are measured based on predefined threshold-values of the event parameters 111, wherein the impact of the physical risk-events 11 to a specific physical or intangible real-world asset or living object 12 is measured based on impact parameters 112 associated with the asset or object 12.

Structured asset/object characteristics parameters 121 of the physical assets or objects 12 are captured at least partially by means of a parameter-driven bifurcation process 3, as automated underwriting process, dynamically capturing characteristics parameter values and mapping the values to the structured characteristics parameters 121. A plurality of risk-transfers 13 associated with the occurrence of one or more predefined risk-events 11 impacting the physical assets or objects 12 are captured by metric risk-exposure units 102 and transferred to a portfolio 14 holding the risk-transfers 13 by means of the captured risk-exposure units 102. A structural mix characteristic 141 of the portfolio 141 is given by the measured and captured types of risks 132 and assigned number of risk-transfers 142 with associated metric risk-exposure units 102.

The computer-based automated risk-transfer configurator 1 and risk-transfer portfolio management platform 1 enabled for automated conduction of binding risk-transfers between a user and the automated risk-transfer configurator 1, acting in particular as an automated transaction platform. The risk-transfer configurator 1 can e.g. be operated by the service provider as an integrated part of a cloud-based service, in particular as a Software as a Service over the cloud realization. The system 1 connected to various client terminals of users via a data-transmission network 4, such as a telecommunication network and/or the word-wide backbone network internet. The data-transmission network 4 can e.g. comprises a landline network and/or a mobile network and/or satellite-based network. The network 4 can comprise, for example, the public switched telephone network, an ISDN (Integrated Services Digital Network) network or preferably the Internet or an intranet. The mobile network can comprise, for example, a GSM network (Global System for Mobile communication), a UMTS network (Universal Mobile Telephone System) or another, for example, satellite-based mobile network, or a WLAN (Wireless Local Area Network). The reference 5 designates the user clients to access the system 1. Reference number 51 designates a client or terminal which can e.g. realized as PC (Personal Computer), the reference symbol 52 designates a client or terminal which is realized as mobile notebook or laptop computer, and the reference symbol 53 designates a terminal or client which is realized as mobile telephone or PDA computer (Personal Digital Assistant). The system 1 comprises a communication module 15 with an appropriate network interface 151 for the communication, i.e. for the data exchange, with the user clients 5/51/52/53. The communication module 15 is, for example, adapted to set up in each case a virtual private network (VPN) with the user clients 51/52/53 via the data-transmission network 4 and to communicate with the user clients 51/52/53 via this virtual private network.

Figure 2:
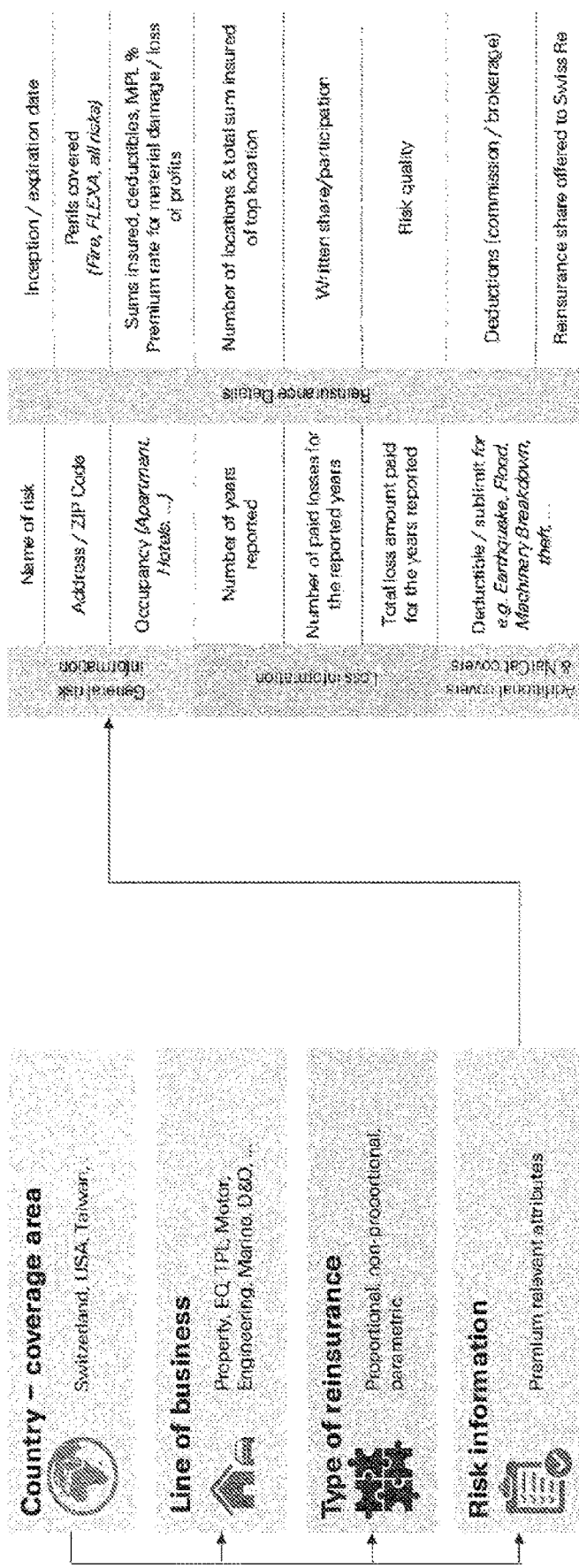
FIG. 2 shows a block diagram illustrating schematically an exemplary risk-transfer setup for the capturing of the characteristic data associated with the risk-transfer. It shows an exemplary sample risk information capturing for a property proportional product at a certain location/region.
Figure 3:
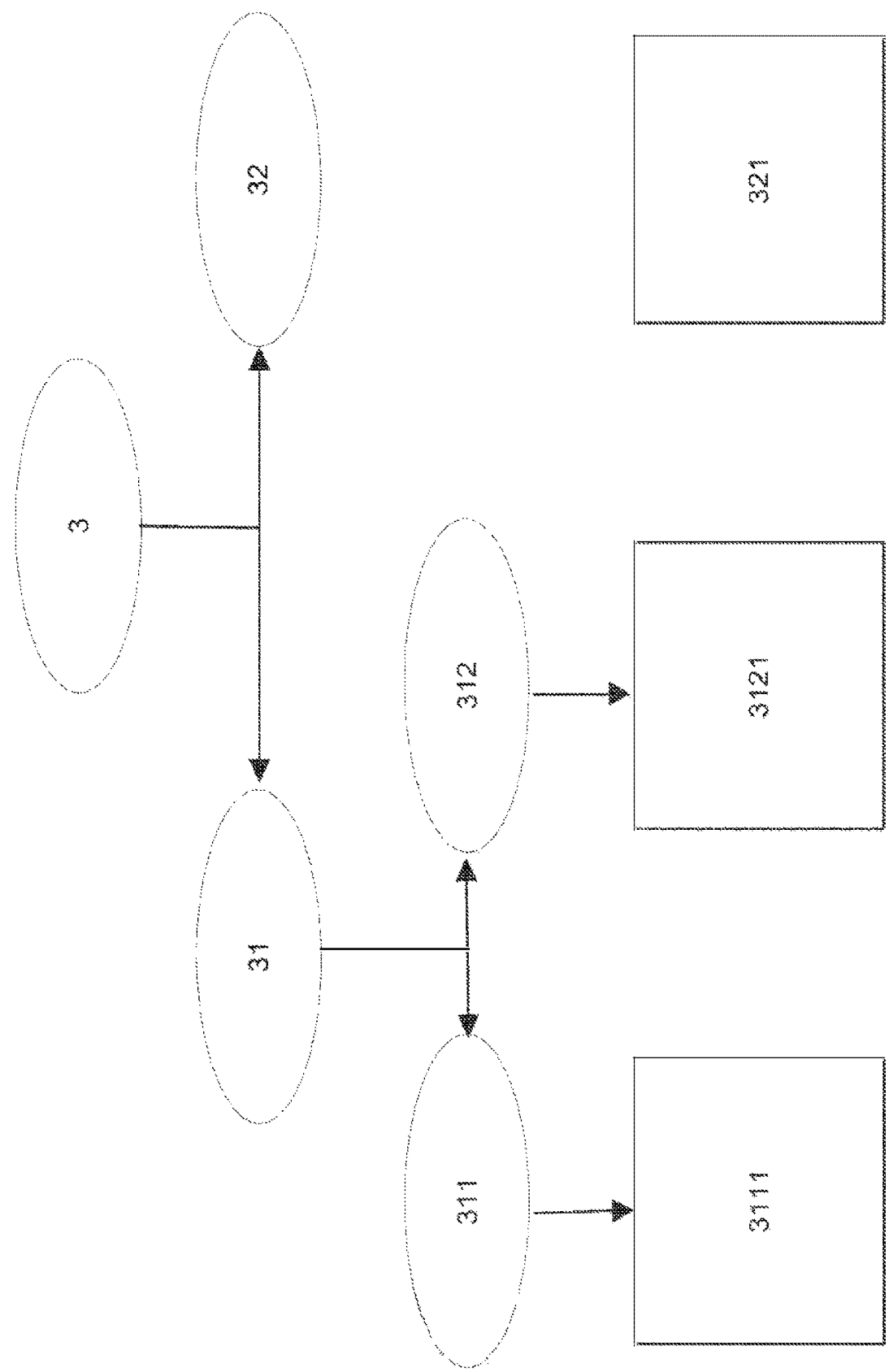
FIG. 3 shows a block diagram illustrating schematically an exemplary the rule-based bifurcation underwriting process of the inventive electronic platform or system, i.e. the automated, risk-transfer specific data-capturing of the characteristics data of the physical assets or objects by means of the parameter-driven bifurcation process dynamically capturing characteristics parameter values and dynamically mapping the values to structured characteristics parameters. Reference number 3 denotes the rule-based bifurcation underwriting process, 31 the standard rule-based underwriting process, 311 the automatic rule-based underwriting process, 3111 the process, where the triggered parameters are compliant with trigger rules, 312 the semiautomatic rule-based underwriting process, 3121 the process, where several parameters are not compliant with the fixed trigger rules, 32 the non-standard rule-based underwriting process, and finally 321 the non-standard underwriting process where process does not include automatic pricing. For example, there may be 92 different property risk-transfers available via the inventive process (e.g. 63 proportional, 28 non-proportional and one parametric). A risk-transfer structure or product in the context of the invention is understood to be a risk-transfer structure triggered per line of business, type of business and market/country (e.g. property, np, Belgium).
Figure 4:
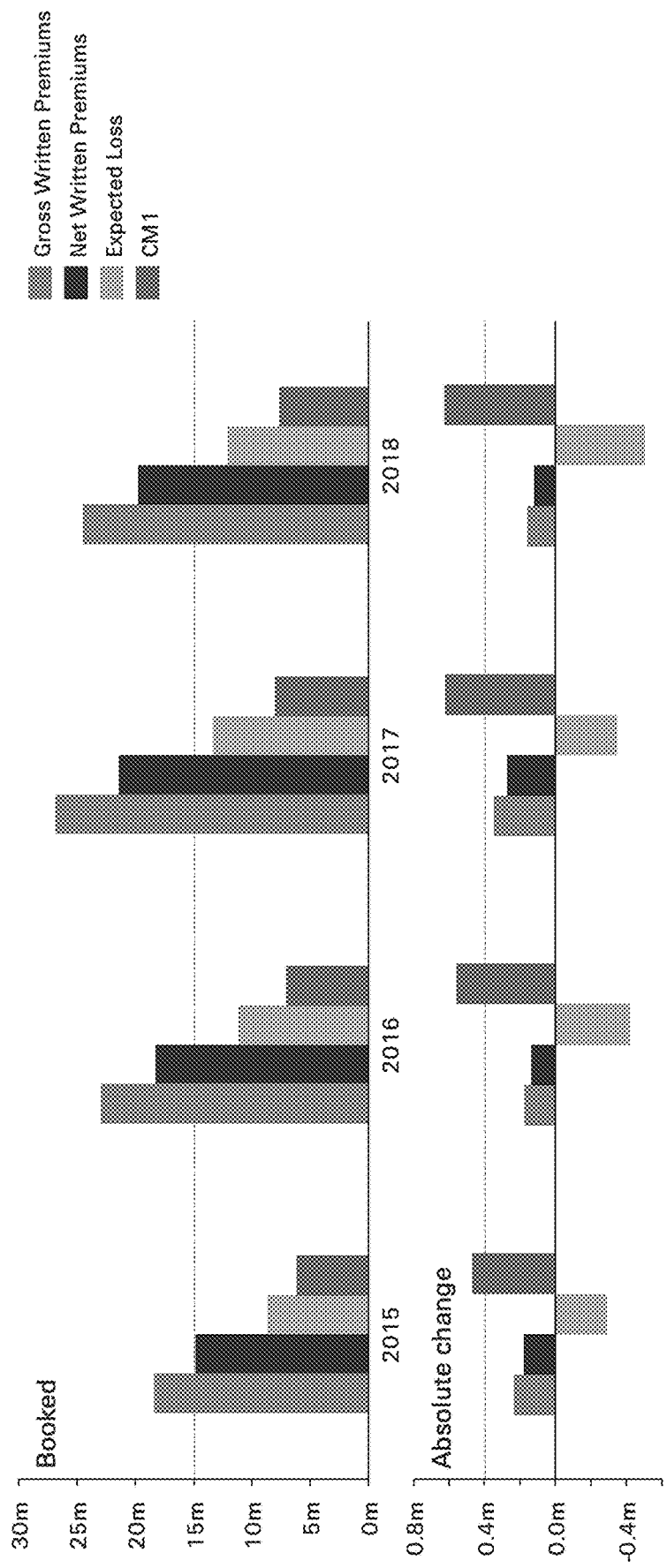
FIG. 4 shows a block diagram illustrating schematically an exemplary generation of forward- and backward-looking impact measures as output of the inventive simulation engine 10 which is based on multiple data characteristics for the risk-transfer conduct and fac business. For all risk-transfers performed by the inventive system 1, the client submits the risk via the system user interface, i.e. all risks are specified by the user based on approx. 20 risk characteristic attribute parameters. Through the whole underwriting process the system is based on structured data. All submitted and validated submission data are stored in a structured database. This means that the risk information of the bound risk-transfer as well as of the non-bound risk-transfer is directly available. The system provides a parameter-driven underwriting process of the data capturing of the characteristics data: Standard risk-transfers are automatically or semi-automatically underwritten based on a complex rule-set defined by the underwriting process. If all conditions are fulfilled, then the business is immediately quoted. If some conditions are not fulfilled, the risk-transfer request is further considered by an administered underwriting desk or expert system. As embodiment variant, the system may be realized to accept user rate offerings, i.e. for some products, the use is enabled to offer the rate the user is willing to assign to the risk-transfer, providing insights into the gap between willingness to pay and the actual costing generation by the inventive system.
Figure 5:
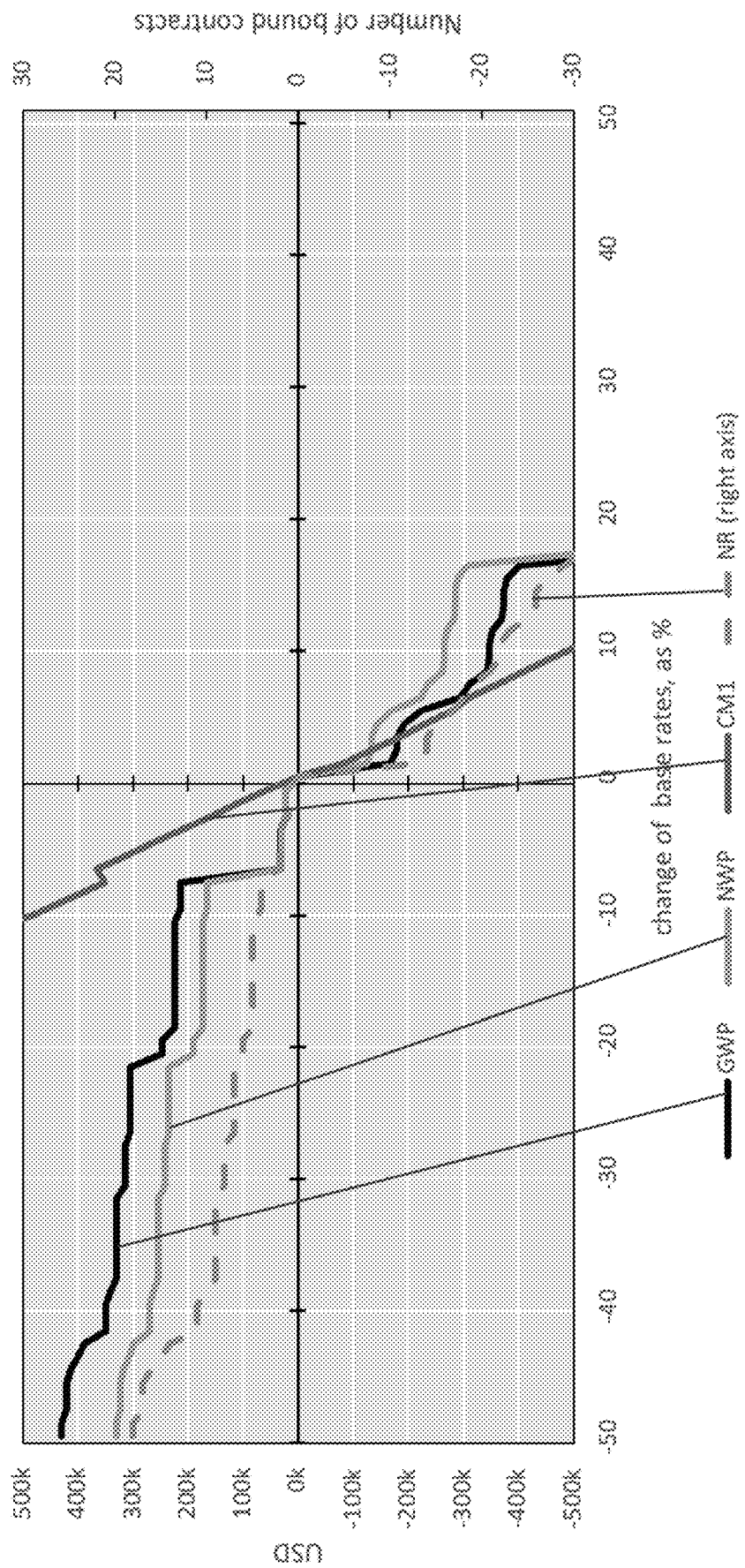
FIG. 5 shows a diagram illustrating schematically again the generation of the forward- and backward-looking measures by the simulation engine under changings of the base rate factors according to FIG. 4. Also, here, the simulation engine predicts measures answering the question of what the effect on the current risk-transfer portfolio is if the base rates changes. On the x-axis.
Figure 6:
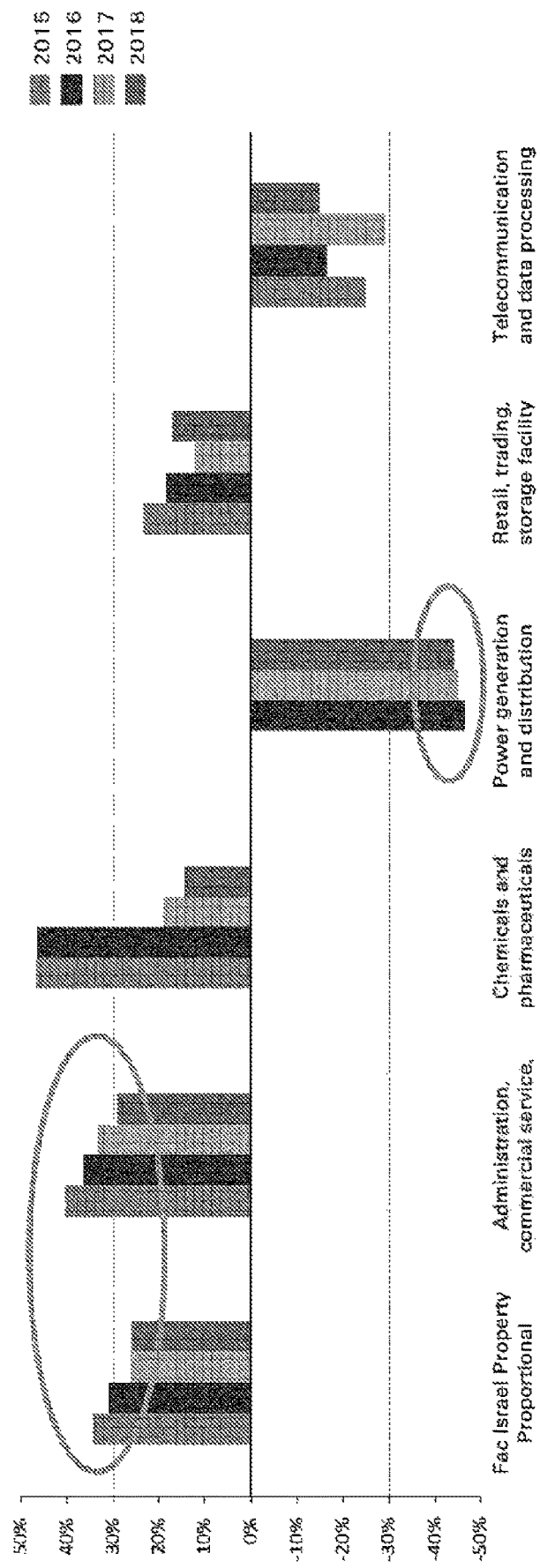
FIG. 6 shows a diagram illustrating schematically again the generation of the forward- and backward-looking measures by the simulation engine under changings of the base rate factors according to FIG. 4-5. Again, the simulation engine predicts measures answering the question of what the effect on the current risk-transfer portfolio is if the base rates changes.
Figure 7:
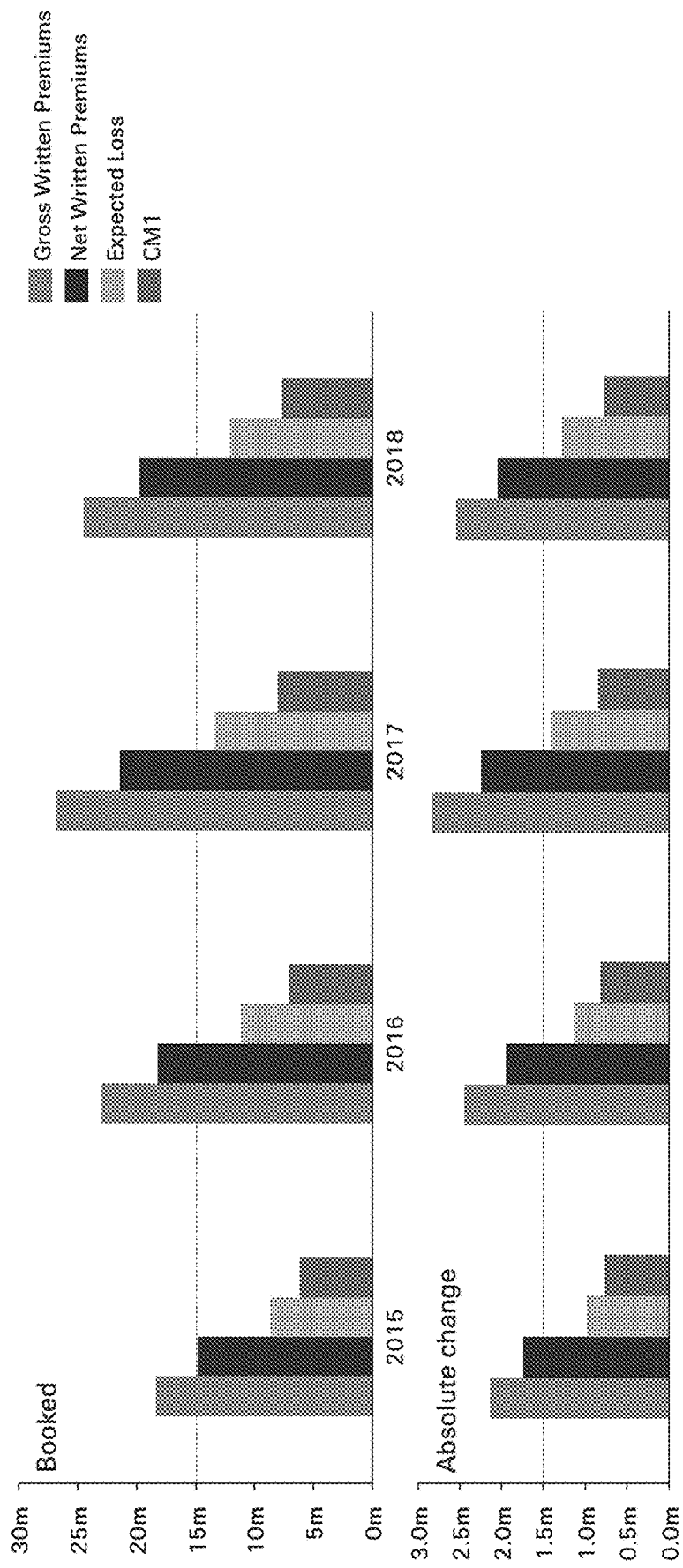
FIG. 7 shows a diagram illustrating schematically an example of the generation of the forward- and backward-looking measures by the simulation engine under changings of the risk-transfer mix of the risk-transfer basket or portfolio. In other word, the simulation engine predicts measures answering the question of what the effect on the current risk-transfer portfolio is if the risk-transfer mixture changes.
Figure 8:
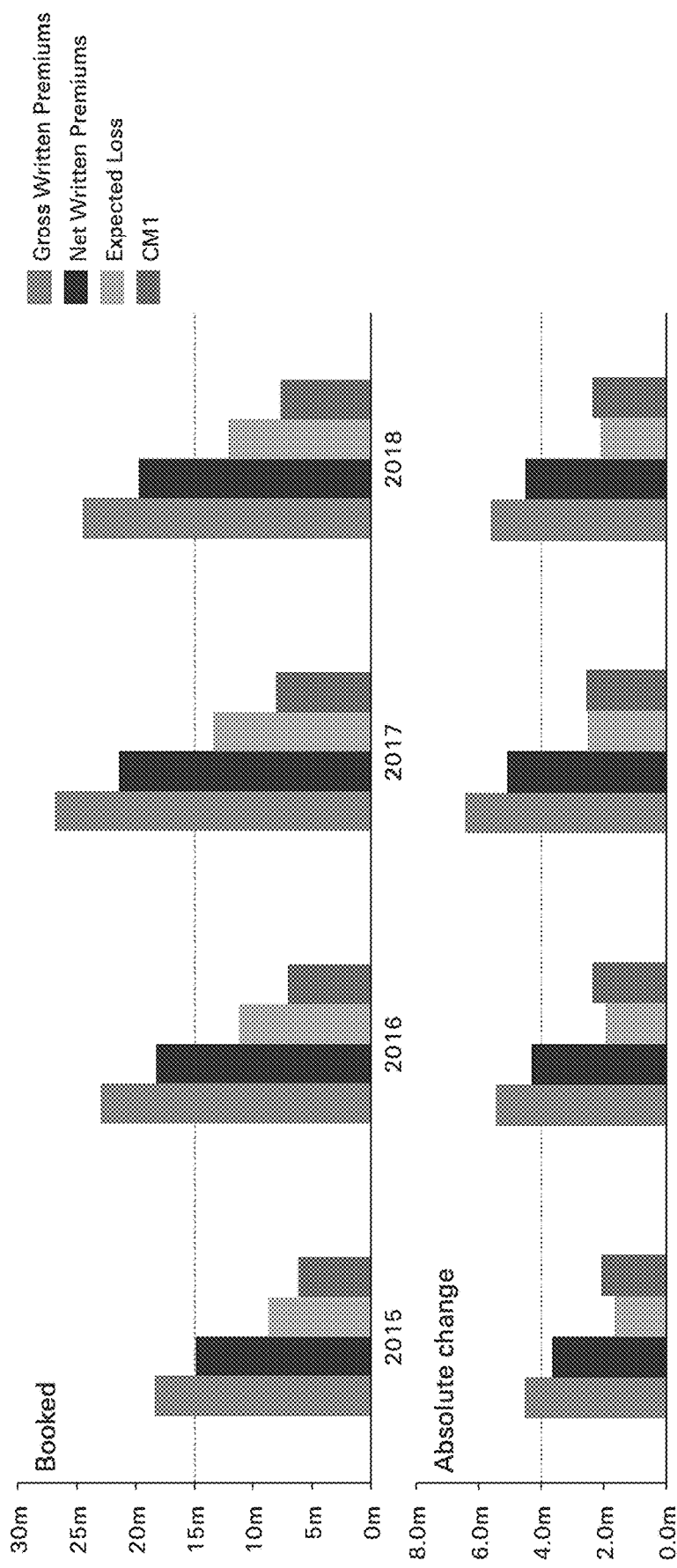
FIG. 8 shows a diagram illustrating schematically an example of the generation of the forward- and backward-looking measures by the simulation engine under changings of the base rate factors and the risk-transfer mix of the risk-transfer basket or portfolio. In other word, the simulation engine predicts measures answering the question of what the effect on the current risk-transfer portfolio is if the base rate and the risk-transfer mixture changes. The user of the simulation engine chooses changes in business volume and the change in base rates on the required level. Then the impact on the risk-transfer portfolio metric measures Gross Written Premiums (GWP), Net Written Premiums (NWP), Expected Loss and CM1 are generated by means of the simulation engine.
Figure 9:
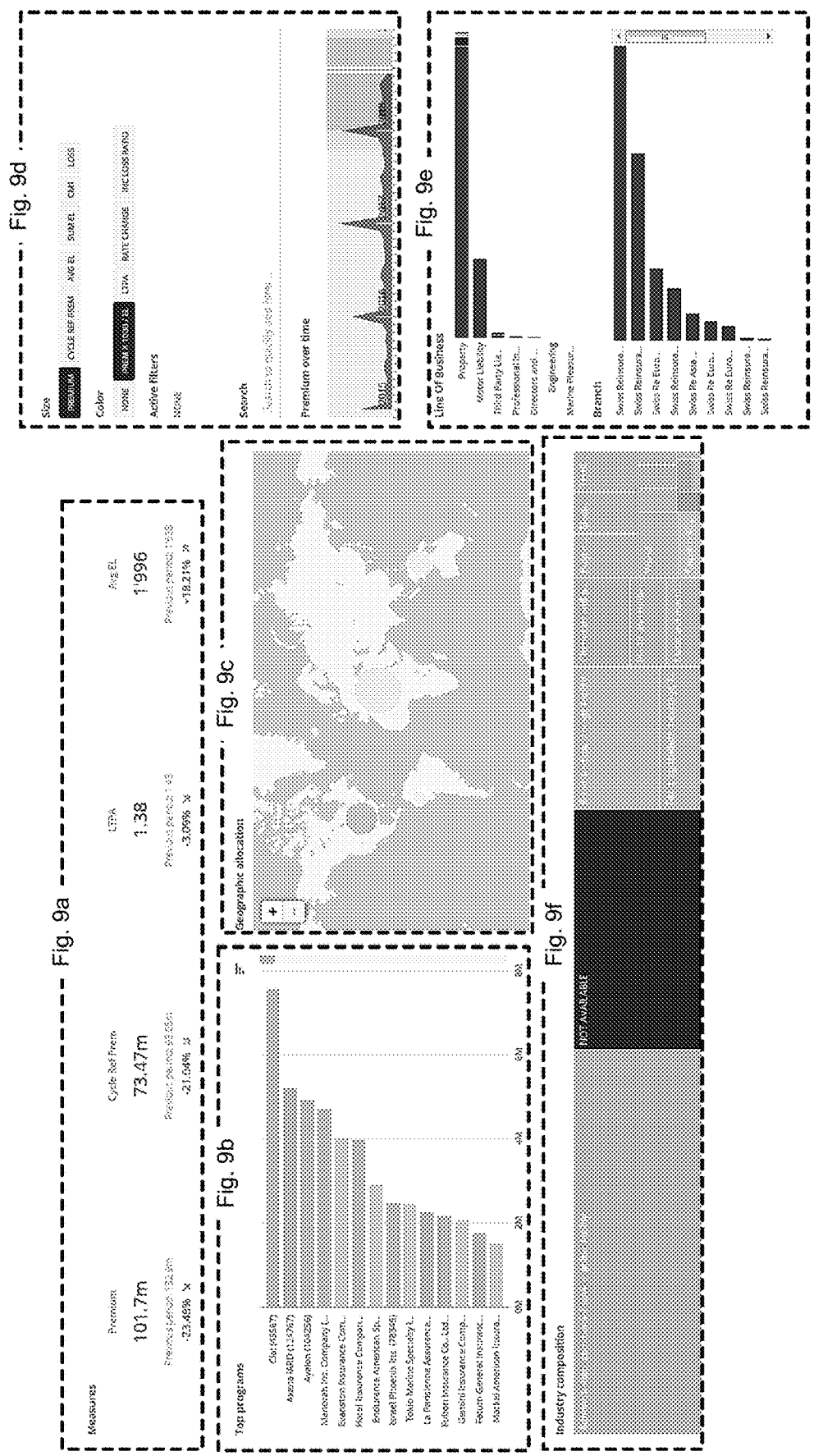
Figure 9B:
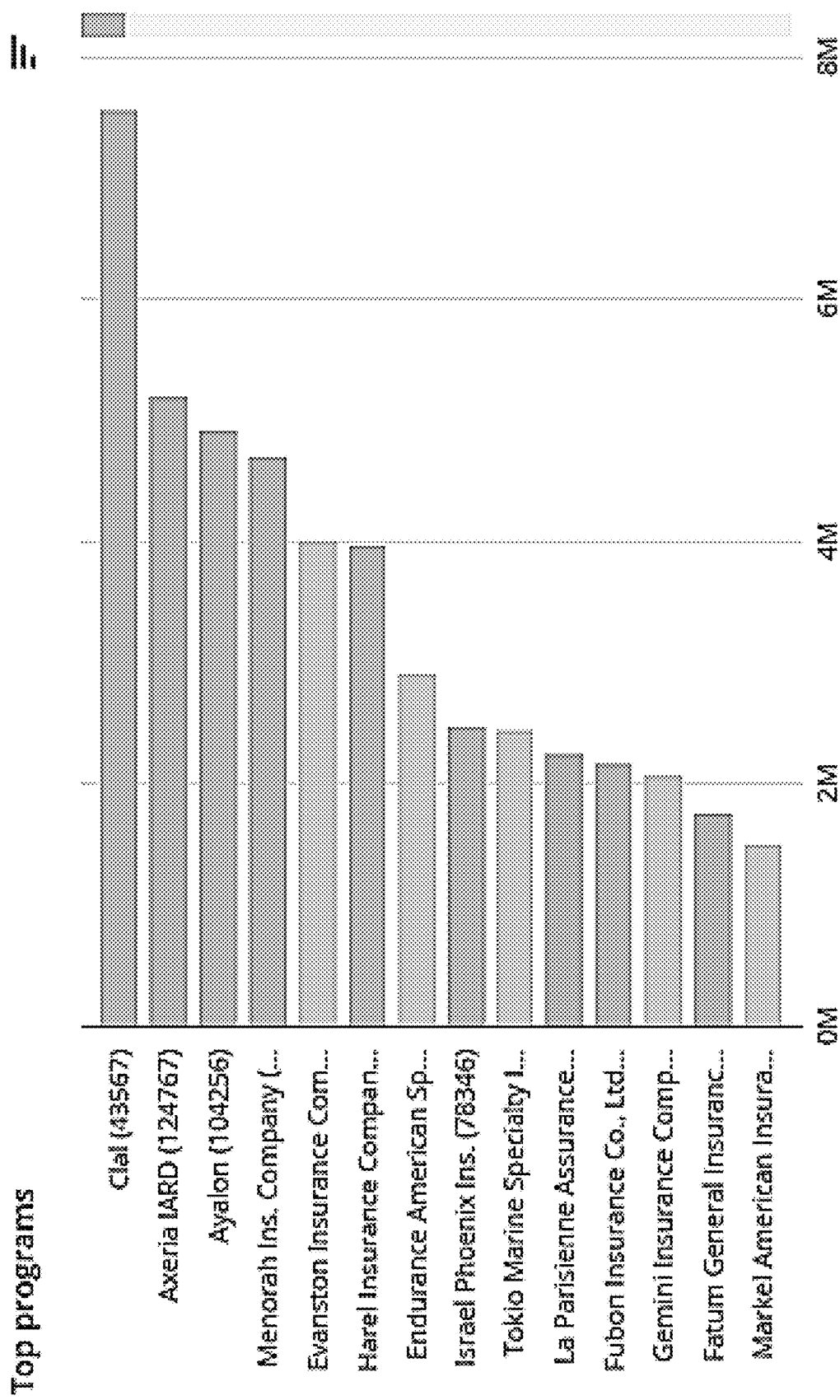
Figure 9C:
Figure 9E:
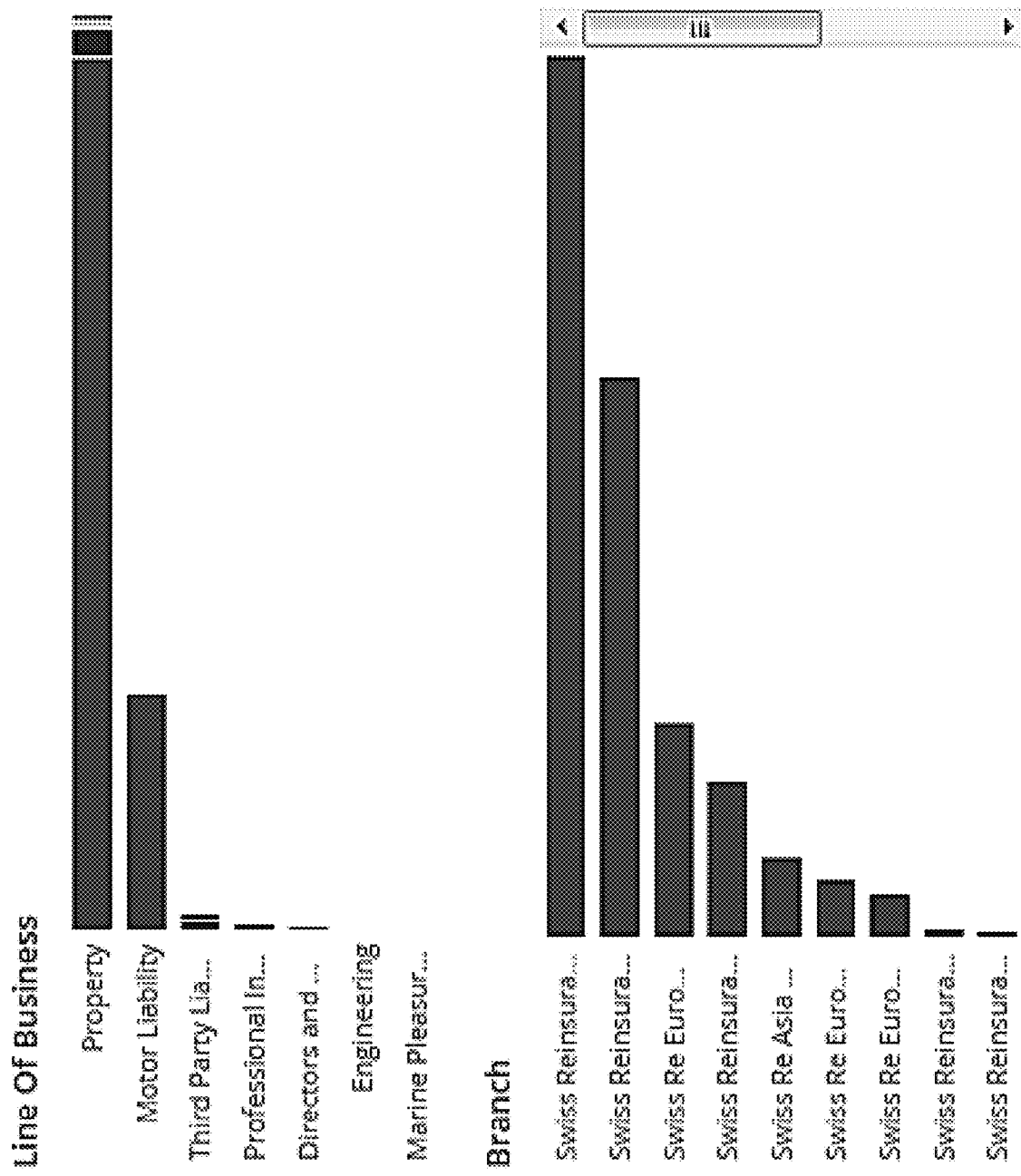
Figure 10:
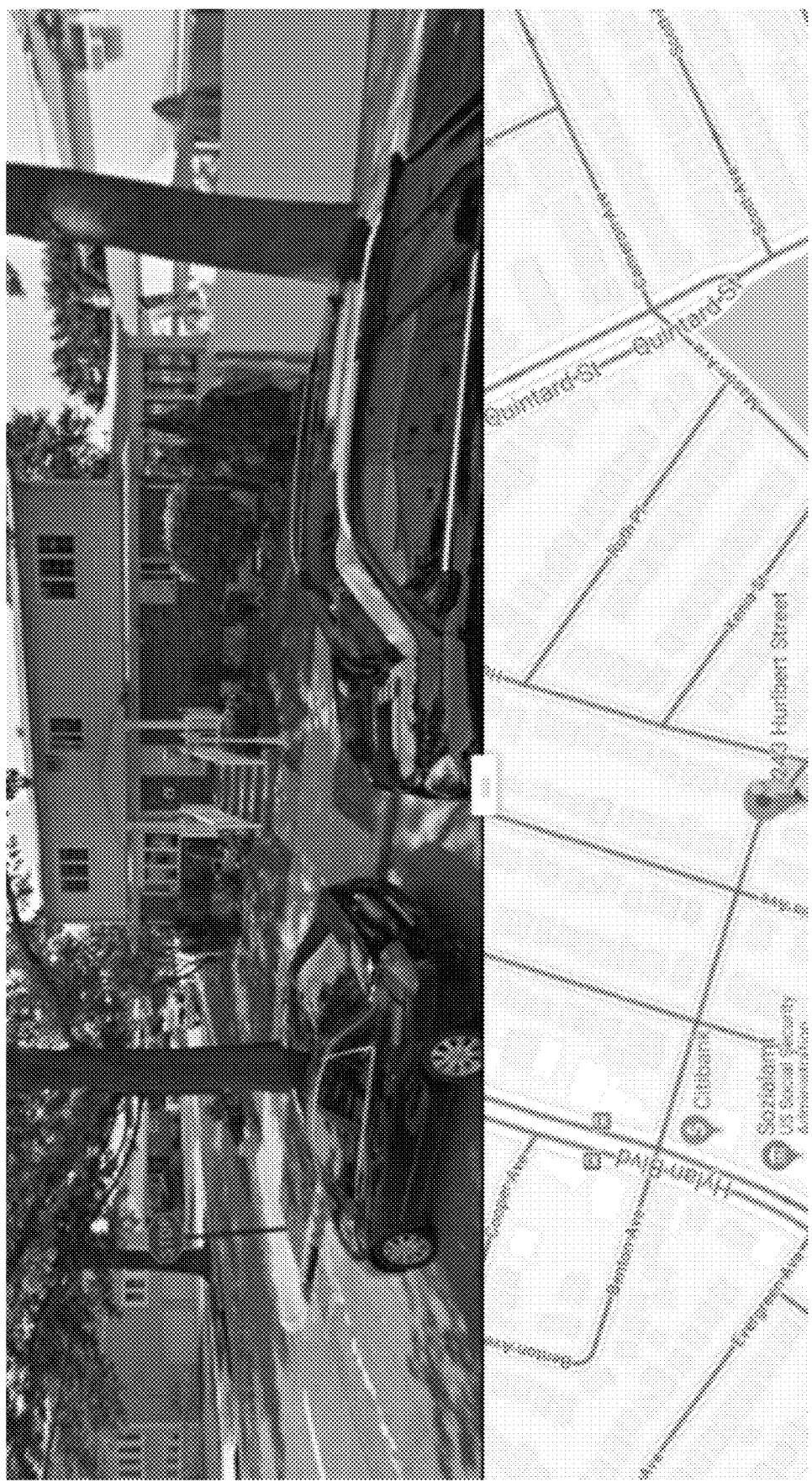
FIG. 10 shows an example of a U.S. location where street address information can typically be captured and where the system 1 can retrieve a virtual look at the property e.g. with Street View.

As indicated in FIG. 2, for the data capturing 3, the system 1 comprises appropriate technical data capturing means 16, in particular a rules database 161 and a number of processing modules, namely a control module 162, validation means 163, evaluation means 164, a transfer process module 165 and a user interface module 166. The transfer process module 165 comprises an automated transfer process 311 and a semi-automated transfer process 312 which will be described in greater detail below with reference to FIG. 2. The data capturing means 16 can e.g. be constructed at least partially as programmed software modules or software parts on a computer program product.

The user interface module 166 can e.g. comprise a program code for the generation of a user interface 1661 to the system 1 which can be operated by users by means of the user clients 51/52/53 via the data-transmission network 4. The user interface is provided, for example, via so-called browser programs or as API (Application Programming Interface). The man skilled in the technical field will understand that the user interface 1661 can also be constructed as GUI (Graphical User Interface) in a client server architecture. The user interface module 166 comprises a number of data input modules 1662. The data input modules in each case comprise data input fields which, in particular, are used for inputting data relating to the asset or object of a risk-transfer. Depending on the realization of the user interface 1661, the data input modules 1662 in each case comprise one or more displayable windows or GUI images ("screens") or a scrollable form. The data input modules are preferably assigned to various paths of a workflow. The user interface 1661 can also be provided with a voice recognition module for the data input.

The rules database 161 comprises information on data rules and risk-transfer rules. The data rules 1611 and risk-transfer rules 1612 in each case comprise one or more rule parameters 16111/16121 and a rule logic 16112/16122. In the rules database 161, at least the rule parameters but preferably also the rule logic are stored. The rule logic can e.g. be stored as process code which can be executed on the system 1, for example as so-called applet in Java. For the risk-transfer rules, the rule logic 16112/16122 can e.g. comprise at least one or more regulatory conditions or other compelling boundary conditions. For example, the regulatory conditions can relate to the data values of the data input fields and to different rule parameters. Also examples of regulatory actions can be concerned which are executed in accordance with an evaluation result which is determined on the basis of the regulatory conditions. For example, regulatory actions which can be specified can relate to the activation of different data input modules 1662 and to the activation of the automated risk-transfer process PA or the semiautomatic contract negotiation process 311. The rule logic 16112/16122 stored in the rules database 161 can comprise said regulatory conditions. In the various variants of embodiments, the regulatory actions can either be permanently coded as part of the control module 162 or stored in the rules database 161 as part of the rule logic 16112/16122.

The data rules 1611 and risk-transfer rules 1612 are in each case assigned to one or more data input fields of the data input modules 1662. The data rules 1611 are used by the validation means 163 for triggering and ensuring the quality of the data input. The data rules 1611 technically specify correct syntax and format, define prescribed value ranges, regulate plausibility and relations between data values of a number of data input fields, for example a first data item must come before a second data item, and prescribe which data must be mandatorily input. The data rules 1611 are also used for checking and ensuring that the data values input fit into a defined mathematical model or a mathematical formula. The risk-transfer rules 1612 are used by the evaluation means 164 and the control module 162, respectively, for controlling the bifurcated workflow process on the basis of the data input, selecting various flow paths and activating assigned data input modules and/or risk-transfer processes 31/32. The risk-transfer rules provide for a data-controlled multi-stage nested process of selection. For example, the user can be requested by activation of a data input module 1662 to input further additional data values if a data value input or a sum of a number of data values input exceeds a defined threshold value or if a particular class or group of contract objects is specified on the basis of the data input. As long as the evaluation means 164 consider the conditions set by the risk-transfer rules 1612 to be met (positive evaluation result), the control module 162 conducts the process flow along paths with minimum data input. If, however, the evaluation means 164 consider the conditions set by the risk-transfer rules 1612 as not met (negative evaluation result), the control module 162 conducts the process flow along paths with additional data input and activates corresponding additional data input modules. The data rules 1611 and/or the risk-transfer rules 1612 are assigned to sets of rules which are assigned different set identification data. The set identification data can e.g. comprise geographic data, user identification data and/or service identification data. The set identification data enable data rules 1611 and/or risk-transfer rules 1612 to be selected and activated in dependence on data values input.

The simulation engine 10 applies basic rate measures 103 to the metric risk exposure units 131 associated with a specific type 132 of risk-transfer 13 based on the event parameters 111 of the risk-transfer 13 and asset/object characteristics parameters 121 of the physical asset or object 12 determined by means of the simulation engine 10. The basic rate 103 provides for a cost measure of resources needed to cover the risk associated with a specific transfer 13. A premium 104 for the risk-transfer 13 is generated multiplying the basic rate 103 by the number 131 of risk-exposure unit 102 of the specific risk-transfer 13.

The simulation engine 10 provides dynamically forward- and backward-looking impact measures 101 based on a variation of the basic rate measure 103 and/or the structural mix characteristic 141 of the portfolio 14 comprising the captured risk-exposure units 103. The forward- and backward-looking impact measures 101 at least comprise a measure for an total amount of premiums 1011 associated with the portfolio of risk-transfers and/or a net amount of premiums 1012 given by the total amount of premiums 1011 minus premiums associated with secondary risk-transfers assigned to transferred parts of the risk exposure units of the portfolio, and/or a total expected loss 1013 measure and/or a CM1 measure 1014.

LIST OF REFERENCE SIGNS

1 Automated risk-transfer configurator and risk-transfer portfolio management platform
10 Simulation engine
101 Forward- and backward-looking impact measures
1011 Total amount of premiums (GWP)
1012 Net amount of premiums (NWP)
1013 Total expected loss
1014 CM1
102 Metric risk-exposure units
103 Basic rate
104 Premium (amount of resources to be allocated for the risk-transfer)
11 Physical risk-event
111 Risk-event measuring parameter
112 Impact parameter to a specific asset or object
12 Physical or intangible real-world asset or living object
121 Structured asset/object characteristics parameters
13 Risk-transfer associated with the occurrence of a predefined risk-event impacting the physical assets or objects
131 Number of risk-exposure units
132 Type of risks associated with a risk-transfer
14 Portfolio or basket of risk-transfers
141 Structural mix characteristic
142 Number of risk-transfers
15 Communication module
151 Network interface
16 Data capturing means
161 Rules database
1611 Data rules
16111 Rule parameters
16112 Rule logic
1612 Risk-transfer rules
16121 Rule parameters
16122 Rule logic
162 Control module
163 Validation means
164 Evaluation means
165 Transfer process module
166 User interface module
1661 User interface
1662 Data input modules
2 Automated end-to-end process
21 Automated underwriting by means of a rule-based bifurcation process
211 Creating submission
212 Receiving and binding quotation
213 Modifying and renewing acceptances
214 Product configurator
2141 Coverage area parameters
2142 Line of business parameters
2143 Type of risk-transfer parameters
2144 Risk information parameters
215 Machine-based exposure data intelligence
2151 Exposure database
21511, . . . , 2151i Data records
215111 Attribute parameter of prop./objects 12
215112 Location parameter
2151121 Latitude coordinate
2151122 Longitude coordinate
215113 Raw portfolio data
2152 Clustering module
21521 Automated address matching
21522 Grid
215221 Grid Cell
215222 Grid Cell Scale
215223 Adaptive cell size and/or shape
215224 Local housing/construction density
2153 EDI (Exposure Data Intelligence) engine
21531 Lookup service access
21532 Forward-looking modeling module
2154 User data interface
2155 Cross-level analysis module
21551 Identification
21552 Analysis
21553 Visualization
2156 Location intelligence engine
216 Geocoding processing module (Nominatim)
22 Technical Accounting Process
221 Booking premiums
222 Advising on new claims
223 Booking and updating claims
224 Rectifying premiums
225 Submitting a statement of accounts
23 Financial Accounting Process
231 Advising and/or requesting payments
232 Seamless pairing
233 Setting accounts
3 Rule-based bifurcation underwriting process
31 Standard
311 Automatic
3111 Triggered parameters compliant with trigger rules
312 Semi-Automatic
3121 Several parameters not compliant with trigger rules
32 Non-Standard
321 Underwriting process does not include automatic pricing
4 Data transmission network
5 Client or access terminal
51 PC (Personal Computer)
52 Mobile notebook or laptop computer 53 Mobile telephone or PDA computer (Personal Digital Assistant)
54 GPS module
55 Optical sensor or camera
6 Portfolio analytics framework
61 Dynamic representation
7 Client rate offering module

The invention claimed is:

1. A digital platform and system that provides an automated, multi-channel, end-to-end risk-transfer configuration and/or parametrization process for configuring, launching, and processing of customized second-tier transfer structures, wherein an automated risk-transfer placement for objects or property assets each having a geographic location related to occurrence of physical impacting risk-events, the objects or property assets impacting events, is provided by the digital platform and system as a first online channel comprising an electronic, parameter-driven, rule-based underwriting process for automatically creating a portfolio or composition of customized second-tier structures, wherein automated claim handling is provided by the digital platform and system as a second online channel, and wherein automated accounting is provided by the digital platform and system as a third online channel, the digital platform and system comprising:

a product configurator, implemented by circuitry, that uses at least four structuring blocks, a first structuring block for setting coverage area parameters of a risk-transfer product, a second structuring block for setting line of business parameters, a third structuring block for setting type of risk-transfer parameters, and a fourth structuring block for setting risk information parameters; and an integrated geocoding processing module, implemented by the circuitry, wherein for capturing the risk information parameters, the product configurator comprises a machine-based exposure data intelligence configured to automatically identify unique risks of objects or property assets based on precise geographic locations of the objects or property assets, wherein the machine-based exposure data intelligence comprises an exposure database as a centralized geo-database comprising a plurality of data records holding attribute parameter of objects or property assets with assigned geographic location parameters, the attribute parameters being grouped into at least geographical and/or physical and/or flood physical and/or storm physical and/or earthquake physical properties, and the location being measured by location data of a GPS-module or optical sensor and/or camera of mobile devices and inputted via a user data interface of the machine-based exposure data intelligence accessed via the mobile devices, the integrated geocoding processing module provides forward and reverse geocoding to and from geocoding coordinates via an interface to the digital platform and system at least on levels of building and/or street and/or district and/or suburb and/or county and/or state, the measured location data being matched to a geocoding footprint and the digital platform and system determining whether the geocoding footprint is associable with a building footprint, for matching the measured location data, the digital platform and system is configured to (i) retrieve all building footprints at least comprising geometries and geometric types or shapes from an overpass module within a grid cell having a defined radius of the measured location data and generate a convex hull of each footprint, (ii) perform a point-in-polygon match to the measured location data and the geocoding coordinates to all obtained shapes, and (iii) when a first match does not return only one polygon, then no match is found, the defined radius is increased and the matching is repeated, and the machine-based exposure data intelligence is configured to perform clustering by clustering stored objects or property assets of the exposure database related to their assigned geographic location parameters, and to perform automated address matching based on latitude and longitude coordinates of a measured location, wherein for the clustering a matching is narrowed down to a grid cell around an object or property asset to a scale where two locations are matchable based location-dependent attributes using an adaptive cell size and/or shape, depending on a local housing/construction density, and wherein different data records of the exposure database having a same assigned geographic location parameters are matched and mutually aligned, in case of triggering inconsistencies for data records having the same assigned geographic location parameters;

a metric simulation engine, implemented by the circuitry, configured to automatically predict forward- and backward-looking impact measures based on event parameter values of time-dependent series of occurrences of physical impacting risk-events, wherein the occurrences of the physical impacting risk-events are measured based on predefined threshold-values of the event parameters and wherein impacts of the physical impacting risk-events to a specific object or property asset are measured based on impact parameters associated with the object or property asset; and a graphical user interface of a portfolio analytics framework providing a dynamic representation of a portfolio structure, wherein the metric simulation engine forms an integrated part of the portfolio analytics framework, and wherein, by way of the metric simulation engine, the dynamic representation of the portfolio structure provides forward- and backward-looking insights to a user thereby enabling portfolio steering by identification of critical areas of the portfolio and impacts of possible changes to the underwriting process before launching it in a market.

2. The digital platform and system according to claim 1, wherein the product configurator comprises a client rate offering module configured to enable the user to input and offer a rate the user is willing to pay, thereby allowing the digital platform and system to capture insights into a gap between willingness to pay and costing generated by the digital platform and system.

3. The digital platform and system according to claim 1, wherein the machine-based exposure data intelligence comprises a rate engine providing a lookup service access for users based on the exposure database and the clustering of the data records, wherein an automated identification of location-specific risks is assessable by the user based on the precise geographic location of the objects or property assets.

4. The digital platform and system according to claim 1, wherein the machine-based exposure data intelligence further comprises a user data interface configured to enable access via a mobile device, of the mobile devices, to input location data by a GPS-module or optical sensor and/or camera of the mobile device.

5. The digital platform and system according to claim 4, wherein the mobile device is a smart phone.

6. The digital platform and system according to claim 4, wherein a user is enabled to scan for insured properties using the mobile device.

7. The digital platform and system according to claim 1, wherein the machine-based exposure data intelligence comprises an cross-level analysis module providing identification, analysis, and visualization of large risk pools, wherein a risk pool comprises a plurality of objects of the exposure database, wherein different levels and channels comprise at least facultative risk-transfer and/or treaty risk-transfer and/or customized corporate direct risk-transfer, and wherein risk of properties/objects are analyzed based on the attributes and location at different levels and for different channels allowing for automated tracking of risk accumulation and/or capacity thresholds.

8. The digital platform and system according to claim 1, the clustering by the machine-based exposure data intelligence comprises an automated address matching based on the latitude and longitude coordinates of a location, wherein for the clustering a search is narrowed down to a grid cell around a property/object of interest to a scale where two locations are matchable based just on a house number or other location-dependent attributes.

9. The digital platform and system according to claim 8, wherein the clustering uses an adaptive cell size and/or shape depending on the local housing/construction density.

10. The digital platform and system according to claim 8, wherein, for the clustering, the machine-based exposure data intelligence uses accessible building footprints to check whether latitudinal/longitudinal-tags are enclosed with a footprint of interest, wherein any latitudinal/longitudinal-coordinate is mapped to a unique building and/or associated to sites.

11. The digital platform and system according to claim 1, wherein structured asset/object characteristics parameters of the objects or property assets are captured at least partially by a parameter-driven, rule-based bifurcation process dynamically capturing characteristics parameter values and mapping the values to the structured characteristics parameters, wherein a plurality of risk-transfers associated with occurrence of one or more predefined risk-events impacting the objects or property assets are captured by metric risk-exposure units and transferred to a portfolio holding the risk-transfers by the captured risk-exposure units, and wherein the structural mix characteristic of the portfolio is given by the measured and captured types of risks and assigned number of risk-transfers with associated metric risk-exposure units, the metric simulation engine applies basic rate measures to the metric risk exposure units associated with a specific type of risk-transfer based on the event parameters of the risk-transfer and asset/object characteristics parameters of the objects or property assets determined by the metric simulation engine, wherein a basic rate measure provides for a cost measure of resources needed to cover the risk associated with a specific transfer, and wherein a premium for the risk-transfer is generated multiplying the basic rate measure by a number of risk-exposure units of the specific risk-transfer, and the metric simulation engine provides dynamically forward- and backward-looking impact measures based on a variation of the basic rate measure and/or the structural mix characteristic of the portfolio comprising the captured risk-exposure units, wherein the forward- and backward-looking impact measures at least comprise a measure for an total amount of premiums associated with the portfolio of risk-transfers and/or a net amount of premiums given by the total amount of premiums minus premiums associated with secondary risk-transfers assigned to transferred parts of the risk exposure units of the portfolio, and/or a total expected loss measure and/or a CM1 measure.

12. The digital platform and system according to claim 11, wherein a basic rate measure and/or a structural mix characteristic of a basket comprising captured risk-exposure units is varied until a desired degree regarding the varied values of the basic rate measure and/or the structural mix characteristic is reached.

13. The digital platform and system according to claim 12, wherein the desired degree is determined by reaching a local optimum regarding the varied values of the basic rate measure and/or the structural mix characteristic.

14. The digital platform and system according to claim 12, wherein the variation of the values of the basic rate measure and/or the structural mix characteristic is performed by the metric simulation engine based on interactive input values of a user of the product configurator.

15. The digital platform and system according to claim 12, wherein the variation of the values of the basic rate measure and/or the structural mix characteristic is performed by the metric simulation engine based on varying input values generated by the product configurator.

16. The digital platform and system according to claim 12, wherein adjustments to the basic rate measure and/or the structural mix characteristic of the basket are interactively reviewed and audited by a user ensuring governance, risk, and compliance requirements.

17. The digital platform and system according to claim 12, wherein the digital platform and system is realized as an integrated part of a cloud-based application.

18. A method for a digital platform and system providing an automated, multi-channel, end-to-end risk-transfer product configuration process for configuring, launching, and processing of customized second-tier risk-transfer structures, wherein an automated risk-transfer product placement for objects or property assets each having a geographic location related to occurrence of physical impacting risk-events, the objects or property assets impacting events, is provided by the digital platform and system as a first online channel comprising a parameter-driven, rule-based underwriting process for creating a portfolio of customized second-tier structures, wherein automated claim handling is provided by the digital platform and system as a second online channel, and wherein automated accounting is provided by the digital platform and system as a third online channel, the method comprising:

using, by a product configurator implemented by circuitry, at least four structuring blocks, a first structuring block for setting coverage area parameters of the risk-transfer product, a second structuring block for setting line of business parameters, a third structuring block for setting type of risk-transfer parameters, and a fourth structuring block for setting risk information parameters;

for capturing the risk information parameters, automatically identifying, by a machine-based exposure data intelligence included in the product configurator, unique risks of objects or property assets based on precise geographic locations of the objects or property assets, wherein the machine-based exposure data intelligence comprises an exposure database as a centralized geodatabase comprising a plurality of data records holding attribute parameter of objects or property assets with assigned geographic location parameters, the attribute parameters being grouped into at least geographical and/or physical and/or flood physical and/or storm physical and/or earthquake physical properties, and the location being measured by location data of a GPS-module or optical sensor and/or camera of mobile devices and inputted via a user data interface of the machine-based exposure data intelligence accessed via the mobile devices;

providing forward and reverse geocoding to and from geocoding coordinates via an interface to the digital platform and system at least on levels of building and/or street and/or district and/or suburb and/or county and/or state, the measured location data being matched to a geocoding, footprint, and determining whether the geocoding footprint is associable with a building footprint;

for matching the measured location data, (i) retrieving all building footprints at least comprising geometries and geometric types or shapes from an overpass module within a grid cell having a defined radius of the measured location data and generate a convex hull of each footprint, (ii) performing a point-in-polygon match to the measured location data and the geocoding coordinates to all obtained shapes, and (iii) when a first match does not return only one polygon, then no match is found, increasing the defined radius and repeating the matching;

performing clustering, by the machine-based exposure data intelligence, by clustering stored objects or property assets of the exposure database related to their assigned geographic location parameters, and performing automated address matching based on latitude and longitude coordinates of a measured location, wherein for the clustering a matching is narrowed down to a grid cell around an object or property asset to a scale where two locations are matchable based location-dependent attributes using an adaptive cell size and/or shape, depending on a local housing/construction density, and wherein different data records of the exposure database having the same assigned geographic location parameters are matched and mutual aligned, in case of triggering inconsistencies for data records having the same assigned geographic location parameters;

automatically predicting, by a metric simulation engine that is implemented by the circuitry, forward- and backward-looking impact measures based on event parameter values of time-dependent series of occurrences of physical impacting risk-events, wherein occurrences of the physical impacting risk-events are measured based on predefined threshold-values of the event parameters and wherein the impacts of the physical impacting risk-events to a specific object or property asset are measured based on impact parameters associated with the object or property asset; and providing, by a graphical user interface of a portfolio analytics framework, a dynamic representation of a portfolio structure, wherein the metric simulation engine forms an integrated part of the portfolio analytics framework, and wherein, by way of the metric simulation engine, the dynamic representation of the portfolio structure provides forward- and backward-looking insights to a user thereby enabling portfolio steering by identification of critical areas of the portfolio and impacts of possible changes to the underwriting before launching it in a market.

* * * * *